United States Patent
Corynen

(10) Patent No.: US 6,735,596 B2
(45) Date of Patent: May 11, 2004

(54) COMPUTER METHOD AND USER INTERFACE FOR DECISION ANALYSIS AND FOR GLOBAL SYSTEM OPTIMIZATION

(76) Inventor: Guy Charles Corynen, 2543 Dos Rios Dr., San Ramon, CA (US) 94583-1743

( * ) Notice: Subject to any disclaimer, the term of this patent is extended or adjusted under 35 U.S.C. 154(b) by 470 days.

(21) Appl. No.: 09/875,119

(22) Filed: Jun. 7, 2001

(65) Prior Publication Data

US 2003/0167265 A1 Sep. 4, 2003

(51) Int. Cl.[7] .............................................. G06F 17/30
(52) U.S. Cl. .................................... 707/102; 707/101
(58) Field of Search .............................. 707/1, 2, 3, 4, 707/5, 101, 102; 600/300; 703/2; 705/8, 35; 706/11, 15, 45; 771/129

(56) References Cited

U.S. PATENT DOCUMENTS 5,758,026 A * 5/1998 Lobley et al. ................ 706/11
6,102,958 A * 8/2000 Meystel et al. ................ 703/2

OTHER PUBLICATIONS

Palisade Corporation (2001). Precision Tree. Palisade Corporation, Newfield, NY.
Palisade Corporation (2001). Risk Optimizer. Palisade Corporation, Newfield NY.
Lumina Decision Systems (2001). Analytica Version 2.0.
Lumina Decision Systems (2001). Analytica Version 2.0.
Lumina Decision Systems, Los Gatos, CA.
Decisioneering, Inc. (2001). Crystal Ball. Decisioneering, Inc., Denver CO.
Treeage Software Corporation (2001). Data Version 3.5.7. TreeAge Software Corporation, Boston, MA.
Vanguard Software Corporation (2001). Decision Pro Version 3.0. Vanguard Software Corporation, Cary, NC.
Logical Decisions, Inc. (2001). Logical Decisions for Windows (LDW). Logical Decisions, Inc., Golden, CO.

(List continued on next page.)

Primary Examiner—Charles Rones
Assistant Examiner—Apu M Mofiz

(57) ABSTRACT

A stand-alone computer application for solving decision problems, conducting decision and risk analyses, and for globally optimizing the operation of systems and processes is disclosed. Running on a personal computer, the application embodies three major methods. The first method is project oriented and includes highly modularized procedures for solving and analyzing sequential, probabilistic and multi-objective decision problems. It enables a user to specify and to seamlessly integrate prioritized objectives, performance measures, utility functions, decisions, choices, outcomes, probabilities, multi-dimensional costs and external parameters into an objectives-based decision model. It further includes procedures to assist a user in the construction of objectives hierarchies, utility functions, cost functions and probability expressions.

The second method generalizes the first method into a system controller for globally optimizing a process or system whose operation involves sequential probabilistic and multi-objective decisions that cannot be addressed using conventional linear, non-linear and stochastic control methods. It provides a framework for modeling hybrid discrete-continuous control systems where discrete events and processes are modeled at upper levels of a control hierarchy and continuous processes are modeled at lower levels.

The third method provides a multiple-window graphical user interface to assist a user in applying the first two methods, and includes procedures for manipulating and editing textual and graphical outputs.

24 Claims, 49 Drawing Sheets

(40 of 49 Drawing Sheet(s) Filed in Color)

OTHER PUBLICATIONS

Applied Decision Analysis, Inc. (2001). DPL: A Decision Programming Language. Menlo Park, CA.

Sauter, Vicki L. (1998). Decision Support Systems Software. University of Northern Iowa, Cedar Falls, IA.

SDG Decision Systems (2001). SuperTree. SDG Decision Systems, Menlo Park, CA. The University of Michigan Impact Group (2001). Impact. U. of M., Ann Arbor, MI.

Honeywell Inc., Industrial and Automation Division (2001). PlantScape. Honeywell, Inc., Phoenix, AZ.

Siemens AG (2001). Simatic PCS 7. Siemens AG, Citicorp Center, New York, NY.

CONTROLSOFT, Inc. (2001). Mantra NT. ControlSoft Inc., Cleveland OH.

Power Technology (2001). Proates, Vista, Leo., Powergen, UK.

Westinghouse Process Control, Inc. (2001). SmartProcess™. Westinghouse Corporation, Pittsburgh, PA.

\* cited by examiner

COMPUTER METHOD AND USER INTERFACE FOR DECISION ANALYSIS AND FOR GLOBAL SYSTEM OPTIMIZATION

CROSS-REFERENCE TO RELATED APPLICATIONS

Not applicable

FEDERALLY SPONSORED RESEARCH

Not applicable

MICROFICHE APPENDIX

Not applicable

FIELD OF THE INVENTION

The present invention relates generally to computerized methods for analyzing and solving decision problems, for globally optimizing the operation of systems and processes, and for designing graphical user interfaces. More specifically, the invention provides software methods and a graphical user interface for solving decision and system optimization problems involving sequential, probabilistic and multi-objective decisions.

BACKGROUND OF THE INVENTION

Introduction

Artificial Intelligence (AI) may be defined as the art of creating methods and machines for performing functions requiring various forms and degrees of natural intelligence when attempted by humans. Considerable advances have been made since the late 1970s by computer scientists, operations researchers and system scientists in applying the results of AI research to the construction of computational tools for automating various processes in the art of decision making and risk analysis [14, 17]. Such advances have been especially successful in the field of Decision Analysis, where mathematical and statistical modeling methods have been combined with computational techniques to develop new tools to assist Decision Makers in selecting an optimal choice from a plurality of choices [1–3, 9, 19–30, 56].

While there is no unique method for solving complex decision problems, the flowchart of FIG. 1 illustrates the major steps currently guiding decision analysts. Software developers have implemented these steps in a variety of ways, and important technical terms have received different descriptions throughout the literature. To distinguish the invention disclosed herein from the current art, a precise definition of some critical terms of art is needed.

Technical Definitions

Concepts From Graph Theory

A graph $G=(N, E)$ consists of a set $N=\{n_1, n_2, \ldots\}$ of nodes and a set $E \subset N \times N$ of edges or arcs. For any edge $e=(u, v)$ in E, we say that nodes u an v are adjacent. When (u, v) is an ordered pair, it is a directed edge, where u is adjacent to v and v is adjacent from u, u is called the parent of v and v is called the child of or offspring of u. When every edge in G is an ordered pair, G is called a directed graph, or digraph.

A path in G from $v_1$ to $v_k$ is a sequence $<(v_1, v_2), (v_2, v_3), \ldots, (v_{k-2}, v_{k-1}), (v_{k-1}, v_k)>$ of adjacent edges, sometimes written $<v_1, v_2, \ldots, v_k>$, where each node is distinct, except possibly for $v_1=v_k$, in which case the path is called closed, and said to constitute a cycle or circuit. Otherwise the path is called open.

A node w in N is said to be isolated if there does not exist an edge (u, v) in E for which either w=u or w=v. A node is called a root of G if there are paths from u to every other node in G. A graph G is connected if, for every pair (u, v) of nodes in N, there exists a path from u to v or from v to u. A graph $H=(M, D)$ is a sub-graph of $G=(N, E)$ if $M \subset N$ and $D \subset E$. In a subgraph H of G, a node w in M is called a root in G if w is a root of H. Whenever there exists a path from a node u to another node v in a directed graph G, v is a descendant of u and u is an ancestor of v.

A graph G is a tree if there exists exactly one path between any two distinct nodes of G. A directed graph G is a directed tree, tree for short, if G has a root r and there exists exactly one directed path from r to every other node of G. When a graph G is a tree, any sub-graph of G is also a tree, a sub-tree of G. In a tree, every node has at most one parent, and whenever a tree has a unique root, it is called a rooted tree. A node u in a tree G is a leaf node or terminal node if u has no offspring, and similarly for any sub-tree H of G.

Hierarchies

A hierarchical graph with P levels is an object $HG=(N, E, H)$, where 1. (N, E) is a directed and rooted tree
2. $H=<H_1, H_2, \ldots, H_p>$, an ordered partition of N, i.e.
   (i) $\cup H_i=N$ and $H_i \cap H_j=\phi$, for i and j from 1 to P, $i \neq j$, and
   (ii) for every edge $e=(u,v)$ in E, if u is in $H_i$ and v is in $H_j$, then $i>j$.

For any partition element $H_i$, a node in $H_i$ is a node at level i. For any edge (u, v) in E, u is superior to v and v is subordinate to u if, and only if, u is in $H_i$, v is in $H_j$ and $i>j$.

An important application of hierarchical graphs arises when decision problems are motivated by a multiplicity of competing objectives. An objective is a statement of action whose purpose is to attain a desired state or condition. Whenever the nodes of a hierarchical graph represent objectives, the graph is called an objectives hierarchy. Statements such as "minimize losses", "maximize profit", "increase reliability" and "reduce environmental risks" are examples of objectives associated with typical decision problems. For any edge (u,v) in E, if u and v are objectives, if u belongs to $H_1$ and v belongs to $H_j$ and $i>j$, then u is the super-objective of v and v is a sub-objective of u, and similarly when $i<j$.

Semantics of Graphs, Trees and Hierarchies

The terms introduced in the previous sections are used to define graphical and mathematical relationships between nodes, edges and levels. These are topological relationships and, taken collectively, they constitute the topology of the defined graph, tree or hierarchy.

When used as models of some reality, these constructs must be assigned some meaning. This is accomplished by adding another descriptive layer called the semantic layer, where a contextual meaning is attached to the nodes, edges and levels. To illustrate this combination of topology and semantics, consider now a modeling construct that will serve as a basic building block for this disclosure.

Probalistic Decision Trees

A Probabilistic Decision Tree (PDT) is a model of a decision problem that represents all the choices, consequences and paths that a decision maker may experience through time. In very general terms, the major purpose for building and solving a PDT is to find choices that satisfy a decision maker's definition of "optimal". Another purpose is to evaluate the consequences and collateral risks resulting from the implementation of a given choice, optimal or not. Throughout this disclosure, risk is defined as the numerical value resulting from a finite summation $R=\Sigma(p_i*c_i)$ of product pairs ($p_i * c_i$), where the $c_i$s constitute a collection of mutually exclusive and exhaustive events and, for every i, $p_i$ is the probability of occurrence of $c_i$. When a decision maker faces a plurality of choices and uses risk as an optimization criterion, his or her optimal choice is the choice whose selection minimizes risk.

While the $c_i$ terms are often interpreted as the occurrence of some cost or penalty, no such restrictions apply here, and they may assume any scalar value, positive or negative. Since R has the same form as the expectation operator in the theory of probability and statistics, it is often called the "Expected Risk" and, when R is negative, the "Expected Benefit".

The topological structure of a PDT is a directed (and rooted) tree whose nodes are of three types, decision nodes, chance nodes and terminal nodes. Referring to FIG. 3, a decision node 4, drawn as a square, represents a decision to be made. A chance node 5, drawn as a circle, represents a random chance variable, and a terminal node 6, drawn as a vertical ellipse, represents a leaf in the tree. An offspring 8 of a decision node 4 is a choice available at that node, and an offspring 9 of a chance node 5 is a consequence or outcome associated with the chance node. The offspring of every chance node constitute a mutually exclusive and exhaustive set of consequences or outcomes. Edges relating a node to its offspring are occasionally referred to as branches.

While it usually correct to view parent nodes as preceding their offspring on some underlying time scale, standard PDTs are not endowed with any numerical scale on which the timing of events is quantitatively specified, and only a relative timing is suggested.

The contextual meaning of a PDT is contained in its semantic layer. Each node receives a node label and each directed edge (u,v) receives a transition cost or transition benefit representing the cost or benefit incurred during a transition from u to v. When u is a chance node, a transition probability is also assigned to (u,v) to indicate the probability of occurrence of Outcome v. The semantic elements of PDTs are discussed in greater depth in the detailed description of the invention.

Probabilistic decision trees must satisfy some obvious constraints. First, the decision maker may select only one choice at every decision node. Second, since outcomes at any node must constitute a mutually exclusive and exhaustive collection, the outcome probabilities at any chance node must sum to unity.

Probabilistic Decision Graphs

Large PDTs often contain repeated sub-trees, sub-trees whose topologies are identical. Sometimes these sub-trees also possess identical semantics. In either situation, a tempting modeling approach consists of retaining only one of the repeated sub-trees as a prototype, ignoring the other sub-trees, and providing some connection from the parent of each ignored sub-tree (the parent of its root) to the root of the prototype. This restructuring is typically accomplished by replacing the root of each subtree with a new node called a reference node or continuation node 7, which is drawn here as a horizontal ellipse, and by inserting one new edge from each such node to the root of the prototype.

This approach usually simplifies the graphical representation of a decision model and occasionally yields computational benefits as well. It comes at a price, however. If the semantics of the sub-trees do not agree, and especially if the sub-trees have different ancestral dependencies, the differences must be accounted for in the prototype, a potentially complicated task.

Second, the tree structure of the model is now destroyed, since the root of the prototype now has more than one parent, and the resulting model is no more than a Probabilistic Decision Graph (PDG). Since the new reference edges may point to nodes anywhere in the tree, the topology of the PDG may include loops or cycles, increasing the computational complexity of the model. Due to such difficulties, the potential computational advantages associated with repeated sub-trees have not been sufficiently exploited by developers of decision tree analysis software [19, 20, 22–27, 30]. In the current art, the benefits of such model reductions are confined to graphical advantages where the repeated sub-trees are simply hidden from view, but the model itself is still solved as a PDT in the background. Improved methods are needed to better exploit the redundancy inherent in repeated sub-trees by providing reduced models that can be solved more efficiently, and with no loss in accuracy.

Sequential Decision Networks

Many decision problems involve attributes such as costs, rewards and probabilities that are time-dependent, and may also be functions of ancestral node properties. This requires a generalization of standard probabilistic decision trees and graphs since these only provide a chronological ordering of nodes and events. Such a generalization is provided by Sequential Decision Networks (SDN), also called Dynamic Networks or Time-Expanded Networks [2,33,53]. Whereas the topological axioms of SDNs and PDNs are the same, the generalization resides in the semantic layer, where a much richer association of values, variables and functions is allowed. The art of decision analysis software must be extended to include this important generalization.

Background of the First Preferred Embodiment

The flowchart 1 of FIG. 1 illustrates the major steps used to solve decision problems using Sequential Decision Networks. The purpose of the first step is to informally describe the decision maker, his or her decision problem, other stakeholders, the decision urgency and priority, and any problem constraints.

The symbolic representation of decision problems is initiated during the second step, where the decision maker's objectives are stated and structured, usually in the form of an objectives hierarchy [4,5,9,10,12,13,50,55]. There is little disagreement among practitioners of the art that this is a critical step in the formulation and solution of decision problems, for one dominant reason: multiple-objective problems are solved by optimizing an objective function, a numerical function of multiple performance measures. Each measure is derived from a corresponding objective in the hierarchy, and is designed to indicate the degree to which the corresponding objective is satisfied. A careless construction of the objectives hierarchy will produce a collection of measures that inadequately represent the decision maker's problem and may lead to catastrophic errors during the computation of an optimal choice.

This rather obvious fact notwithstanding, software developers [19–30] have found it difficult to formally and seamlessly integrate objectives hierarchies with their decision analysis software. Although software packages for structuring objectives and organizational charts are readily available as separate packages, they have not been seamlessly integrated with existing tools for solving sequential decision problems. The absence of such an integrated capability is a significant limitation in the current art.

In all but rare cases, the overall objective function introduced earlier is a many-to-one function of performance measure values, each value weighted in accordance with a priority assignment on the corresponding objectives, and in agreement with the decision maker's preferences about these values. Although the objectives hierarchy's level structure may suggest a qualitative ranking of objectives, additional steps are required to elicit a numerical and rational prioritization from the decision maker [1,4,5,9,10,13,31]. These important steps cannot be found in the art of sequential decision analysis software.

To adequately account for a decision maker's preferences about performance values, the invention disclosed herein is utility-based [3,5,8,9,11,50] in the sense that a utility function is specified on the range of each performance measure. The sole but effective purpose of a utility function is to formalize the utility to the decision maker of achieving given values of performance measures in accordance with a set of rules that have been defined as rational [8–11]. The resulting objective function is thus a function of utility values, weighted by the objective priorities. The fact that performance values are achieved probabilistically when chance nodes are present will be discussed later, when the expected utility criterion is formally introduced. The notion of utility is crucial in obtaining rational solutions to decision problems. Yet, it is also absent from current sequential decision software implementations.

Continuing with the flowchart 1, four major steps are required to specify the interconnection topology of sequential decision networks, starting with decision nodes and concluding with terminal and continuation nodes. Persons familiar with the art will recognize these steps as standard in the development of probabilistic decision trees. At a more detailed level, however, two improvements must be made to the current art.

The first concerns policy preemptions, defined here as the a-priori preemption of one or more decisions represented in the decision model. Such user choices must be accommodated during program execution by proceeding without interruption on the assumption that preempted nodes are reduced to a single choice. As an extreme case, the user may preempt every decision, in which case the decision problem is solved a-priori. The second exception arises in the computation of probabilistic graphs that include reference or continuation nodes. Current technology is limited to hiding repeated sub-trees from view, and does not sufficiently exploit the computational advantages associated with sub-trees that share a topological or semantic structure.

Two final steps are required to complete the formulation of semantics. In the first step, the contributions to performance measures incurred during transitions or edge traversals are specified. The second step is used to specify the probabilities associated with transitions from chance nodes to their offspring. The art of decision making includes various methods for eliciting and encoding probabilities from decision makers [9,31,32,55]. Such methods provide various degrees of rationality in estimating the probability of chance outcomes and significantly reduce the subjective variability associated with simple guesses. Some of these methods should be integrated as standard components in any decision analysis software.

As shown in the flowchart, the construction of a Sequential Decision Model (SDM) is an iterative process where the elicitation of probabilities is often the final step. The topological structure of a SDM resides in its sequential decision network and in its objectives hierarchy, and its semantic layer is defined by its objectives with their priorities, the performance measures, the utility functions, and by the costs and probabilities associated with network edges.

Sequential decision models are typically solved by executing two procedures [2,24,27,30]. The first is a forward roll, during which forward cumulative objective function values are computed, starting at the root and ending at the leaves or terminal nodes of the network. Cumulative path probabilities and risks are also calculated during this forward procedure. The second is a backward roll, during which backward cumulative values are calculated, starting at the terminal nodes and terminating at the root. At each chance node, the second procedure performs an expected risk calculation, an expectation process where the backward value associated with each outcome is multiplied by the outcome's probability of occurrence and the resulting products are summed. At each decision node, the procedure calculates the maximum value of its choices. The overall process terminates at the root node, yielding the choice with the largest expected value, the optimal choice.

When certain model parameters are critical in the decision-making process, or when some parameters are highly subjective, ambiguous, uncertain or controversial, a sensitivity analysis is often performed to establish the extent to which variations in such parameters influence the final choice. Similar to Monte Carlo simulation experiments, such sensitivity analyses grow geometrically in the quantity of varied parameters and in the quantity of values used for each parameter. This causes a combinatorial growth in the required number of calculations, often leading to unacceptable run times. Nevertheless, every decision analysis software package should provide a capability to conduct thorough sensitivity analyses on all the important parameters of a decision problem.

Graphical User Interface

During the last decade, considerable advances have been made to improve the accessibility of decision-making software to users who, while needing assistance with their decision problems, have only limited training or experience in decision theory or computer science. Even though some applications provide improved man-machine interfaces, users must still perform many operations that should be executed in the background. Some of the leading applications [22,25,27] may still be classified as "programming languages". Such products are mostly intended for trained decision analysts and computer scientists.

A computer's principal purpose is to assist humans in solving problems. Today, in the same spirit in which personal computers were invented, a major objective in the computer research and development industry is to produce more user-friendly machines and applications. The availability of word processors has revolutionized the modern office, where professional typists are no longer required to generate written communications. Similar improvements to existing decision analysis software are needed to attract a much larger base of decision makers who are intimidated by current software products and cannot afford to employ professional decision analysts. Better Graphical User Interfaces (GUI) are needed and can be produced without compromising the range and quality of decision solutions.

Current Software Implementations

The current art contains two prominent approaches for solving probabilistic decision models, the Monte Carlo Simulation (MCS) approach, and the Direct Probability Computation (DPC) approach. The principal distinction between the two methods resides in the processing of chance nodes, and may be best understood by viewing a chance node as a random variable [1] whose values represent the node's outcomes.

The MCS procedure, as applied in [20–23], consists of a series of simulation runs, one run for every combination of statistical samples selected from the distributions associated with the chance variables and with other random parameters in the model. Several sampling methods such as Importance Sampling, Latin Squares and Hypercubes [43] have been developed to improve the computational inefficiency of brute-force MCSs. Such methods are of limited use in complex decision problems, where the time required to converge to statistically confident estimates increases geometrically in the total quantity of chance node and random factor value combinations. As an example, for k chance nodes and random factors, each having m possible values, the quantity of runs required to achieve an acceptable confidence level is typically proportional to $m^k$, a geometric increase in m.

In contrast to MCS approaches, the DPC method, as applied in [19,24–27,30], processes chance outcome probabilities directly during the computation of optimal choices. Instead of the combinatorial requirements of MCS procedures, the DPC approach requires only a single run since the expectation operation at each chance node integrates the outcome probabilities with outcome weights into a single number, and no sampling is needed. Although this aggregation hides some of the finer statistical structure of decision models, a sensitivity analysis, accompanied with the computation of risk profiles, significantly reduces the possible harmful effects of ignoring the finer structure.

The major reason for contrasting these two computational paradigms is to argue that improvements in the art should concentrate on the direct approach. Furthermore, these improvements must be implemented in stand-alone software that can be executed on a variety of computational platforms. Products such as @Risk™ [20], Precision Tree™ [19], Crystal Ball™ [23] are Microsoft Excel™ add-ons that are confined to the Excel™ interface and worksheet format. This severely limits the practicality and possibility of extending such PDT implementations to probabilistic decision networks as defined earlier.

Brief Summary of the First Embodiment

In its first preferred embodiment, the current invention's general object is to provide a method and means for assisting individuals, businesses, organizations and consultants in solving complex decision problems and performing risk analyses and risk assessments. In this disclosure, we define "Risk" as a summation of consequence-probability pairs (c, p), where c is an outcome of a chance event and p is the probability of occurrence of c. When a decision maker faces a plurality of choices and uses risk as an optimization criterion, his or her optimal choice is the choice whose selection minimizes risk. This first embodiment improves the art of decision-making software and risk analysis in a plurality of ways:

According to one aspect of the invention, a stand-alone and general-purpose software tool is provided for interactively modeling and solving sequential probabilistic decision and risk analysis problems on a variety of computational platforms. Intended for users ranging from decision scientists to applied decision problem solvers whose expertise in decision analysis or computer science may be limited, the tool is designed to include a graphical and algorithmic representation of modern decision theory as currently practiced by skilled decision analysts. It consists of several modules, each module representing a well-defined step in the modeling and solving of decision problems, and in conducting risk analyses and assessments.

Most decision problems are driven by a collection of competing objectives. Accordingly, a module of particular distinction enables users to express, structure and prioritize their objectives, and to seamlessly integrate the resulting structure with their decision model.

In accordance with another aspect of the invention, the method and means include an intuitive Graphical User Interface (GUI) whose internal engine is designed to guide users in the construction and execution of objectives hierarchies and decision models, and to relegate complex reasoning processes and calculations to another computational engine operating in the background. This is accomplished by providing the following salient features:

a. A multiple-window display where each window represents the current state of a corresponding module. The objectives hierarchy window, for instance, represents the module in which objectives are specified and structured. This window may be scrolled, zoomed, moved, hidden or brought forward. Similarly for the window representing the decision modeling module, and for a plurality of other windows.

b. Navigation means are provided for traveling through all the nodes of the objectives hierarchy and the decision model.

c. An expansion window is provided for editing decision models. This window displays an expanded view of the topology and semantics associated with any node selected in the decision model, and is especially useful when models contain a large quantity of nodes.

d. Yet another collection of windows is provided for recalling and executing previous projects, creating new projects, and displaying the computational results associated with previous projects. For two-way sensitivity analyses, means for rotating the three-dimensional risk surfaces about any of their three axes are provided as well.

e. A rich multi-level message structure is provided to further assist users in avoiding input errors, inconsistencies and contradictions, forbidden operations and resource constraint violations. Message levels range from purely advisory and instructional levels to critical levels designed to avoid catastrophic modeling or computational conditions.

According to yet another aspect of the invention, the method and means include interactive procedures for integrating, by the use of established rational procedures, the assessment and encoding of probabilities and utility functions with the construction of objective hierarchies and decision models.

In accordance with a final aspect of the invention, the software further includes means for solving decision problems involving multi-dimensional numerical, qualitative and linguistic performance measures defined on an absolute time scale, thereby further allowing the solution to dynamical and qualitative decision problems and risk analyses.

Objects and Advantages

Accordingly, to provide a more detailed specification of the advantages and contributions discussed in general terms in the above summary, several objects and advantages of the present invention are:

1. To provide a stand-alone software tool for interactively modeling and solving multi-dimensional sequential probabilistic decision and risk analysis problems on a variety of computational platforms without requiring significant user background in decision theory or in computer science.

2. To provide an improved Graphical User Interfaces (GUI) for decision makers and risk analysts using decision and risk analysis software.

3. To allow the seamless integration of the decision maker's objectives, preferences and priorities during the modeling and computational phases of the decision-solving process.

4. To provide means for applying Direct Probability Computation (DPC) methods for solving probabilistic decision problems using Sequential Decision Models (SDM), said means further providing a numerical time scale on which dynamical problems can be specified.
5. To better exploit the computational advantages inherent in models with repeated sub-graphs or sub-trees.
6. To provide means for assessing and encoding probability functions, and for integrating said assessing and encoding with the construction of decision models.
7. To provide means for assessing and encoding utility functions, and for integrating said assessing and encoding with the construction of objective hierarchies and decision models.
8. To allow unconstrained policy preemptions in the construction and computation of sequential decision models.
9. To extend one-dimensional performance measures to multi-dimensional performance measures.
10. To further extend performance measures by allowing linguistic and qualitative values, thereby eliminating current restrictions to numerical values.

Still further objects and advantages will become apparent from a consideration of the ensuing description of the invention and its operation, and from the included drawings.
Background of the Second Preferred Embodiment Since the birth of servomechanisms during the 1930s [34–42], a large body of literature has been written about the automatic control of dynamical systems and processes. During the past two decades, the size and complexity of industrial processes has increased enormously, leading to the development of hierarchical approaches with special emphasis on the control and coordination of multi-component systems [34,36,39,42,51].

Concern for the reliability, maintenance, safety, environmental and social impacts of operational systems have introduced additional complications that cannot be resolved with linear, deterministic and single-level approaches, and more powerful methods are needed. To introduce these new challenges, consider FIG. 4, where a general process control structure is represented in terms of two major levels, the process level 18 and the system level 23.

At the process level, the controlled process consists of the plant 19 and the plant regulator 20. In chemical processes, plant inputs 21 typically consist of raw products that are processed by the plant into end products shown as process outputs 22. As another example, the plant 19 may be a computer whose inputs 21 include various tasks and outputs 22 are the results of executing these tasks. Consistent with the view exhibited in FIG. 4, the plant regulator 20 embodies the control laws required to optimize parameters that are local to the process, even if the process consists of a multiplicity of widely-distributed components as would be the case when the plant is an electrical power generation and distribution network. For chemical and nuclear processes, such local parameters may include NOX, SO2 or CO emissions, maintenance and operation costs, steam waste, boiler performance, nuclear waste, local safety and reliability indices, hot water effluent and feed rates. In the control of power grids, as another example, performance parameters such as generation efficiency, line losses, reserve power, frequency of power interruptions, network interconnection and kilowatt pricing must be considered.

In contrast to the process level, the system level 23 is designed to account for issues that cannot be represented in sufficient detail using current process modeling and control methods.

These include environmental impacts and risks, equipment maintenance and replacement planning, economic and social factors, and global regulatory constraints imposed by the EPA and by the OSHA. Controls and commands at this level are thus designed to optimize higher-level and more global parameters. These commands are generated on a time scale that may be considerably larger and coarser than the scale on which local commands are executed.

As a practical example, consider a resource allocation and decision problem that arises frequently during the operation of regional electrical power generation and distribution networks. Such systems typically contain generation apparatus that produce electrical power from four basic types of fuel resources, coal, nuclear, oil, and hydroelectric. When a significant increase in demand arises at the plant input 21, and an acceptable level of service must be maintained at output 22, the system operator 24 faces several decisions in real-time. He or she must decide, for instance, whether to bring an additional generation unit of some type on line, to increase the output of one or more operating units, or to select a mixture of such policies. To simplify the example, assume that the operator's decision is constrained to increase the power output of only one type of generating unit. He must therefore choose one of the four types, and his decision may be stated as a question: which type?

Any choice based exclusively on local process criteria will almost certainly disagree with a choice derived from the higher-level considerations discussed earlier, essentially because the consequences—as measured by their utility—may vary considerably. If the operator selects to increase nuclear power production, for instance, more water coolant will be needed and more hot water effluents will be produced, increasing the risks to wildlife and fisheries. Subsequent choices about the disposal and possible re-processing of spent fuel, fuel packaging, transportation and storage must be considered, leading to yet further social and environmental impacts and consequences. If the coal alternative is selected instead, air pollution will be increased and additional waste products will be produced. Coal reserves will be reduced, leading to further choices and consequences. If the oil alternative is chosen, additional choices concerning oil exploration and well drilling will be introduced. Finally, the selection of the hydroelectric choice may reduce water supplies below acceptable levels and, in periods of drought, may incur unacceptable social and political consequences.

Persons skilled in the art of process control will recognize that the higher-level issues illustrated by our simplified example involve a sequence of decisions and consequences that may reach far into a plant's future. Considering that process command and control choices executed in the present will also produce various long-term effects that will influence these decisions and their consequences, it is imperative that current control laws be upgraded to include means for managing and controlling these effects. Referring to the first embodiment of this disclosure, this will require the use of sequential and probabilistic decision models, at least at the systems level.

Although the importance of the long-term effects exemplified above has long been recognized, the modeling and computational limitations of current control methods and software have constrained developers to provide only a rough account of these effects in their software. This important limitation in the art is due, in large part, to a fundamental incompatibility between sequential decision models and process control models. As demonstrated by the leading producers of process control software [45–49] and prominent research organizations [44], the current technology is based on the application of conventional control theory and the methods of Linear Programming, Non-linear Programming and Stochastic Programming. Probabilistic decision networks [33] and Observable Markov Processes [12, 52–54] do not fit easily into these methods, and software developers have been compelled to address the higher-level issues "off-line", either as ad-hoc management exercises, or with third-party simulation and risk analysis tools.

Accordingly, several improvements to the art of process control software are needed. First, improved real-time control laws must be designed and implemented so that the resulting control settings 19 provide a full account of higher-level performance criteria and drive the process in a direction that is globally optimal. Second, and referring to our first embodiment, the objectives structure for the plant and for the overall system should also be an integral part of the system controller. Lastly, improvements in the man-machine interface 25 must be developed to assist the system operator 24 in the real-time specification, structuring and editing of the objectives hierarchy and sequential decision models integrated within the global controller.

Summary of the Second Embodiment

In the second preferred embodiment, a general object of the current invention is to upgrade current process control software by providing a method and graphically interactive means to account for sequential decisions arising at the process level and at the systems level.

According to one aspect of the second embodiment, a method is provided for modeling and solving sequential process control decisions on-line, as an integral step in the real-time formulation and execution of process control commands.

In accordance with another aspect of the invention, the method and means include an intuitive Graphical User Interface (GUI) whose internal engine is designed to guide users in the construction and execution of objectives hierarchies and decision models, and to relegate complex reasoning processes and calculations to another computational engine operating in the background. This is accomplished by providing the same salient features as were listed in the summary of the first embodiment. The remaining aspects are the same as those listed in the summary of the first embodiment.

Objects and Advantages of the Second Embodiment

Accordingly, and to provide a more detailed specification of the advantages and contributions discussed in general terms in the above summary, several objects and advantages of the second embodiment are:

a. To provide a method and graphically interactive means to account for sequential probabilistic decisions arising at the process level and at the systems level.

b. To provide a method and means for estimating, from on-line process measurements, the probabilities associated with chance nodes, and for including the probabilities in the decision model.

c. To provide a method and means for deriving, from process measurements, the values of performance measures at every node of the decision model, and for including these values in the model.

d. All the objects and advantages of the first embodiment of the current invention.

BRIEF DESCRIPTION OF THE DRAWINGS

This patent disclosure contains 49 drawings, each drawing shown on a separate page. The first nine (9) are black-and-white drawings, and the remaining forty (40) are shown in color. On a computer, the colored drawings will be best displayed if a color depth of at least 16 bits is used, although a satisfactory rendering will be provided if only 256 colors are available.

Straight lead lines are used throughout. For colored drawings, reference numbers are shown on a white background, and without encirclement. An arrowhead is attached to a lead line to indicate an entire section, an entire graph, an entire window, or a group of elements or components towards which the lead line points. References without lead lines are used to indicate the entire window or graph within which they reside.

REFERENCE NUMERALS IN DRAWINGS

Figure 1:
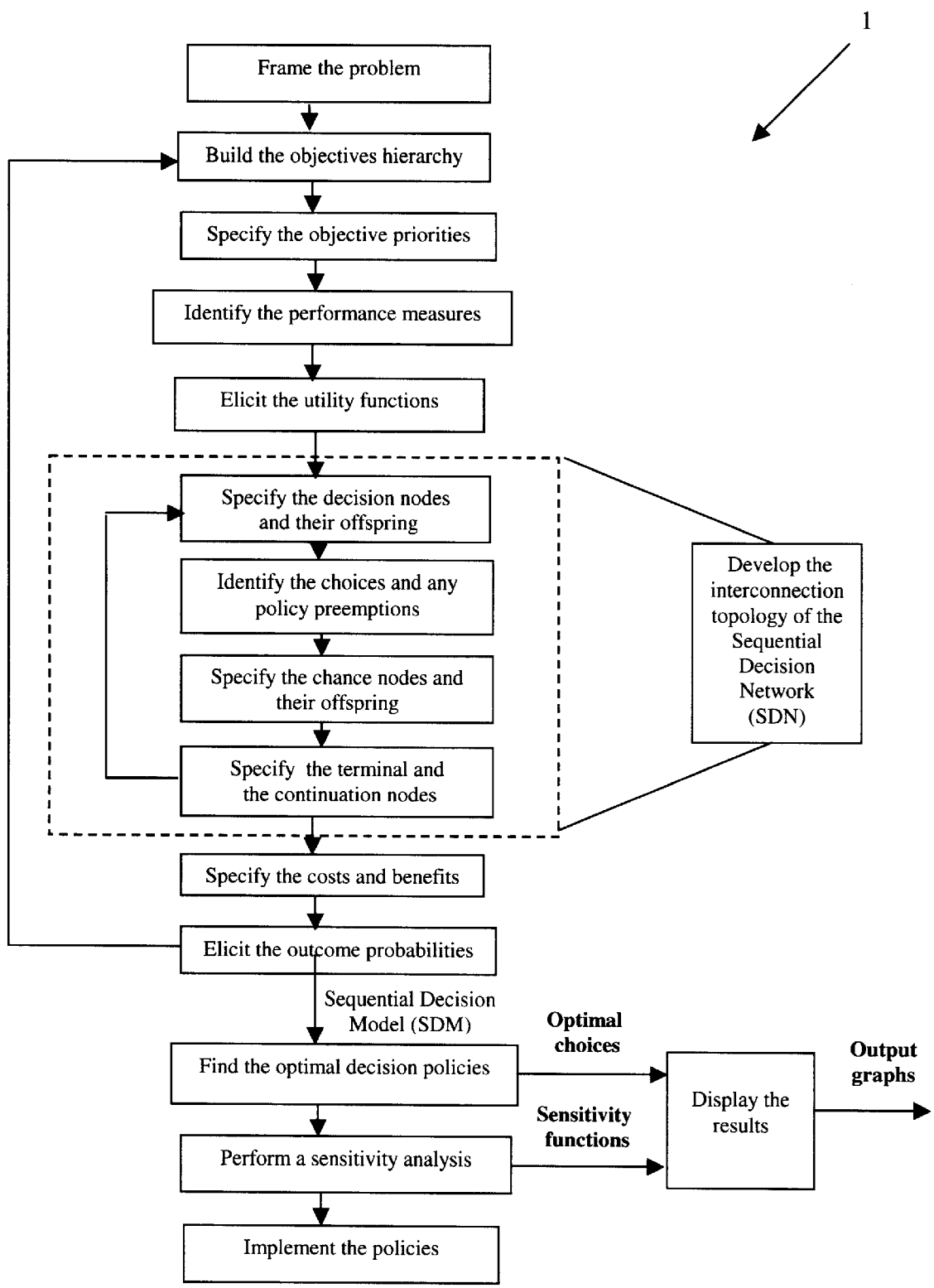
FIG. 1 is a simplified flowchart of the decision analysis process associated with both embodiments of the present invention.

This disclosure uses straight lead lines throughout. For colored drawings, reference numbers are shown on a white background, and without encirclement. An arrowhead is attached to a lead line to indicate an entire section, an entire graph, an entire window, or a group of elements or components towards which the lead line points. References without lead lines are used to indicate the entire window or graph within which they reside.

| | | | |
|---|---|---|---|
| 1 | Flowchart of the decision process | 2 | Topological PDG structure |
| 4 | A decision node | 5 | A chance node |
| 6 | A terminal node | 7 | A reference or continuation node |
| 8 | A chance choice in a PDG | 9 | A terminal outcome in a PDG |
| 10 | A terminal choice in a PDG | 12 | An objectives hierarchy |
| 14 | A principal objective | 15 | A sub-objective |
| 16 | An edge in the objectives hierarchy | 18 | A process level |
| 19 | A plant | 20 | A plant regulator |
| 21 | Process inputs to a plant | 22 | Process outputs from a plant |
| 23 | A systems level | 24 | A system operator |
| 25 | An operator's graphical interface | 26 | A system controller |
| 27 | System measurement apparatus | 28 | Measurement path |
| 29 | Command communication path | 30 | User of the invention |
| 31 | Plurality of user interface apparatus | 32 | Invention hardware |
| 33 | Computer platform | 34 | Invention and platform combined |
| 36 | Plurality of accessible external devices | 38 | Platform operating system |
| 39 | Problem specification input | 40 | Optimal choice output |
| 41 | Project file structure | 42 | Executive of the invention |
| 43 | Computation engine of the invention | 44 | Utility subroutines |
| 45 | Major software components of the invention | 46 | All software applications |
| 47 | Entire computer software arrangement | 48 | A project module hierarchy |
| 49 | A high-level flowchart of the invention | 50 | Procedure showing all projects |
| 51 | Procedure for specifying project attributes | 52 | Exit when a utility is called |
| 53 | Another exit when a utility is called | 54 | Procedures for executing modules |
| 55 | A process level | 56 | A system level |
| 57 | A process plant | 58 | Process inputs line |
| 59 | Process outputs line | 60 | A plant regulator |
| 62 | A system controller | 64 | A system operator |
| 66 | An operator's graphical interface | 67 | Plant control outputs line |
| 68 | System measurement apparatus | 69 | Probability communication link |
| 70 | Performance value communication link | 71 | Chance outcomes link |
| 72 | Performance measure values link | 74 | Probability estimation apparatus |
| 76 | Performance estimation apparatus | 82 | Operator command procedures |

-continued

| | | | |
|---|---|---|---|
| 84 | Process measurement procedures | 85 | Updating the process model |
| 86 | Process model execution | 87 | Performance estimation |
| 88 | Probability estimation from the model | 90 | Including performances |
| 92 | Including probabilities in model | 93 | Solve for the next choice |
| 94 | Solve the process decision problem | 96 | Send optimal commands |
| 100 | Project name column | 101 | Project keyword column |
| 102 | Project creation date and time | 103 | Project computer storage path |
| 104 | Control button for creating new project | 106 | Button for opening a project |
| 108 | New project name entry textbox | 110 | New project keyword entry box |
| 112 | Overall project comment entry textbox | 114 | Button for opening project |
| 116 | Button for copying selected project | 118 | Button for deleting project |
| 120 | Selection cancellation button | 122 | Selection exit button |
| 124 | Objectives hierarchy graph window | 125 | Decision model graph window |
| 126 | Top-level toolbar for the invention | 127 | Objectives hierarchy window |
| 128 | Objectives module selection button | 130 | Performance module button |
| 131 | Objectives editing control button | 132 | Utility functions module button |
| 133 | Objectives removal control button | 134 | Decision modeling module button |
| 135 | New top objective control button | 136 | Decision problem solving module |
| 137 | Objectives hierarchy translation button | 138 | Decision analysis module button |
| 139 | New objective insertion button | 140 | Help button |
| 142 | Project exit button | 144 | Application exit button |
| 146 | Top-level menu structure for the invention | 148 | Principal status bar |
| 150 | Objectives hierarchy graph window | 152 | A selected objective |
| 154 | Objectives graph zooming control box | 156 | Selected objective name textbox |
| 158 | Objective performance measure textbox | 160 | Selected objective sub-hierarchy |
| 162 | Textbox for adding sub-objectives | 164 | Textbox for entering comments |
| 166 | Decision model graph window | 168 | A selected objective |
| 170 | An objective priority value | 172 | A partial objectives hierarchy |
| 174 | Objective removal control button | 176 | Sub-hierarchy removal button |
| 178 | Root of moved sub-hierarchy | 180 | Move-to-right button selected |
| 182 | Two-positions move specified | 184 | One-position-down specified |
| 186 | Supreme objective | 188 | Root of moved sub-hierarchy |
| 190 | Objective before new parent insertion | 192 | Insertion edge |
| 194 | Parent of objective before insertion | 196 | Inserted objective naming textbox |
| 198 | Associated measure naming textbox | 200 | Inserted objective |
| 202 | Window where measures are selected | 204 | Row of the selected measure |
| 206 | Previously selected measure row | 208 | Associated performance measure |
| 210 | Selected performance measure name | 212 | Measure specification controls |
| 214 | List box showing linguistic measure values | 216 | Parameter specification textboxes |
| 218 | Textbox for entering measure comments | 220 | Selected performance measure |
| 222 | Specify measure value where utility is zero | 224 | Specify max utility measure value |
| 226 | Textbox for entering utility comments | 227 | Selected performance measure |

-continued

| | | | |
|---|---|---|---|
| 228 | Toolbar for specifying utility functions | 229 | Linear function selection button |
| 230 | Exponential function selection button | 231 | Piece-wise linear selection button |
| 232 | Mathematical function selection button | 233 | Start objective prioritization |
| 234 | Default piecewise-linear utility function | 235 | Showing the assessed utilities |
| 236 | Utility assessment method window | | |
| 238 | X-cursor used to specify break points | 240 | Y-cursor to specify break points |
| 242 | Breakpoint entry command button | 244 | Previously-entered breakpoint |
| 246 | Button for allowing additional breakpoints | 248 | Midsection method work space |
| 250 | Y-cursor for specifying midsection point | 252 | X-cursor for mid-section points |
| 254 | A boundary point of the work space | 256 | New midsection candidate point |
| 258 | Midsection candidate entry button | 260 | Result of entering candidate point |
| 262 | Button for allowing additional points | 264 | Mathematical function window |
| 266 | The application's View menu | 268 | A parent objective |
| 270 | Immediate sub-hierarchy of the parent | 272 | Sub-objective names column |
| 274 | Sub-objectives ranking column | 276 | Sub-objectives weights column |
| 278 | Sub-objectives normalized weights column | 280 | Normalized prioritization button |
| 282 | Button for additional prioritizations | 284 | Decision model window |
| 286 | Decision model editing tool button | 288 | Sub-model removal tool button |
| 290 | New root insertion tool button | 292 | Sub-graph translation tool button |
| 294 | Node insertion tool button | 296 | Sub-graph replication tool button |
| 298 | Outcome probability specification button | 300 | Model comments entry textbox |
| 302 | Objectives hierarchy window | 304 | Decision model zooming control |
| 306 | Terminal node selected for expansion | 308 | Selected node name editing box |
| 310 | Textboxes for specifying new node type | 312 | Additional offspring quantity box |
| 314 | Decision node selected for editing | 316 | Choice name editing textbox |
| 318 | Cost and benefit specification textbox | 320 | Expanded editing box |
| 322 | Root node of selected sub-graph | 324 | Root node selected previously |
| 326 | Sub-graph selected for translation | 328 | Right-translation selected |
| 330 | One-level translation selected | 332 | Translation button |
| 334 | Result of the one-level translation | 336 | Cost and benefit textbox selected |
| 338 | Expansion of the selected textbox | 340 | Performance names column |
| 342 | Performance measure units column | 344 | Costs and benefits column |
| 346 | Textbox for editing selected cell entries | 348 | Outcome probability entry box |
| 350 | Cost and probability entry button | 352 | Cost and probability window |
| 354 | Probability entry textbox selected | 356 | Probability help window |
| 358 | Expansion of the selected textbox | 360 | Probability help choices |
| 362 | Probability entry textbox selected | 364 | Probability wheel window |
| 366 | Probability complement area | 368 | Probability of occurrence area |
| 370 | Slider for specifying the probability | 372 | Value of the specified probability |
| 374 | Title of the general data entry window | 375 | Probability entry textbox |
| 376 | Expanded textbox for editing cell entries | 377 | Auxiliary variable name column |
| 378 | Node reference specification column | 379 | Auxiliary variable value column |
| 380 | Auxiliary variable units column | 381 | General data entry table |
| 382 | Command to enter the general data | 384 | Computation name entry box |
| 386 | Root node specification textbox | 388 | Solution mode specification panel |
| 390 | Policy specification panel | 392 | Risk profile specification panel |
| 394 | Computation progress bar | 396 | Computation start control button |
| 398 | Performance measure name display | 400 | Measure initialization textboxes |
| 402 | Initialization entry command button | 404 | Next measure initialization button |
| 406 | Decision problem solution display panel | 408 | Risk profile of the solution |
| 410 | Solution procedure command buttons | 412 | The optimal choice |
| 414 | Expanded graph of the risk profile | 416 | A risk profile density value bar |
| 418 | Another risk profile density value bar | 420 | Risk profile distribution |
| 422 | Panel for specifying computation types | 423 | Computation names list box |
| 424 | Computation type panel controls | | |
| 426 | Policy specification panel | 428 | Lists of sensitivity variables |
| 430 | Panel for specifying first variable type | 432 | Variable type specification panel |
| 434 | Two computation progress bars | 436 | Current variable value displays |
| 438 | Expanded view of the 3-d risk profile | 440 | Rotation and perspective controls |
| 442 | Original view of the 3-d risk profile | 444 | Reduced Tornado diagram |
| 446 | Lists for specifying Tornado variables | 448 | Parameter definition panel |
| 450 | Limits of the Tornado variables | 452 | Tornado diagram excursion bars |
| 454 | Tornado computation control buttons | | |

Cited References

1. Clemen, Robert T. (1991). *Making hard decisions*. Duxbury Press, Belmont, Calif.
2. Russell, Stuart J., and Peter Norvig (1995). *Artificial Intelligence: A Modern Approach*. Prentice-Hall, Upper Saddle River, N.J.
3. Pearl, Judea (1988). *Probabilistic Reasoning in Intelligent Systems*. Morgan Kaufmann Publishers, Inc., San Mateo, Calif.
4. Sage, Andrew P. (1977). *Methodology for Large-Scale Systems*. McGraw-Hill, New York, N.Y.
5. Roberts, Fred S. (1979). *Measurement Theory with Applications to Decision Making, Utility, and the Social Sciences*. Addison-Wesley, Reading, Mass.
6. Rowe, William D. (1977). *An Anatomy of Risk*. Wiley-Interscience, New York, N.Y.
7. Holtzman, Samuel (1989). *Intelligent Decision Systems*. Addison-Wesley, Reading Mass.
8. Luce, R Duncan, and Howard Raiffa (1957). *Games and Decisions*. John Wiley and Sons, Inc., New York, N.Y.
9. Keeney, Ralph L., and Howard Raiffa (1976). *Decisions with Multiple Objectives*. John Wiley and Sons, Inc., New York, N.Y.
10. Keeney, Ralph L. (1992). *Value-Focused Thinking*. Harvard University Press, Cambridge, Mass.
11. Fishburn, Peter C. (1970). *Utility Theory for Decision Making*. John Wiley and Sons, New York, N.Y.
12. Gheorghe, Adrian (1982). *Applied Systems Engineering*. Wiley-Interscience, New York, N.Y.

13. Saaty, Thomas L. (1980), *The Analytic Hierarchy Process*. McGraw-Hill, New York, N.Y.
14. Hillier, Frederick S., and Gerald Lieberman (2000). *Operations Research*. Holden-Day, Inc., San Francisco, Calif.
15. Haddawy, Peter (1999). *An overview of some recent developments in Bayesian Problem-Solving Techniques*. AI Magazine, Volume 20, Number 2, AAAI, Menlo Park, Calif.
16. D'Ambrosio, Bruce (1999). *Inference in Bayesian Networks*. AI Magazine, Volume 20, Number 2, AAAI, Menlo Park, Calif.
17. Wagner, Harvey M. (1969). *Principles of Operations Research*. Prentice Hall, Englewood Cliffs, N.J.
18. Krantz, David H., et al (1971). *Foundations of Measurement*. Academic Press, New York, N.Y.
19. Palisade Corporation (2001). *Precision Tree*. Palisade Corporation, Newfield, N.Y.
20. Palisade Corporation (2001). *@Risk*. Palisade Corporation, Newfield, N.Y.
21. Palisade Corporation (2001). *Risk Optimizer*. Palisade Corporation, Newfield N.Y.
22. Lumina Decision Systems (2001). *Analytica Version 2.0*. Lumina Decision Systems, Los Gatos, Calif.
23. Decisioneering, Inc. (2001). *Crystal Ball*. Decisioneering, Inc., Decisioneering, Inc., Denver Colo.
24. TreeAge Software Corporation (2001). *Data Version 3.5.7*. TreeAge Software Corporation, Boston, Mass.
25. Vanguard Software Corporation (2001). *Decision Pro Version 3.0*. Vanguard Software Corporation, Cary, N.C.
26. Logical Decisions, Inc. (2001). *Logical Decisions for Windows* (LDW). Logical Decisions, Inc., Golden, Colo.
27. Applied Decision Analysis, Inc. (2001). *DPL: A Decision Programming Language*. Menlo Park, Calif.
28. Druzdzel, Marek J. (1998). *Decision Analysis Software*. Decision Analysis Society, Pittsburgh, Pa.
29. Sauter, Vicki L. (1998). *Decision Support Systems Software*. University of Northern Iowa, Cedar Falls, Iowa.
30. SDG Decision Systems (2001). *SuperTree*. SDG Decision Systems, Menlo Park, Calif.
31. Edwards, Ward. (1977). *How to Use MAU Analysis*. IEEE Transactions on Systems, Man and Cybernetics, Vol. 7, pp. 326–340.
32. Edwards, Ward, and J. R. Newman (1986). *Judgment and Decision Making*. Cambridge University Press, Cambridge Mass.
33. Ahuja, Ravindra K., et al (1993). *Network Flows*. Prentice-Hall, Englewood Cliffs, N.J.
34. *IEEE Transactions on Automatic Control*
35. *SIAM Journal on Control and Optimization*
36. Mesarovic, M. D., et al (1970). *Theory of Hierarchical, Multilevel Systems*. Academic Press, New York, N.Y.
37. *IEEE Transactions on Systems, Man and Cybernetics*
38. *Proceedings of the IEEE*
39. *IEEE Transactions on Power Apparatus and Systems*
40. *Automation*
41. *Management Science*
42. *Transactions of the ASME*
43. Montgomery, Douglas C. (1976). *Design and Analysis of Experiments*. John Wiley and Sons, New York, N.Y.
44. The University of Michigan IMPACT Group (2001). *Impact*. U. of M., Ann Arbor, Mich.
45. Honeywell Inc, Industrial and Automation Division (2001). *PlantScape*. Honeywell, Inc., Phoenix, Ariz.
46. Siemens AG (2001). *SIMATIC PCS 7*. Siemens AG, Citicorp Center, New York, N.Y.
47. ControlSoft, Inc. (2001). *Mantra NT*. ControlSoft Inc., Cleveland Ohio.
48. Power Technology (2001). *PROATES, VISTA, LEO*., Powergen, UK.
49. Westinghouse Process Control, Inc. (2001). *SmartProcess*™. Westinghouse Corporation, Pittsburgh, Pa.
50. Kirkwood, Craig W. (1997). *Strategic Decision Making*. Duxbury Press, Belmont, Calif.
51. *IEEE Transactions on Reliability*
52. Pearl, Judea (2000). *Causality*. Cambridge University Press, Cambridge, Mass.
53. Bertsekas, Dimitri P., and John N. Tsitsiklis (1989). *Parallel and Distributed Computation*. Prentice-Hall, Englewood Cliffs, N.J.
54. Bertsekas, Dimitri P. (1987). *Dynamic Programming: Deterministic and Stochastic Models*. Prentice-Hall, Englewood Cliffs, N.J.
55. Morgan, M. Granger, and Max Henrion (1995). *Uncertainty: A Guide to Dealing with Uncertainty in Quantitative Risk and Policy Analysis*. Cambridge University Press, Cambridge, Mass.
56. Goodwin, Paul, and George Wright (1991). *Decision Analysis for Management Judgment*. John Wiley and Sons, New York, N.Y.

DETAILED DESCRIPTION OF THE INVENTION

Overview

In both its first and second preferred embodiment, decision problems are implemented and solved in general agreement with the current art of decision-making, as outlined in the diagram of FIG. 1. In the following sections, each block in this general diagram will be expanded in order to demonstrate the specific and distinctive objects and advantages of our invention relative to the current art.

Figure 5:
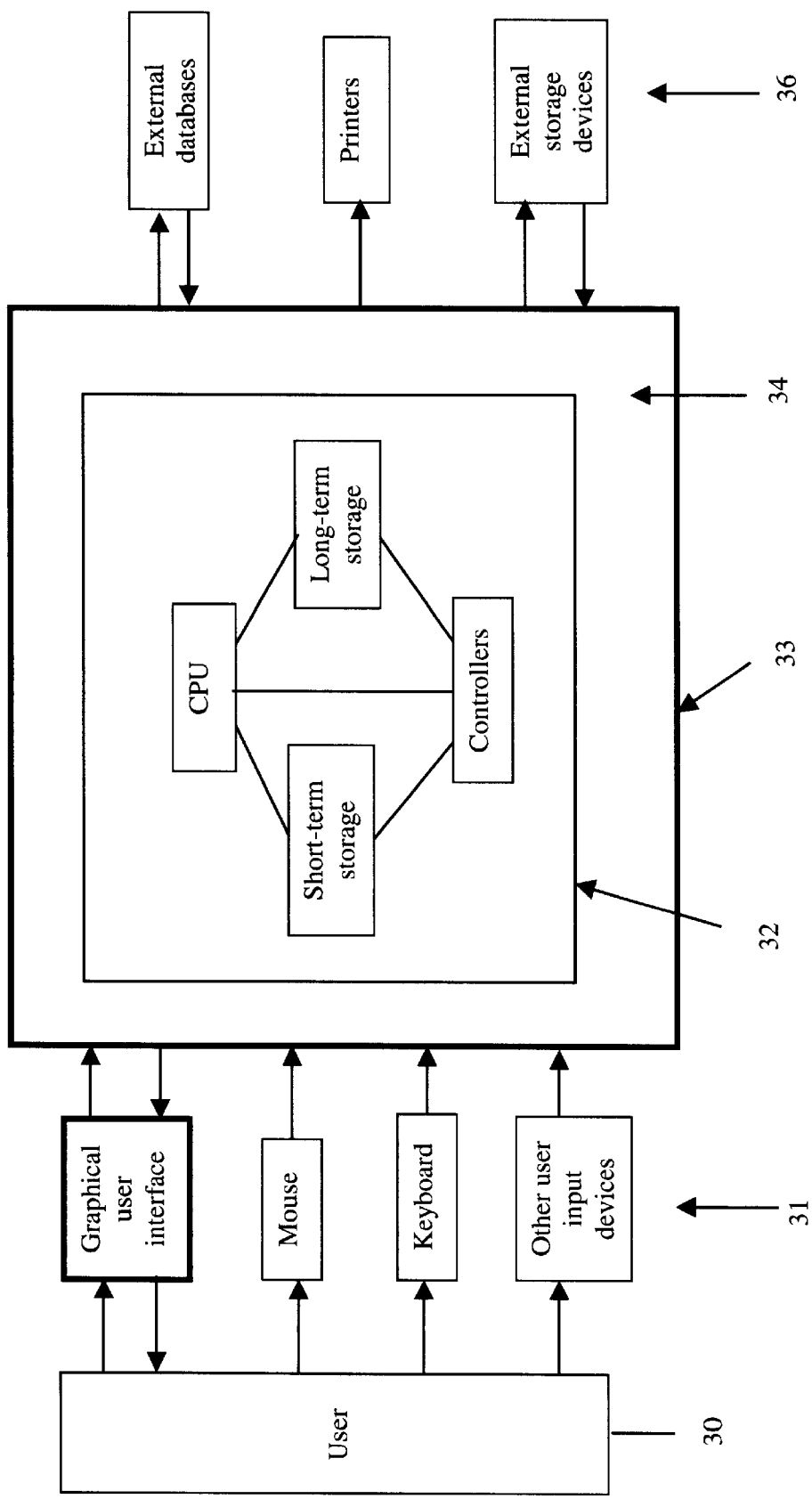
FIG. 5 shows the hardware configuration of the first preferred embodiment.

FIG. 5 depicts a typical interconnection of the major apparatus and hardware components suitable for implementing and exercising an exemplary physical realization of the method disclosed herein. The computer 33 contains a plurality of hardware components 34, including four major subsystems 32 required to execute the method, a Central Processing Unit (CPU), long-term data storage, short-term data storage (typically a Random-Access Memory (RAM)), and a set of controllers for managing the physical components.

In its current implementation, the method is designed to run as a stand-alone application on a personal computer operating under Windows 95, Windows 98, Windows NT 4.0 (Service Pack 3 or higher), Windows 2000 and the new Windows XP currently in Beta 2 testing, and requires at least 15 MB of physical memory such as RAM and 25 MB of hard disk space.

During its installation, the method's software is loaded into long-term storage. During start-up, the decision-solving engine and the GUI management engine are loaded into short-term memory, in accordance with conventional procedures. When the application is closed, user inputs and computational results saved by the user 30 during run-time are transferred to long-term storage, together with other project data. Input data for the method are entered by the user 30 into the computer 33 with input and monitoring devices 31, or by retrieving data from external storage devices, printers and databases in the set 36 of external resources.

Of particular distinction among the input and monitoring devices 31 is the GUI, whose design provides significant improvements over the current art. These improvements will be discussed in detail below.

Figure 6:
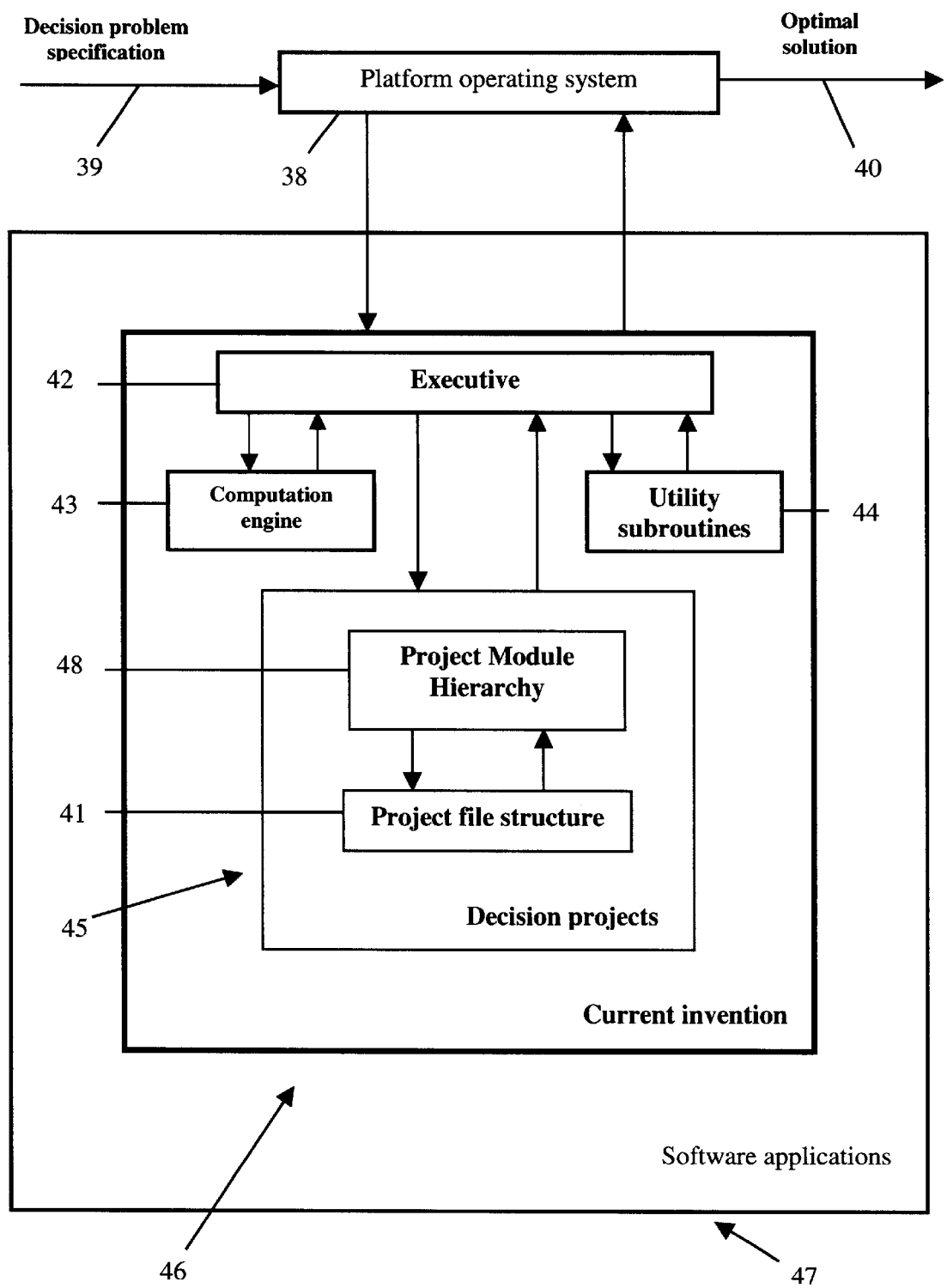
FIG. 6 provides a general view of the software configuration of the first embodiment.

FIG. 6 depicts a high-level diagram of a typical structure suitable for implementing and exercising an exemplary software realization of the method. The structure accepts decision problem specifications 39 as inputs, and produces optimal solutions 40 at its output.

As currently implemented, the invented software 46 is installed as one of a plurality of applications 47 that are executed under a common operating system 38 such as Windows 95, Windows 98, Windows NT with Service Pack 3 or greater, Windows 2000, and the new Windows XP currently in Beta 2 testing. Developed with Visual Basic 6, the software is a stand-alone application requiring only minor modifications to run successfully on other operating systems such as the Apply OS and UNIX.

Figure 2:
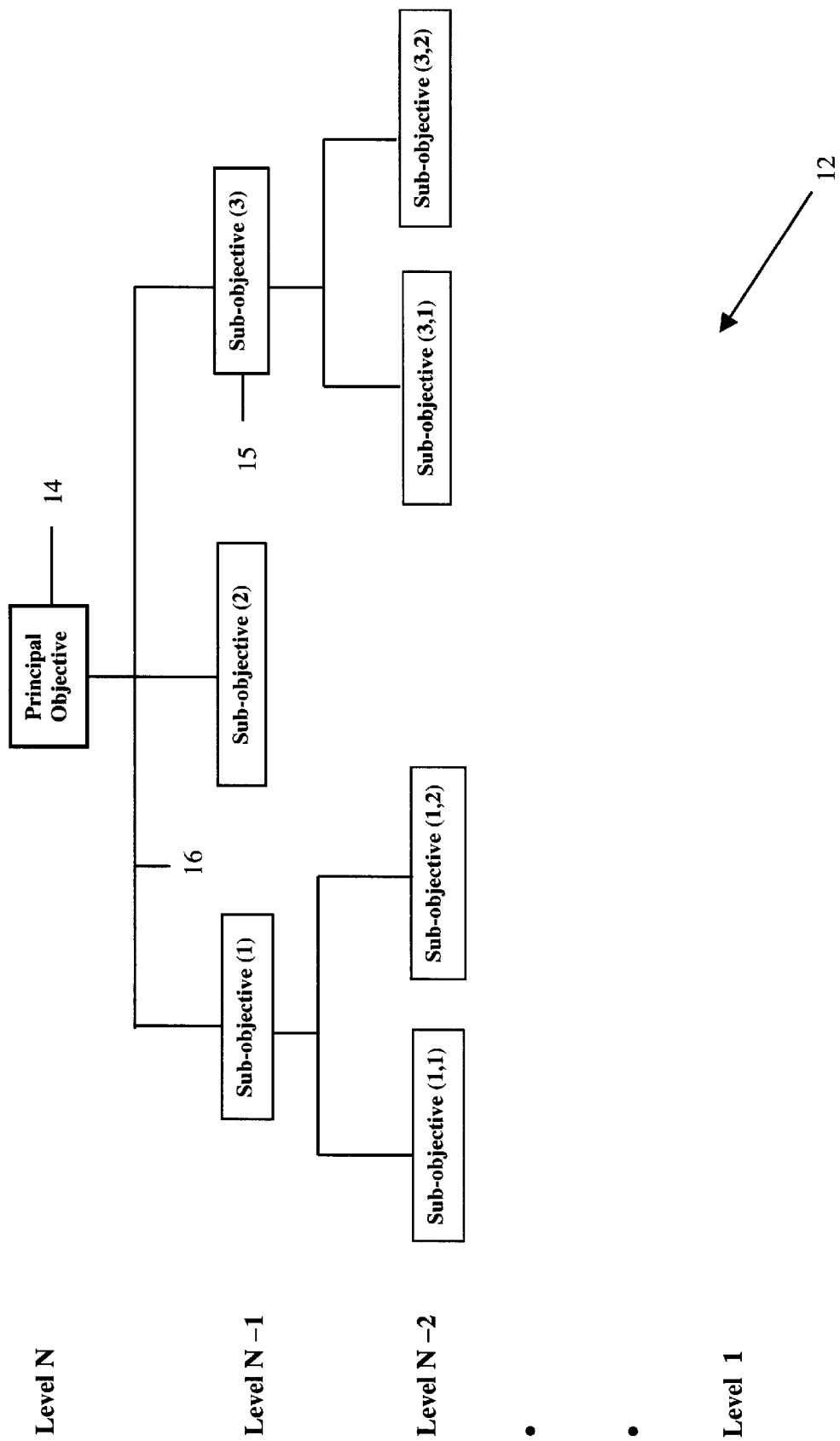
FIG. 2 is a generalized example of an objectives hierarchy.
Figure 3:
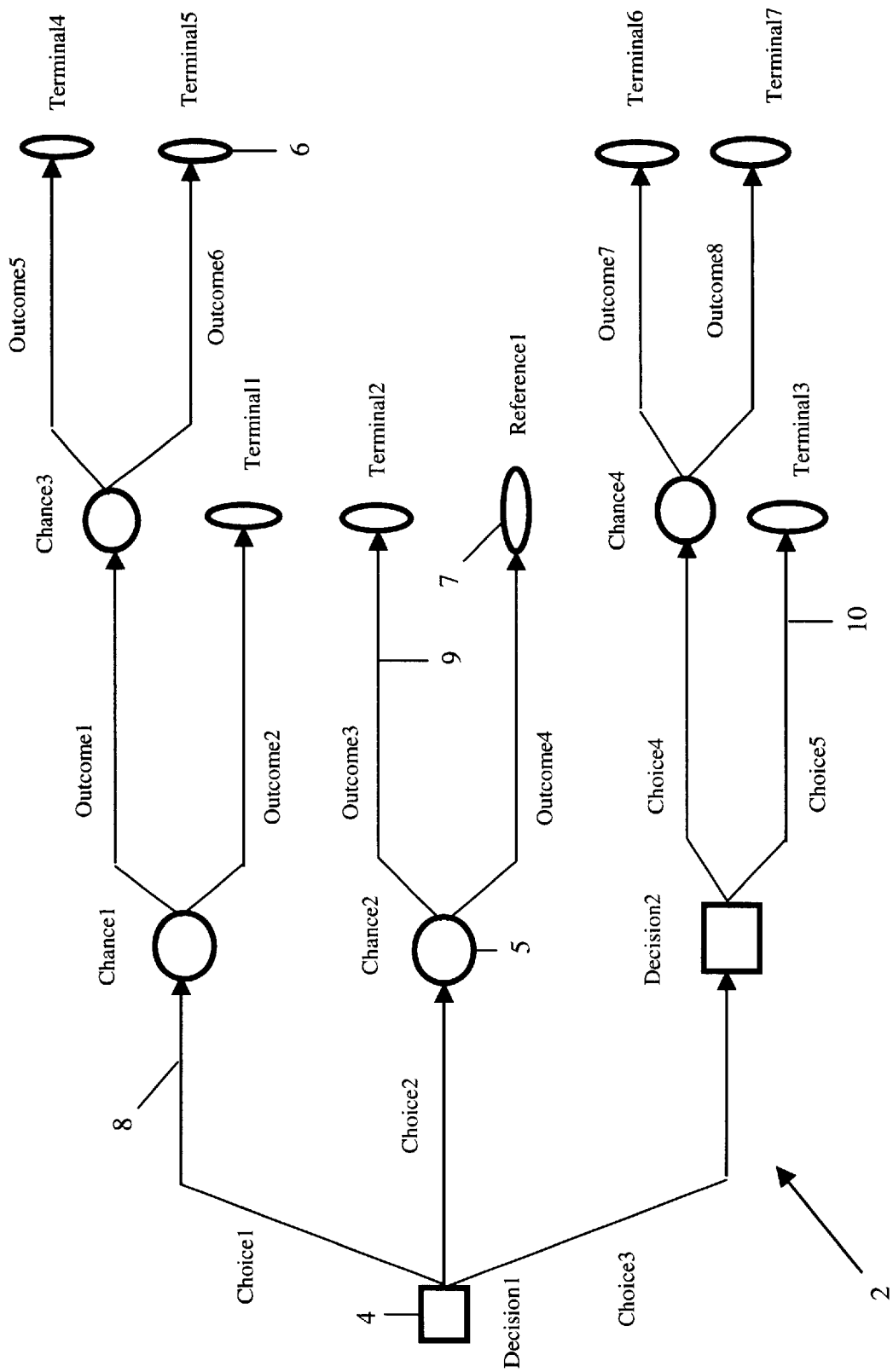
FIG. 3 illustrates the topological structure of a simple Probabilistic Decision Graph (PDG). When continuation nodes are removed, the PDG is a Probabilistic Decision Tree (PDT).
Figure 4:
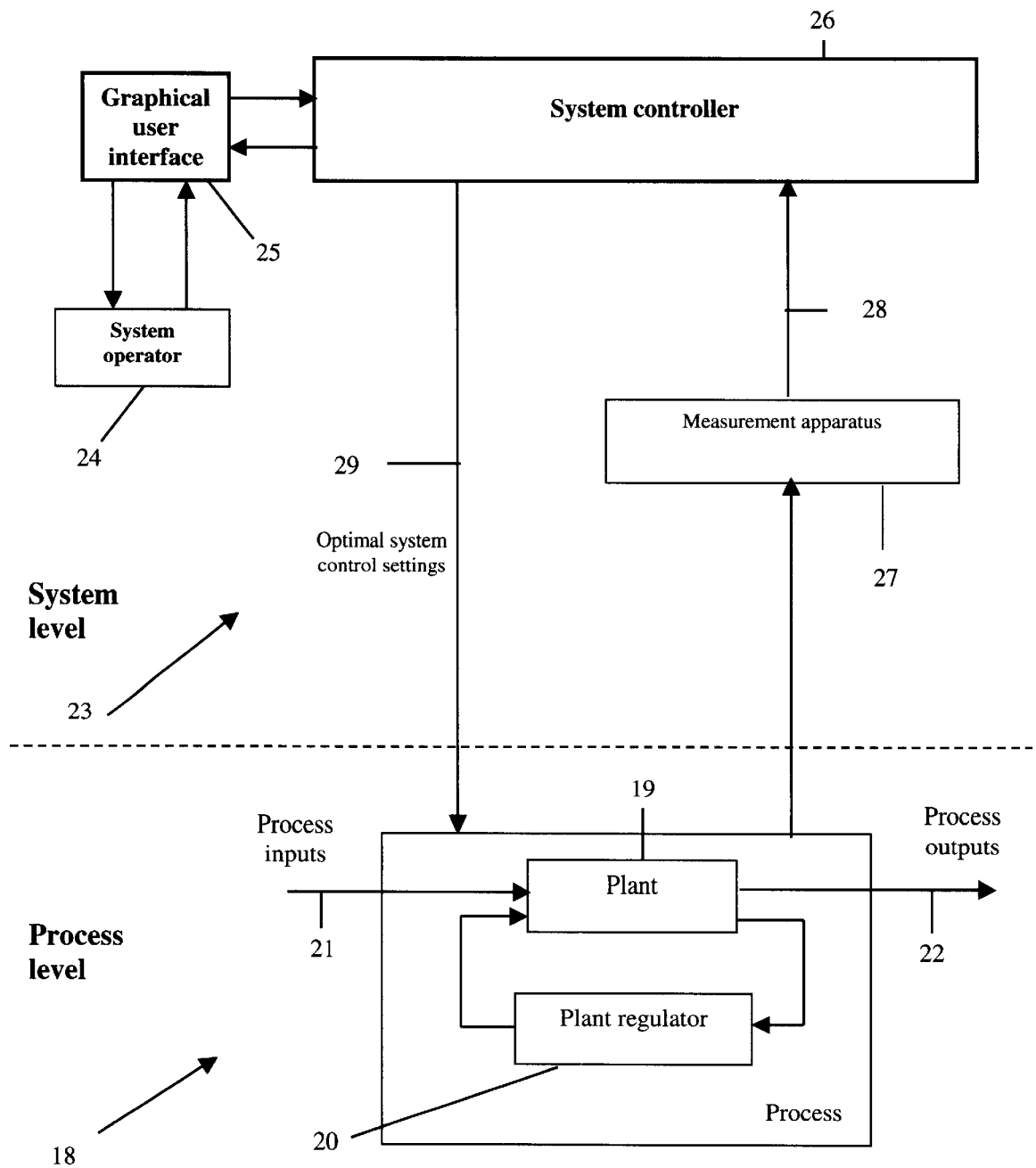
FIG. 4 is a block diagram of a generic multi-level process controller used as a starting point for the second preferred embodiment of the current invention.

The method comprises its own executive 42 designed to manage three major macro-modules, the Project Module 45, the Decision Solver Module 43, and the Utilities Module 44. The file structure 41 in the Project Module 45 is organized as a hierarchy 48, much like the Objectives Hierarchy of FIG. 2, with macro-files and macro-subroutines at the top level, and micro-files and subroutines at the bottom level.

Decision problems submitted by the user are solved in the Decision Solver Module 43. This module consists of a collection of subroutines, each subroutine called to complete a step in solving a given decision problem. Forward and Backward Roll, cycle searches and user and computational error checking are typical operations performed in that module.

A plurality of standard and custom user-support routines are built into the Utilities Module 44. Standard routines include printing, copying, deleting, retrieving and saving tools. Custom routines provide sophisticated capabilities such as the scrolling, zooming and rotating of graphs, and the retrieval, display and execution of previous projects.

Figure 7:
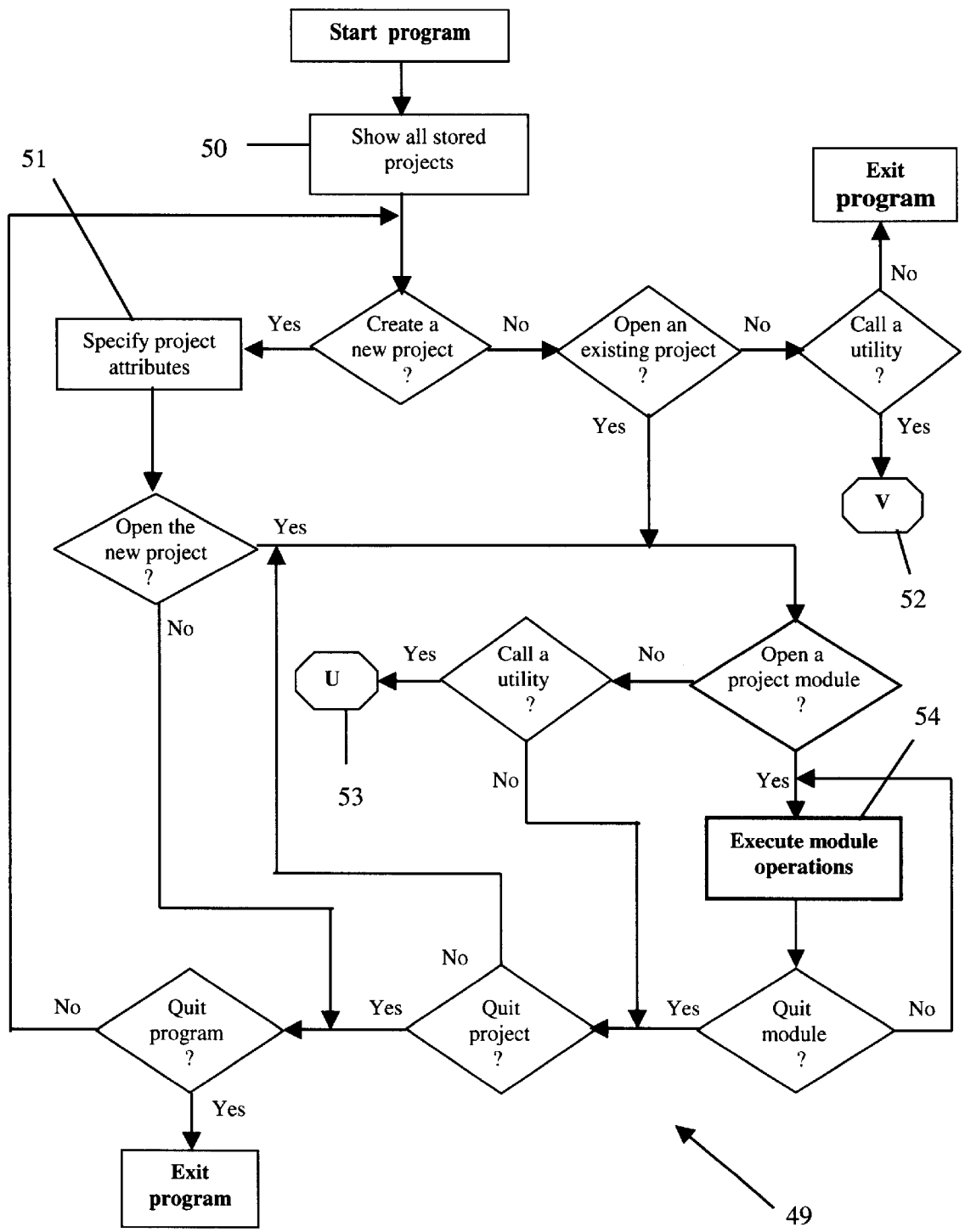
FIG. 7 is a flowchart of the method, in accordance with the first embodiment of the current invention, for creating and executing the projects and software modules required to solve probabilistic and sequential decision problems.

A condensed flowchart 49 of the invention is shown in FIG. 7. After the introductory splash screen fades away, the first screen displays the project window, where all previously stored projects 50 are shown. The user can then either open an existing project, or create a new one. The first step in creating a new project consists of specifying project attributes 51 such as the project name and keyword, and the intended hard disk location where the project will be saved. When a project is opened for further analysis, the user must either select to open one of the invention's solver modules, or call a utility routine 53 to perform such functions as printing, zooming, scrolling, and so on. Some utilities are not relevant prior to opening a project, and a reduced set 52 of utilities may be called by the user before opening a project. A detailed implementation of Chart 49 and of the execution 54 of opened modules will be presented in Subsection 3 below, where the invention is reduced to practice by solving a challenging decision problem.

With reference to the second preferred embodiment, the software of the invention is integrated at the system level 23, within the System Controller 26. Whereas this integration requires a close collaboration with plant 57 and regulator 60 experts, the important man-machine operations and the modeling and computational procedures for this second embodiment are similar to those of the first embodiment. In the broader context of process control, however, some additional methods, procedures and apparatus are needed. Referring to the system-level hardware 56 depicted in FIG. 8, two hardware components 74 and 76 must be added to the hardware 23 used in the current art in order to adapt the invention for process control purposes. This adaptation process is discussed in greater detail in Subsection 3 below.

While the present invention is described with reference to two preferred embodiments thereof, those skilled in the arts of decision-making and process control will know of various changes in form and structure that may be made without violating the scope and spirit of the claimed invention as recited in the appended claims.

The First Preferred Embodiment

Figure 10:
FIG. 10 shows the splash screen that is displayed to the user when the first embodiment of the current invention is started.
Figure 11:
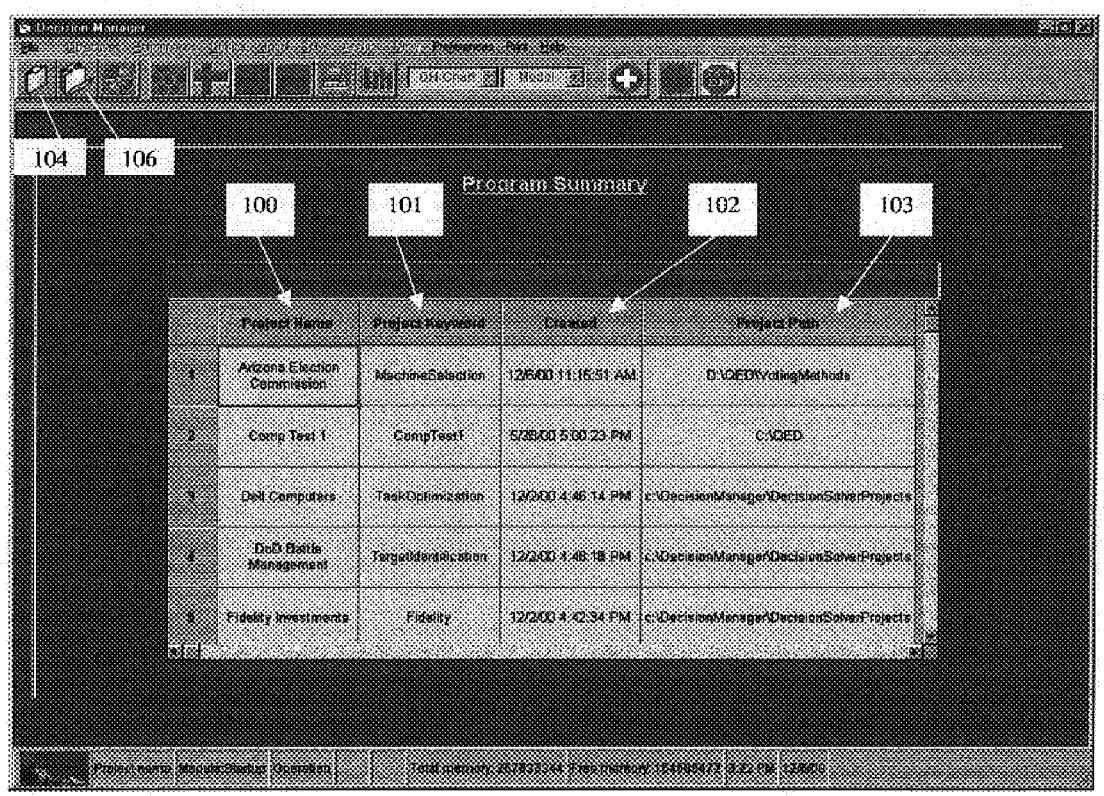
FIG. 11 is the first window displayed after the splash screen closes. This window provides a report of all the decision analysis projects currently stored on the user's computer and lists their name, keyword, creation date and location in memory.

An exemplary application of this embodiment solves a simplified version of a voting machine selection problem. The problem was motivated by a multitude of mechanical, electronic, software and human factor voting difficulties observed by several state and county election commissions during recent elections. Some of these commissions have launched projects to improve the reliability, accuracy and friendliness of voting machines, and several concepts have been proposed. This section provides a step-by-step description of the method and means by which an optimal voting machine choice is found with the current invention. It explains how the user interacts with the GUI of the invention to specify the selection problem, the desired analyses, and to open his or her choice of windows for displaying the objectives hierarchy, the decision model, and the computational results associated with the optimal machine choice. The current invention is both icon-actuated and menu-driven in the sense that every operation can be initiated either by clicking an appropriate icon control button on some toolbar, or by selecting a menu from some corresponding drop-down menu list. The correspondence between icon control buttons and menus is specified in accordance with standard procedures in the art of graphical interface design, and only the actuation of control buttons will be described when the correspondence should be obvious to persons trained in the art. The description proceeds in conformity with the seven major modules of the current invention:

1. The Project Module
2. The Objectives Hierarchy Module
3. The Performance Measures Module
4. The Utility Functions Module
5. The Decision Modeling Module
6. The Solver Module
7. The Analysis Module The Project Module The splash screen shown in FIG. 10 is the first window displayed when the user starts the invention. Immediately after the splash screen fades away, the Project Window of FIG. 11 appears and displays the Program Summary Table where essential attributes of up to 16,000 previously-stored projects are displayed in four columns, the Project Name column 100, the Project Keyword column 101, the Project Creation Time column 102 and the Project Location Path column 103. Two major operations are enabled in the project window. The first initiates the creation of a new project, and is activated by clicking Icon 104. The second initiates the retrieval of a project stored previously, and is activated by clicking Icon 106.

Figure 12:
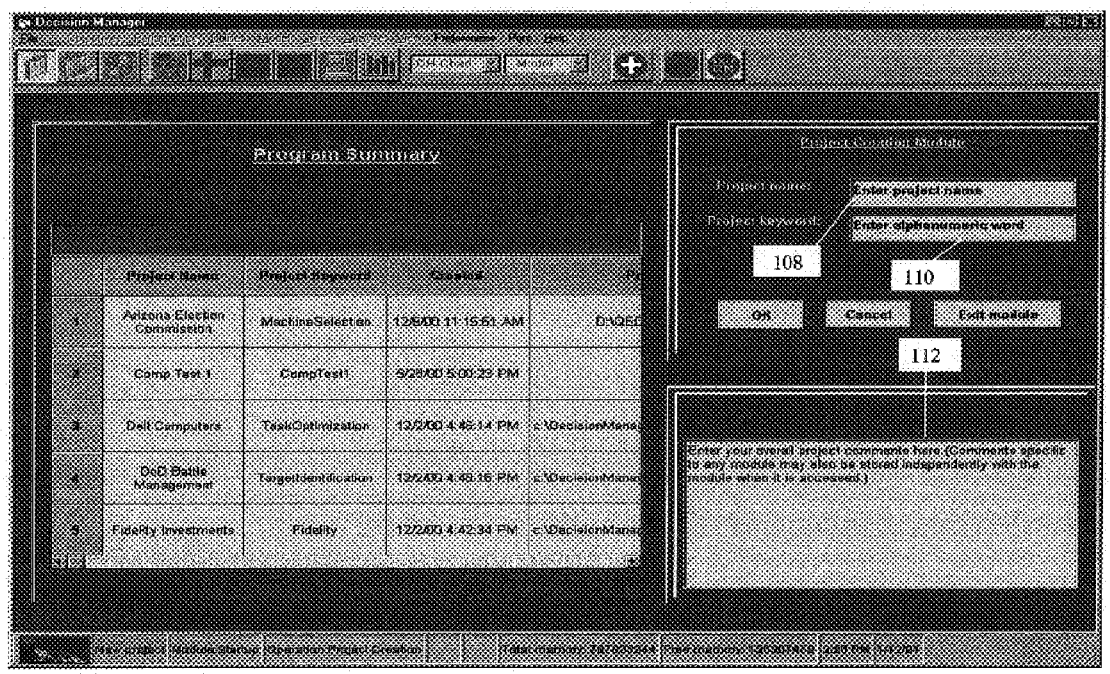
FIG. 12 is the window that is shown when the user elects to create a new project. A project name and keyword are entered in the two upper textboxes and overall project comments and notes are entered in the lower textbox.

When Icon 104 is clicked, the Project Creation window appears next to the Project Summary window, as shown in FIG. 12, and displays three data entry textboxes, the Project Name box 108, the Project Keyword box 110, and the Project Comments box 112, a typical word-processing box where the user can enter comments about the overall project being created.

Figure 13:
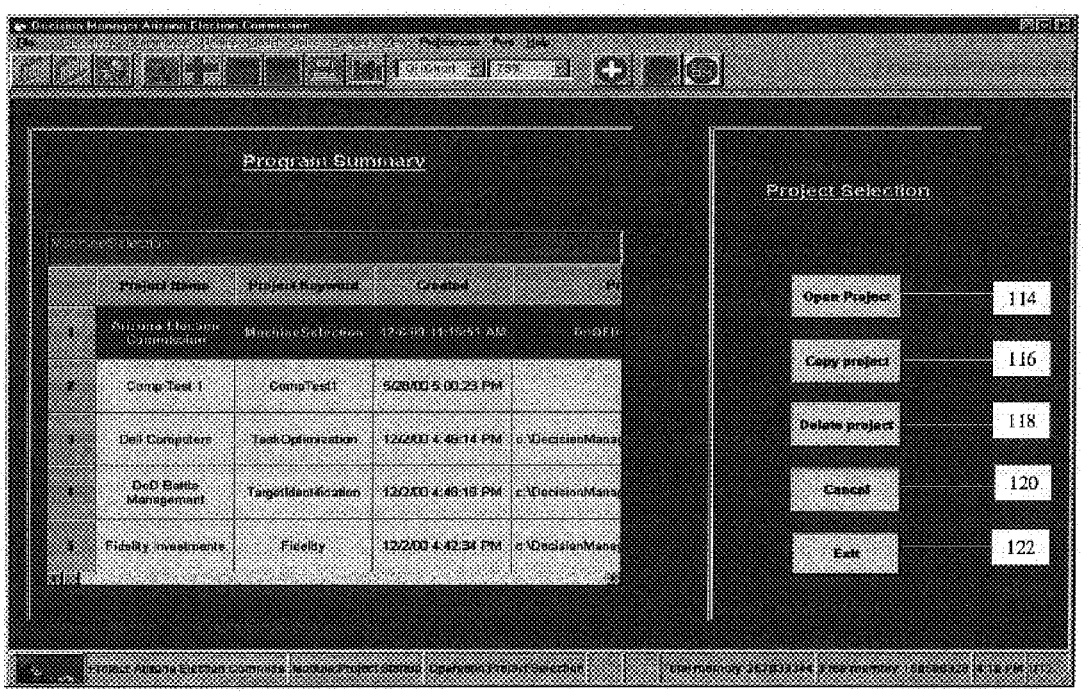
FIG. 13 is the window displayed when the user elects to operate on an existing project that is specified by selecting its keyword in the second column of the table. Three project operations are allowed, Open Project, Copy Project and Delete Project.

When Icon 106 is clicked, the Project Operation window appears next to the Project Summary window, as shown in FIG. 13, and displays five command buttons. The Open Project button 114 opens the project selected in the Project Summary table, the Arizona Election Commission project in the case of the current exemplary application of the invention. The Copy Project button 116 initiates the process where the selected project and all its files are copied to a memory location specified in a follow-up window. The Delete Project button 118 deletes the selected project from memory, the Cancel Button 120 causes a return to the selection of a project, and the Exit button causes a return to the Project Window.

Figure 14:
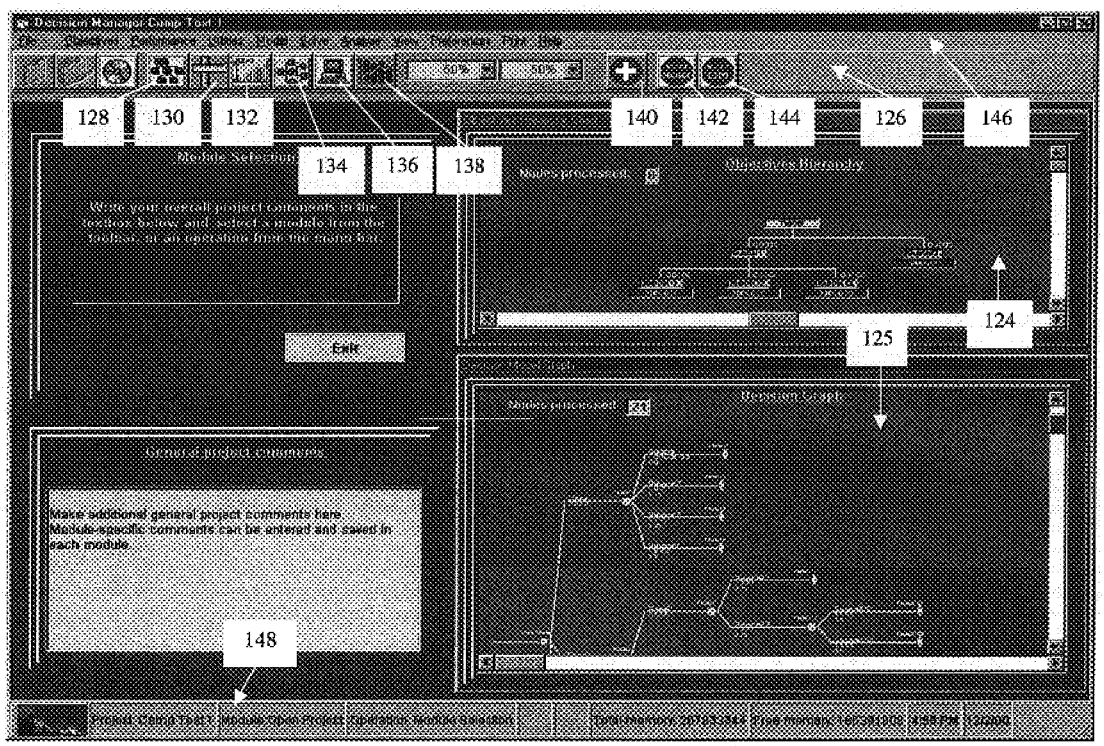
FIG. 14 is an example of the multiple-window screen image displayed when a project is opened. Two independently controllable windows are shown to control the view of the project's objectives hierarchy and its decision graph.

On clicking Button 114, the screen of FIG. 14 is shown. The screen displays a status bar 148, where a plurality of project states such as module and operation names, memory status and time are reported. This status bar is updated throughout the project execution process. Also displayed are the objectives hierarchy window 124 and the decision model window 125, both of which will always be available for viewing throughout the evolution of the project. Another background window shows the project menu bar 146 and the toolbar 126. As indicated earlier, the menu bar represents operations also represented by icons on the toolbar, and it will not be discussed in greater detail in the current description.

On the iconic toolbar 126, Control Buttons 128, 130, 132, 134, 136 and 138 open the Objectives Hierarchy module, the Performance Measures module, the Utility Functions module, the Decision Modeling module, the Decision Solver module or the Analysis module, respectively. Buttons 140, 142 and 144 open the help files, cause a project exit or an application exit, respectively.

the Objectives Hierarchy Module

Figure 15:
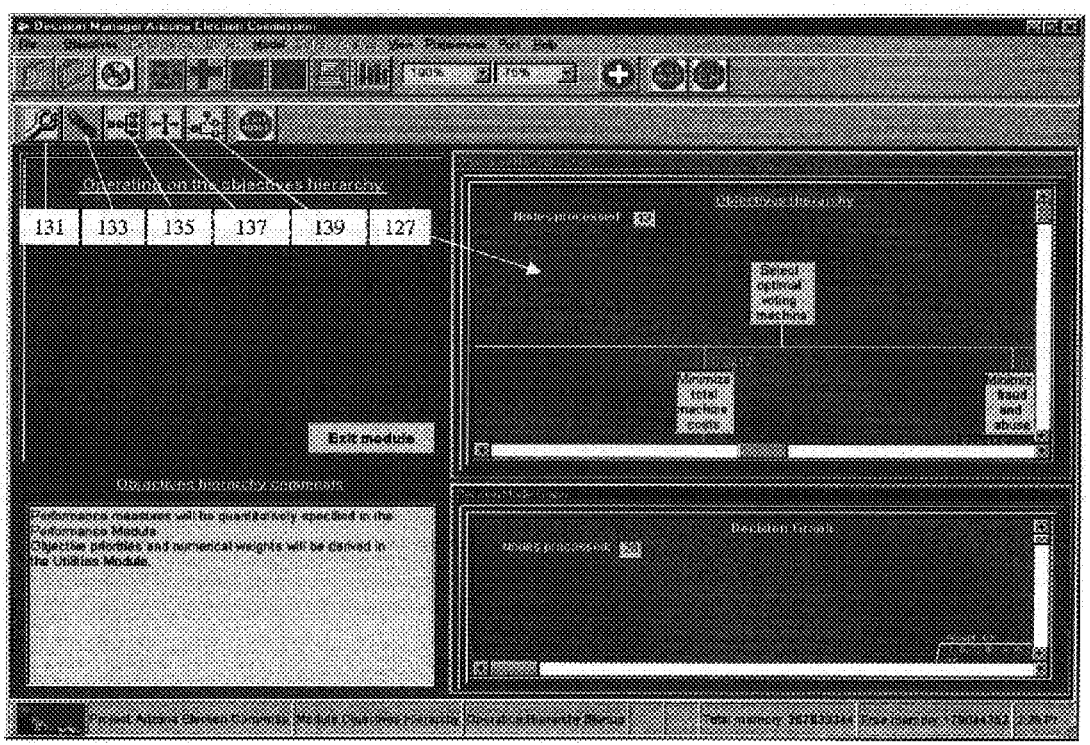
FIG. 15 is the screen that is displayed when the Objectives Hierarchy module is entered. Its toolbar shows the various building and editing operations that can be performed on the hierarchy. Comments specific to this module can be inserted in the indicated textbox.
Figure 16:
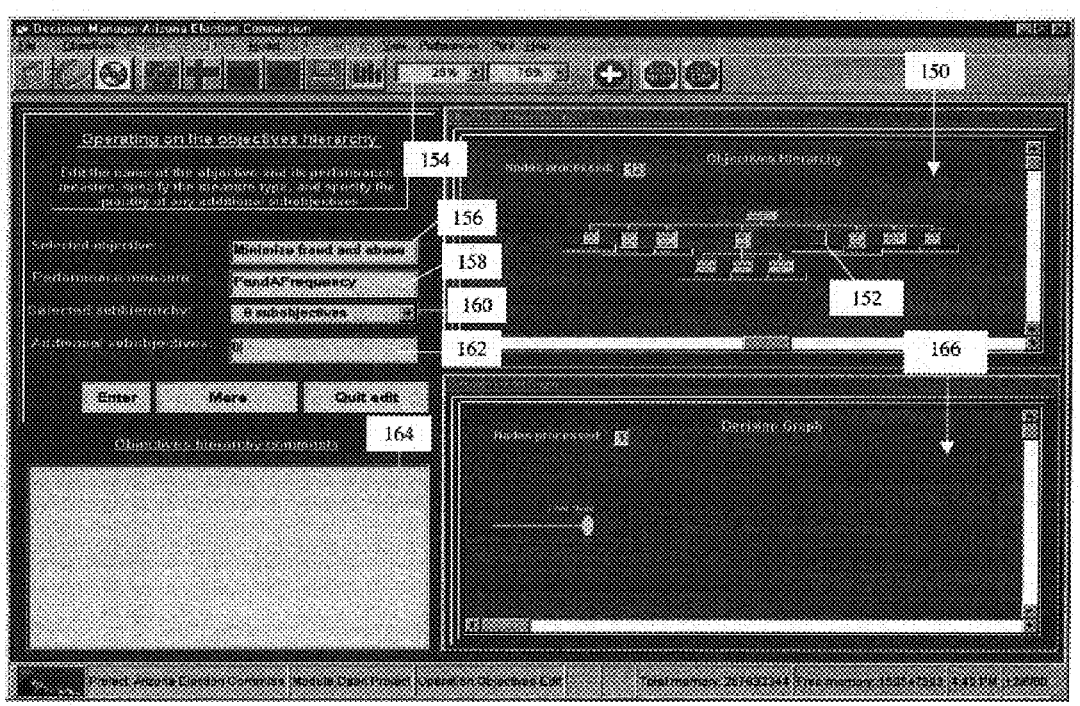
FIG. 16 shows the next-lower level of the objectives module. This window is used to specify objective names, associated performance measure names, and the quantity of additional sub-objectives that must be created. For any objective selected in the adjoining hierarchy graph, the current quantity of its sub-objectives is also shown.

Button 128 opens the Objectives Hierarchy module, and the screen of FIG. 15 is displayed, including a partial view 127 of the hierarchy developed for the exemplary application disclosed herein. This hierarchy has one top objective and 11 competing sub-objectives:

1. Select optimal voting method (the Top Objective)
2. Minimize machine errors
3. Minimize fraud and abuse
4. Minimize contests and challenges
5. Minimize total machine costs
6. Optimize user interface
7. Minimize vote reporting delays
8. Minimize commission review costs
9. Minimize commission submission costs
10. Minimize maintenance and replacement costs
11. Minimize machine purchasing costs
12. Minimize machine installation costs Also displayed when Button 128 is clicked is a toolbar containing five operations, an Edit operation 131, a Delete operation 133, a New Root Creation operation 135, a Sub-Hierarchy Translation operation, and an Objective Insertion operation 139. The editing screen of FIG. 16 is shown when Button 131 is selected, and a reduced view of both the hierarchy graph 150 and the decision model graph 166 are brought forward, together with a set of textboxes with which the attributes of a selected objective 152 are specified. As shown in the hierarchy view 150, some sub-objectives are themselves parents of other sub-objectives, as determined by the hierarchy structure.

Figure 17:
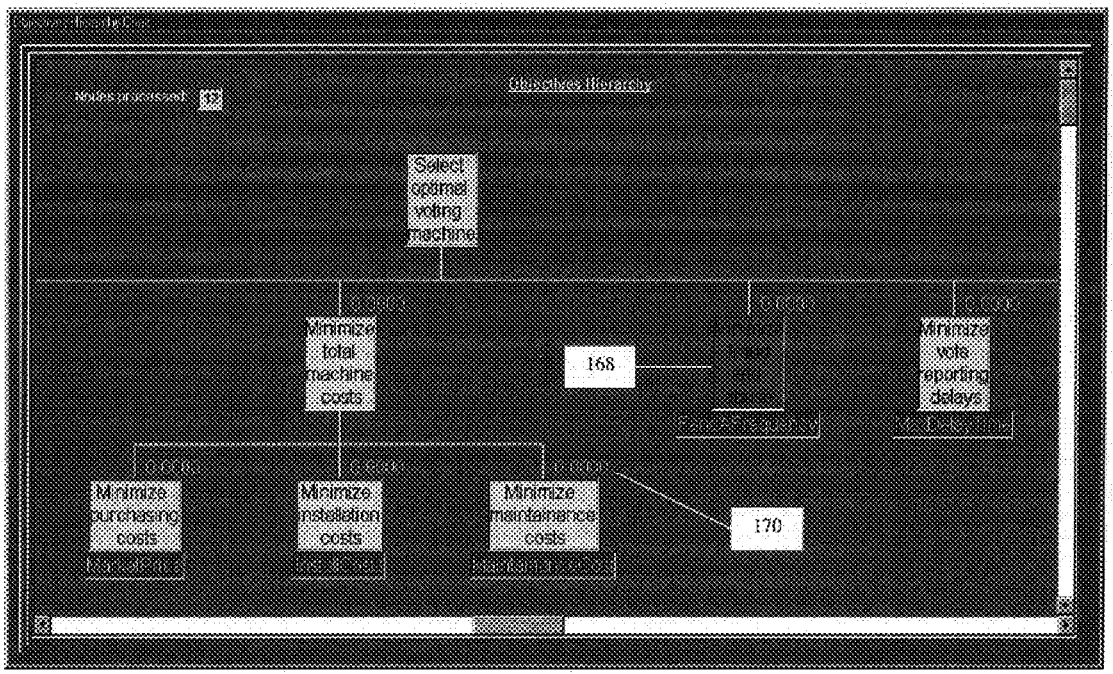
FIG. 17 displays an expanded view of a partial hierarchy with a selected objective highlighted in red.

Also shown are a drop-down zoom list box 154 where the displayed size of the hierarchy graph is specified, and a textbox 164 where the user can enter comments relating specifically to the objectives module. The name of the selected objective is edited in Box 156 and a performance measure may be assigned and edited in Box 158. Box 160 shows the current quantity of sub-objectives of the selected objective and, if more sub-adjectives are desired, their quantity is specified in Box 162. FIG. 17 displays a zoomed-in hierarchy with the selected objective 168 shown in red, and objective priorities 170 initialized to zero (priorities will be discussed when the Utility Functions module is introduced).

Figure 18:
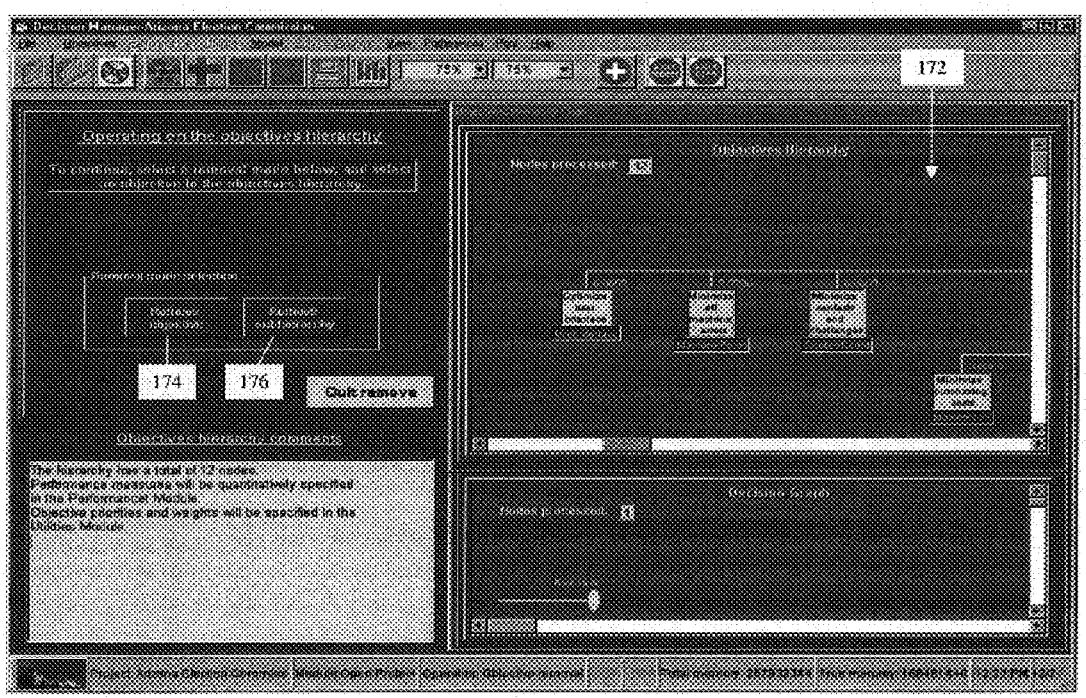
FIG. 18 shows the hierarchy and sub-hierarchy removal window where nodes are specified for removal.

When the delete button 133 is actuated, the screen of FIG. 18 is shown. After selecting an objective in the graph 172, the user may select to remove only the selected objective by clicking Button 174 or, by clicking Button 176, he or she may select to remove the entire sub-hierarchy whose root is the selected objective. If an intermediate objective is chosen for individual removal, all its offspring become offspring of the objective's parent.

When the user chooses to insert a new top objective by clicking the "New root" button 135, a screen is displayed where the user can specify the new root's attributes and insert the new root into the hierarchy graph. This is a straightforward operation and is not discussed any further in this disclosure.

Figure 19:
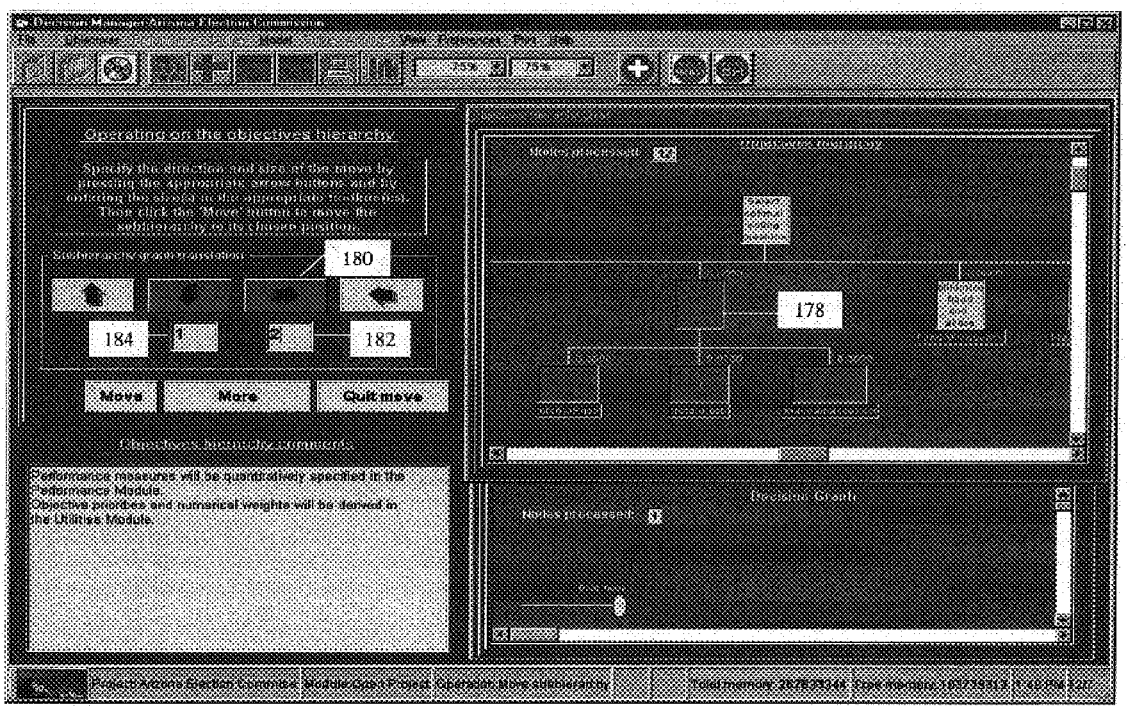
FIG. 19 contains the windows used to specify various sub-hierarchy translations. In the adjacent window, the selected sub-hierarchy is highlighted in red.
Figure 20:
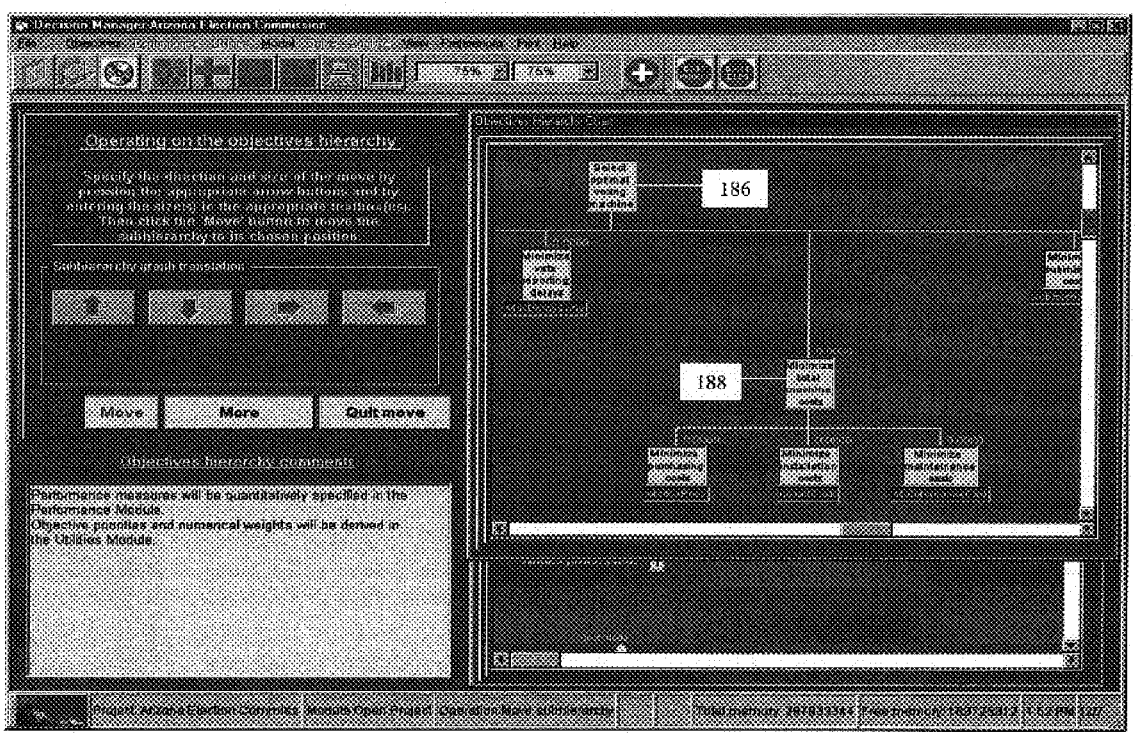
FIG. 20 shows the result of a simple downward translation. The selected sub-hierarchy has been translated one level down.

The purpose of Button 137 is to provide a capability to translate objective sub-hierarchies in four orthogonal directions. When it is clicked, the screen of FIG. 19 is displayed, containing a zoomed depiction of the objectives hierarchy and a panel where the direction and magnitude of the translation is specified. The user specifies a sub-hierarchy by selecting its root 178, whereupon the sub-hierarchy is highlighted in red, as shown in FIG. 19. Directions are indicated by selecting an arrow in the panel the right-arrow 180, for instance. Magnitudes are specified by entering a positive integer in the textbox(es) associated with the chosen direction(s). A one-level downward translation is specified in Box 184, for instance, and a two-level rightward translation is specified in Box 182. FIG. 20 depicts an exemplary hierarchy whose principal objective 186 is "Select optimal voting machine" and shows the result of translating Objective 188 ("Minimize total machine costs") and its sub-hierarchy one level downward.

Figure 21:
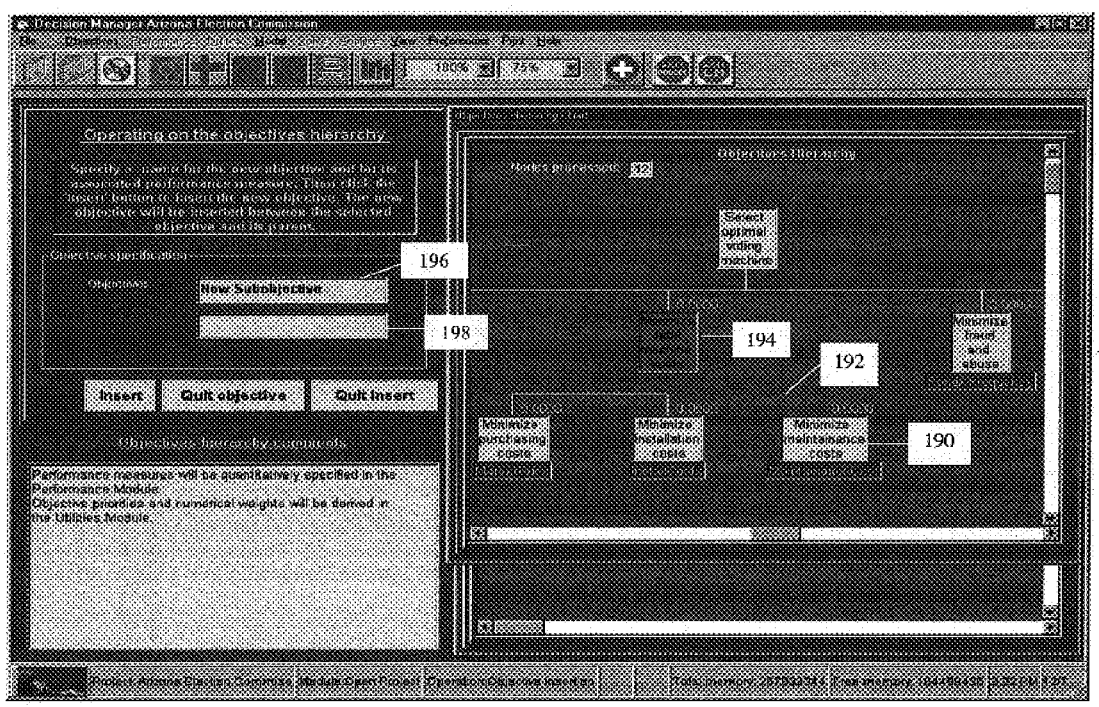
FIG. 21 contains the window where objective insertions are specified. The dashed red line in the adjacent graph shows where the new objective will be inserted.
Figure 22:
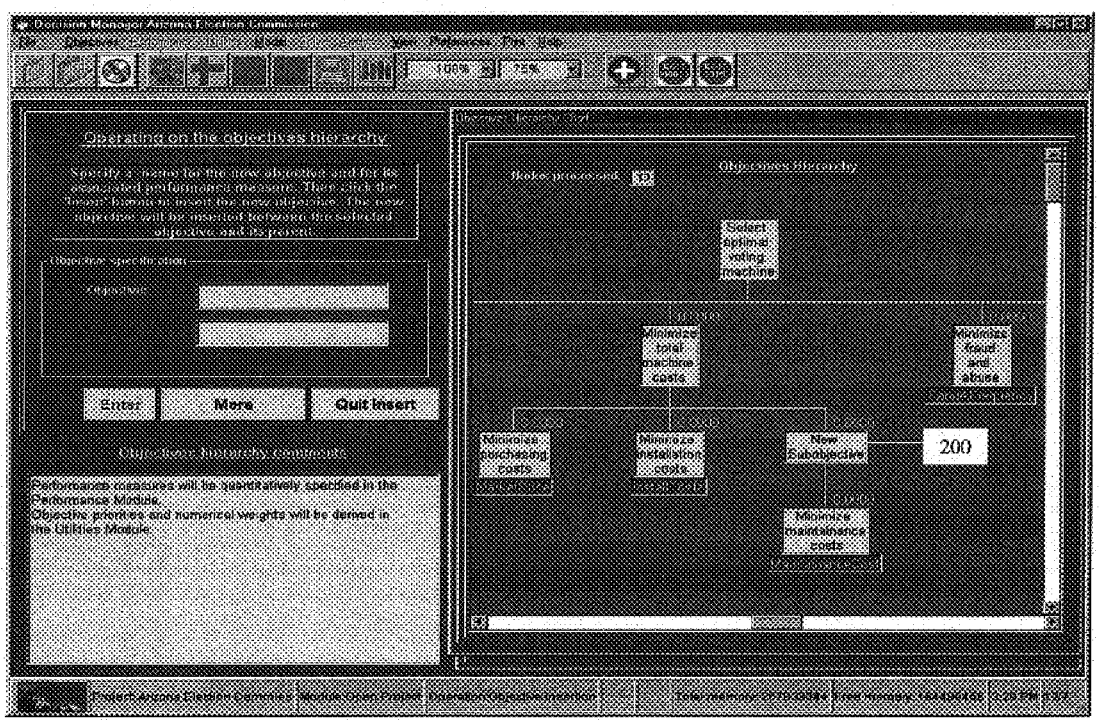
FIG. 22 shows the result of the objective insertion.

A new objective may be inserted anywhere in the hierarchy with the Insertion Button 139, whose selection opens the screen shown in FIG. 21. To specify the branch or edge where a new objective is needed, first a parent objective 194 is selected, then a sub-objective 190. Upon selection of the two defining nodes, the parent node 194 is colored red, and the insertion edge is shown as a dotted red line 192. The name of the inserted objective is specified in Textbox 196, and the desired quantity of additional offspring is entered in Textbox 198. FIG. 22 shows the new sub-objective after its insertion, and with no additional offspring.

The Performance Measures Module

Figure 23:
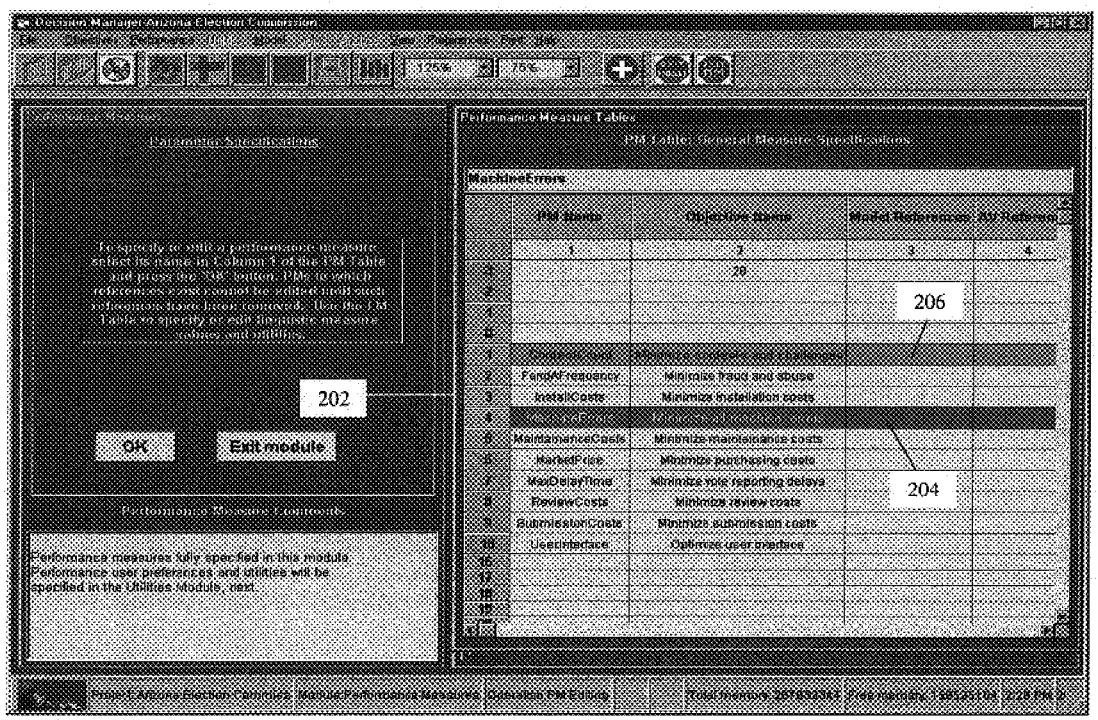
FIG. 23 exhibits the first window that is displayed when the Performance Measures module is entered. Comments specific to this module can be entered in the textbox. The adjacent table highlights the most recently selected performance measure in red and previous selections in blue.

Button 130 opens the Performance Measures module, and the screen of FIG. 23 is displayed, including a table 202 whose rows list of all the measures in the project. Every measure is characterized by a plurality of attributes, each attribute specified in a designated column of the table. As shown earlier, performance measures may be created only in the Objectives Hierarchy module, where they are assigned only two attributes, a name and the name of their associated objective. To avoid logical contradictions, no objective may be assigned a performance measure if any of its ancestral objectives or descendant sub-objectives has previously been assigned one. Hence, the path from any terminal or leaf objective to the top objective may contain only one objective to which a performance has been assigned. Adherence to this logical constraint is carefully verified during the user data entry process, and appropriate messages are presented to the user whenever this constraint is violated.

Referring to Table 202, where all ten measures used in the exemplary application are shown, the values of these two attributes occupy the first two columns of the table. To specify or to edit other attribute values of a measure, the user selects its row in the table. His most recent selection 204 is colored red, and her previous selections 206 are colored blue, as shown.

Figure 24:
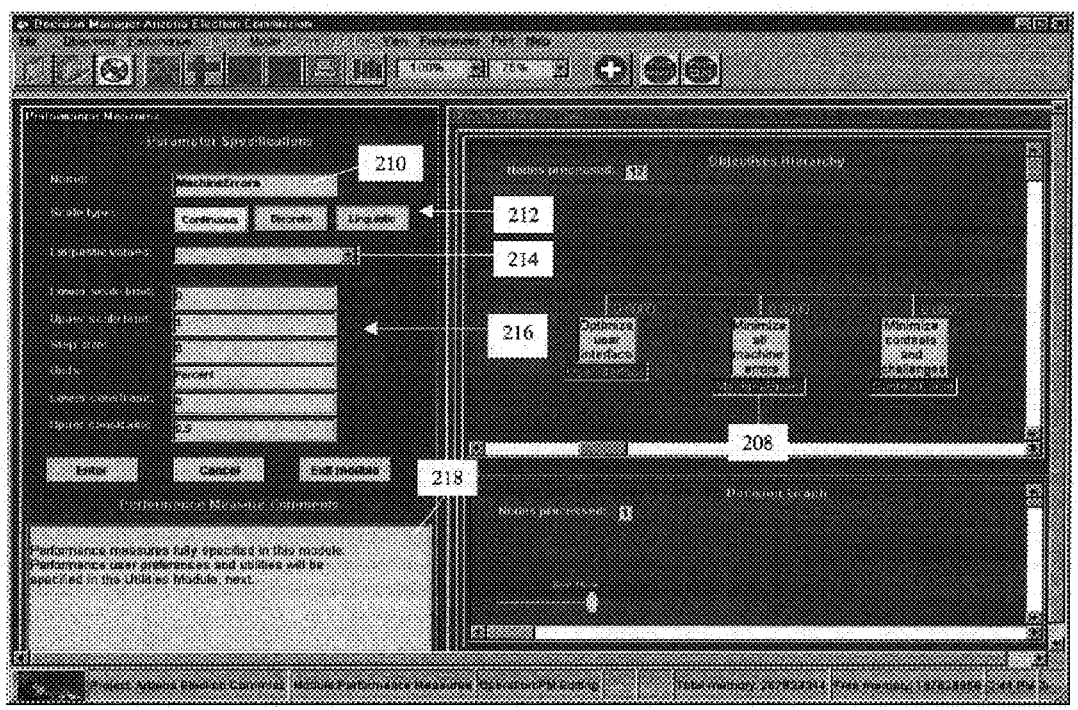
FIG. 24 shows the performance measure specification and editing window that was opened when the measure selection was approved in the previous window of FIG. 23. The specification process allows three basic types of measures, Continuous, Discrete, and Linguistic.

When a measure is selected in Table 202, FIG. 23 is hidden, and the screen of FIG. 24 is brought forward. This screen displays a new window containing five types of data entry and display textboxes. The first is a single box 210 where the name of the selected measure 208 can be edited. The second is a set 212 of three option buttons used to specify three basic scales of measurement, a continuous scale, a discrete scale, and a linguistic scale, on which performance measure values may be specified using words or short sentences from the English language. The third is a list box which, when clicked, displays all the linguistic values assigned to the selected measure. The fourth is a collection 216 of 6 data entry boxes where specific attribute values are specified. The first two boxes define the lower and upper limits of the selected scale, the third specifies the granularity of the scale, and the fourth defines the units of measurement in any system of units. The last two boxes specify any lower and upper constraint imposed on the selected measure. Special actions are taken and dedicated messages are shown during later calculations whenever these constraints are violated. Finally, the fifth type of textbox is a textbox 218 where the user can enter a virtually unlimited set of comments specific to the Performance Measures module.

The Utility Functions Module

Figure 25:
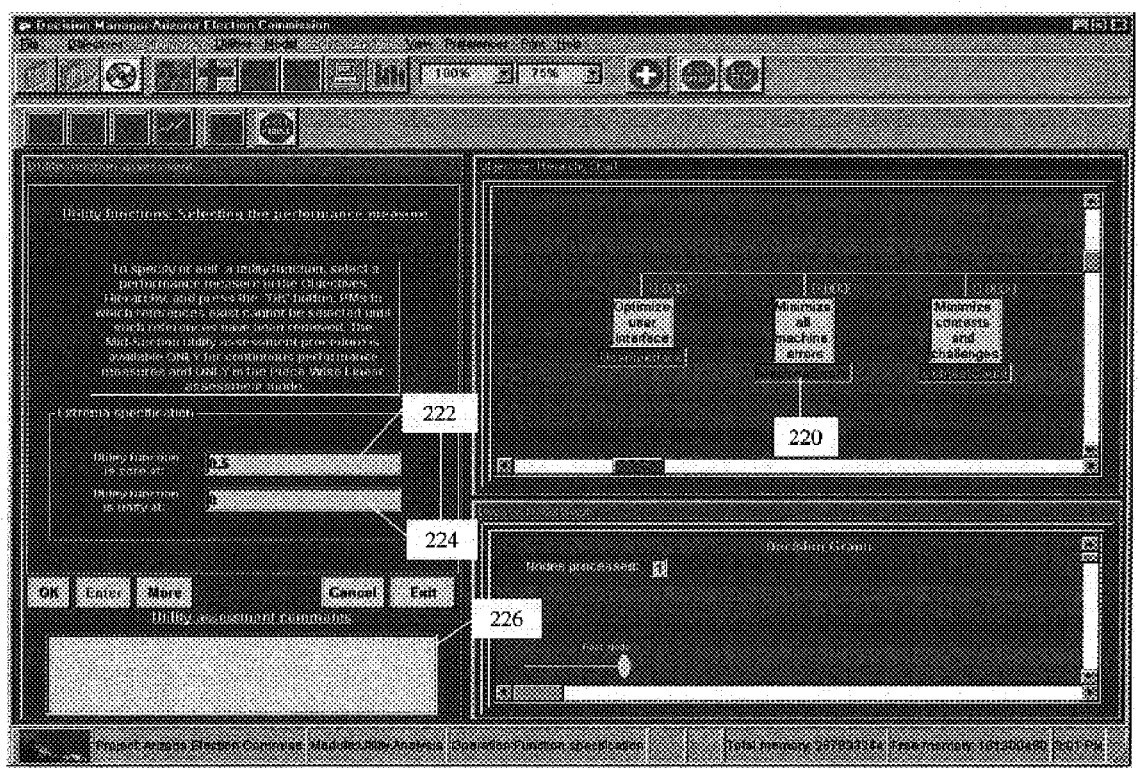
FIG. 25 is the screen that is displayed when the Utilities module is entered. A first step in the specification of a utility function consists of defining the performance measure values where the function reaches its minimum (zero) and maximum (unity). Comments specific to this module can be entered in the textbox.
Figure 26:
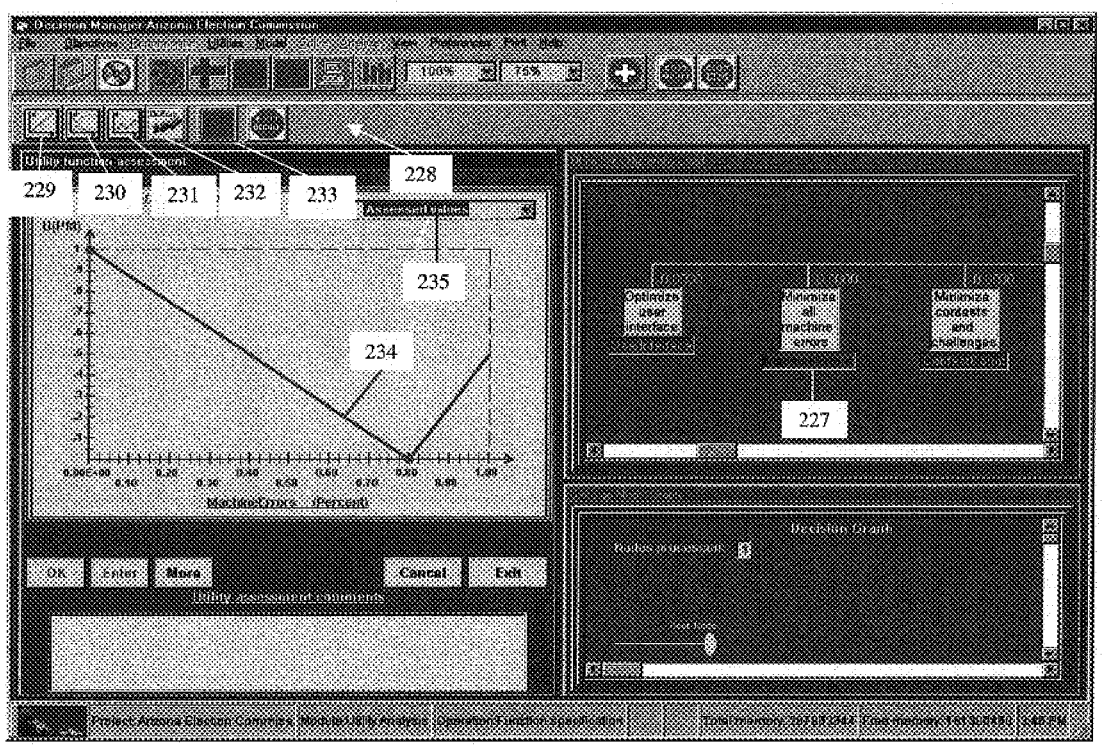
FIG. 26 shows the toolbar where various forms of utility functions may be selected. An example of the default piecewise-linear form is shown in the lower graph.

Button 132 opens the Utility Functions module, and the screen of FIG. 25 is displayed, including a panel where utility function extrema are defined. Values where the utility function of the selected measure 220 equals zero and unity are entered in Textboxes 222 and 224, respectively, and Textbox 226 can be used to enter comments specific to the Utility Functions module. Next, the screen of FIG. 26 is displayed, exhibiting a toolbar 228 for creating utility functions, a list box 235 showing the list of measure values for which utility values have been assessed, and the utility function 234 associated with the selected performance measure 227. The toolbar 228 contains four iconic control buttons, each providing a complementary means for creating utility functions. Selection of Button 229, 230 or 231 initiates the creation of a linear, exponential or piece-wise linear function, respectively. Selection of Button 232 provides a means for constructing any practical mathematical function by combining, in accordance with established logical and mathematical rules, a plurality of functions selected from the function dictionary shown in FIG. 31. The utility function construction procedures are illustrated by providing a detailed discussion of only one method, the piece-wise linear method started with Button 231. This method illustrates the major principles underlying all four methods, and we omit a detailed discussion of the remaining methods in order to simplify the presentation of this disclosure, even though the omitted methods provide significant graphical and computational novelties of their own.

Figure 27:
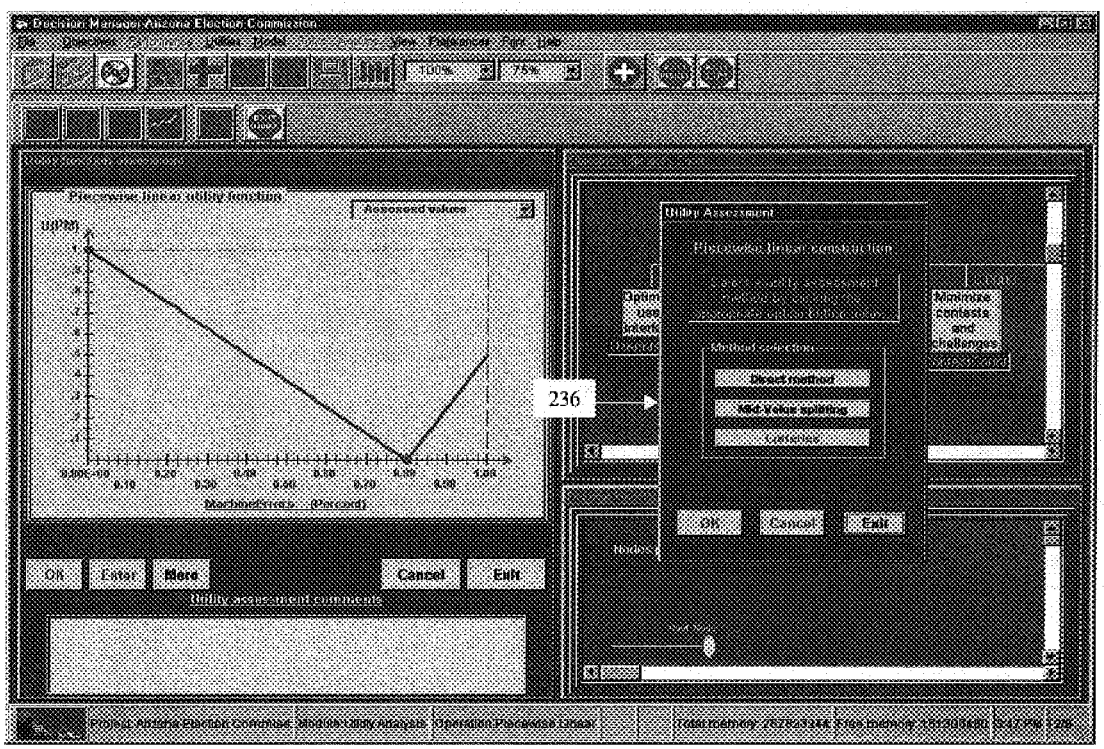
FIG. 27 shows the window for selecting a method for constructing utility functions.
Figure 28:
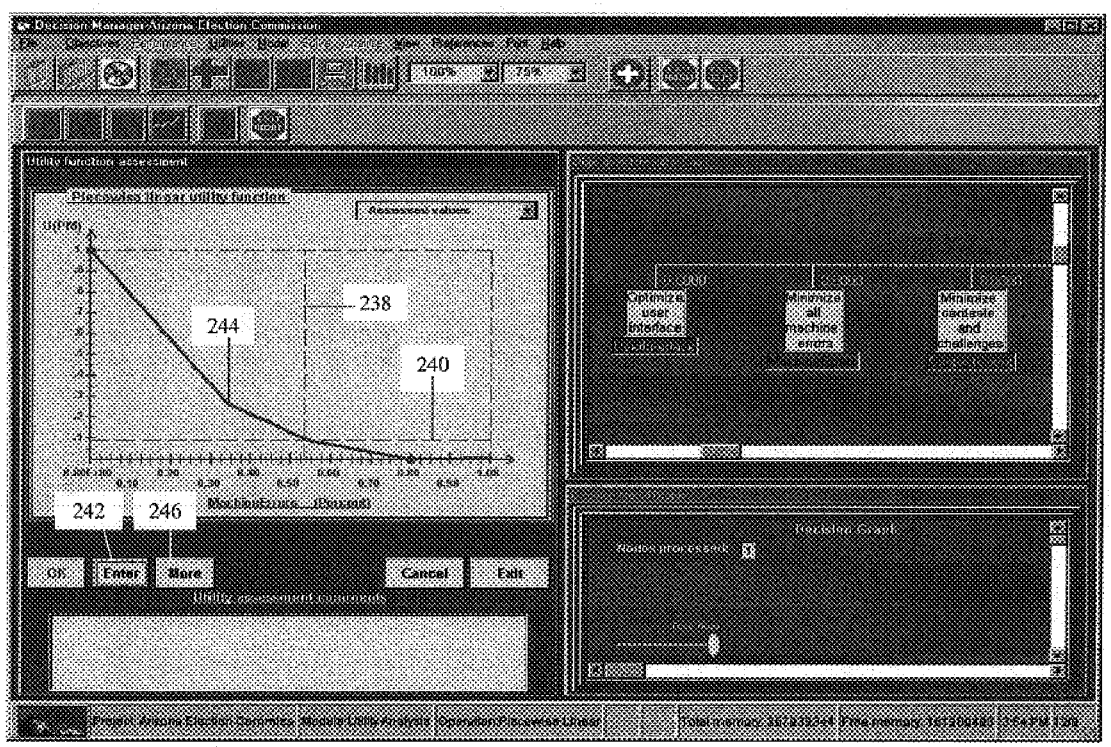
FIG. 28 shows a utility function obtained by using the piecewise-linear form.

When Button 231 is selected, the screen of FIG. 27 is displayed. This screen contains a panel 236 where the user must specify one of two piece-wise construction methods, the Direct Method, or the Mid-Value Splitting Method. Both methods will be explained in the next few figures. If the user selects the direct method, the screen of FIG. 28 is displayed. The screen contains a graph depicting the utility function currently assigned to the selected "Machine errors" performance measure shown in red, and exhibiting a break 244 created during a previous construction step. Two red cursors are provided for editing the utility function, a vertical cursor 238 and a horizontal cursor 240. The vertical cursor defines a unique performance measure value, for which the horizontal cursor defines a unique utility value. Acceptance of the value-pair is indicated by clicking the Enter button 242, whereupon the utility function is redrawn in order to pass through the new value. The break 244, for instance, was created by placing the intersection of the two cursors on the break point in the graph, and by clicking Button 242. If more points are desired, the process can be repeated by clicking the More button 246.

Figure 29:
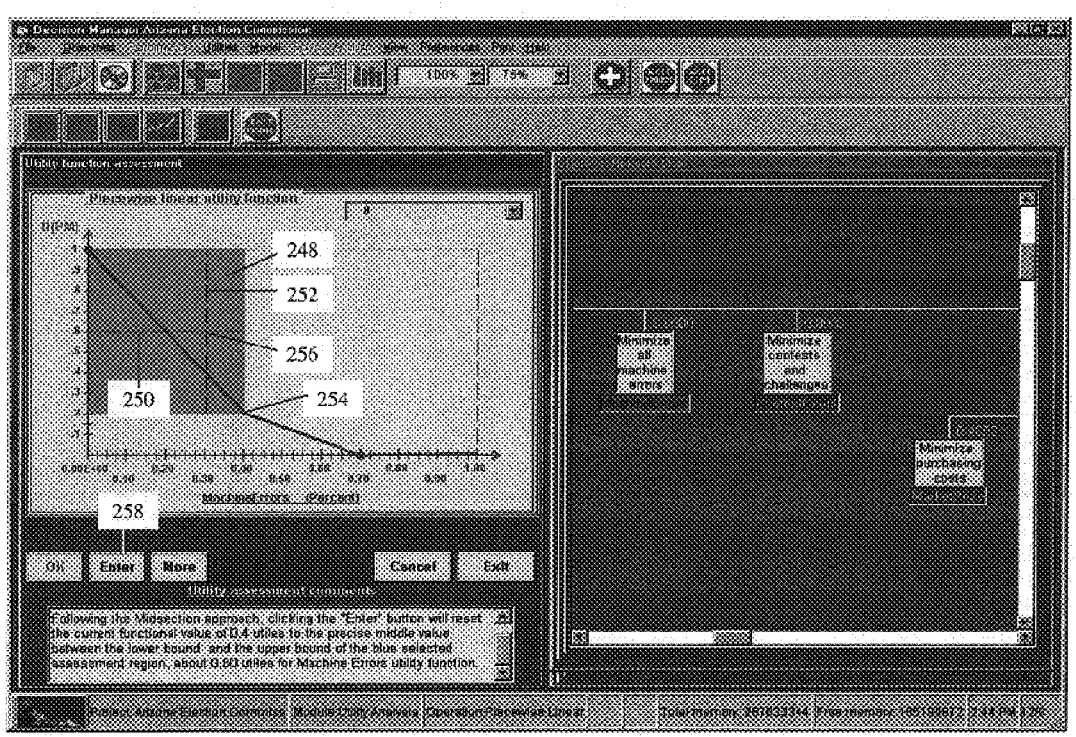
FIG. 29 illustrates the application of the Midsection construction method. The blue rectangular area is the work space where the midsection utility value is specified. Also shown is the utility function prior to the application of the midsection method, with the horizontal and vertical cursor used to define the midsection point. This point coincides precisely with the intersection of the two cursors.

The procedure will be further understood by applying the Mid-Value Splitting method illustrated in the screen of FIG. 29 displayed when the "Mid-Value splitting" option button in Panel 236 is selected. First, two adjacent performance measure values are selected from the assessed list 234 in FIG. 26. Since no intermediate points have been assessed between these two points, the utility function between these two points is the default straight line passing through two diagonal vertices of a rectangle 248, one of whose diagonal vertices is Vertex 254, and is highlighted with a blue background. Next, by appropriately locating the horizontal cursor 250 and the vertical cursor 252, the user specifies a point 256 inside the rectangle such that the change in utility achieved in moving vertically from that point to the upper side of the rectangle is the same as the change in utility achieved in moving vertically from that point to the lower side of the rectangle. The point 256 is called the mid-value point, and the two diagonal vertices are said to be differentially utility-equivalent.

Figure 30:
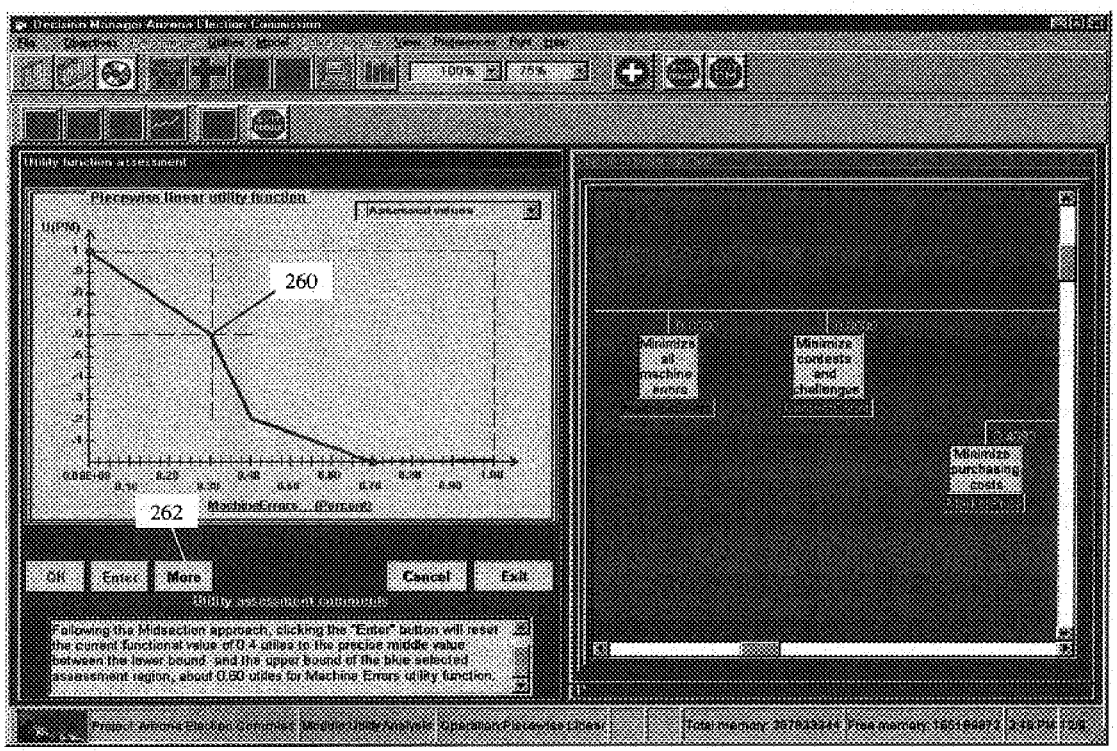
FIG. 30 shows the modified utility function obtained after the midsection point has been approved by the user.

When the Enter button 258 is selected, the screen of FIG. 30 is displayed, showing the result of applying Mid-Value Splitting method to the function of FIG. 29 which now contains a new break at the point 260 which coincides with the intersection of the two cursors. Additional breaks may be specified on straight-line segments by clicking the More button 262.

Figure 31:
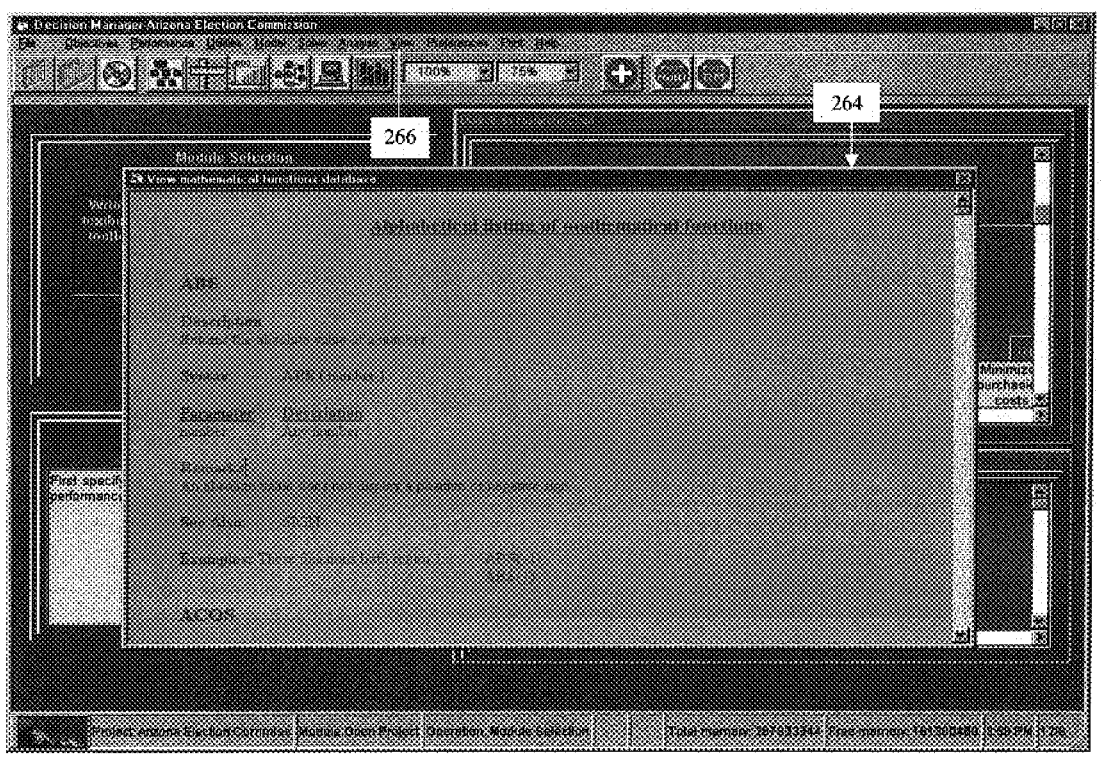
FIG. 31 shows the first two of a long list of mathematical functions that can be used to specify utility functions. This list is also available throughout the entire application for the construction of cost functions and probability distributions.

To view the plurality 264 of primitive functions that can be used to mathematically construct utility functions, and partially listed in FIG. 31, the user must select the Function submenu of the View menu 266 after choosing the mathematical option with Button 232 of FIG. 26.

Figure 32:
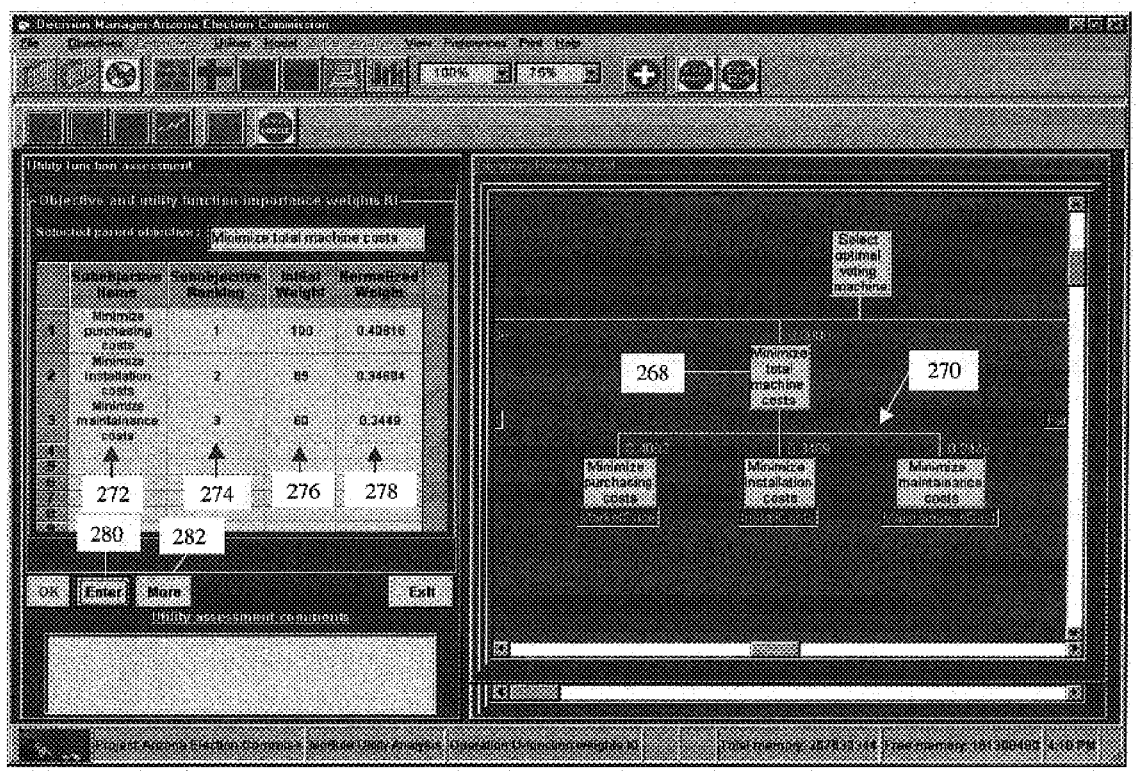
FIG. 32 is a typical computer screen containing a window where objective and performance measure priorities are specified. First a qualitative ranking is obtained. Assigning a numerical weight to each objective and to its associated performance measure then further refines this ranking.

The elicitation of objective priorities is initiated by selecting Button 233 of FIG. 26, and shown grayed-out to limit the quantity of figures in this disclosure. The resulting screen of FIG. 32 contains two major windows. The first depicts a partial but magnified view of the objectives hierarchy where a parent objective "Minimize total machine costs" 268 has been selected. This objective has three weighted sub-objectives 270. The second window contains a textbox displaying the name of the selected parent objective 268, and a table consisting of four columns, the Sub-objective Name Column 272, the Ranking Column 274, the Initial Weight Column 276, and the Normalized Weight Column 278.

Two simple but effective steps are used to elicit priorities from the user. In the first step, the user provides a qualitative, relative and ordinal ranking of the sub-objectives by entering positive integers in Column 274, one integer for each sub-objective. In the second step, the user quantifies the ranking more precisely and provides a cardinal ranking by entering corresponding numerical weights in Column 276. When the Enter button 280 is clicked, the invention normalizes the weights to unity, enters the updated weights in Column 278, displays the new weights in the objectives chart 270, and stores the normalized weights on disk as part of the stored objectives hierarchy model. An error message is generated if an entry is missing or does not conform to an acceptable format, or if the qualitative ranking in Column 274 is inconsistent with the quantitative ranking in Column 276. When done, additional weights can be elicited by clicking Button 282.

The Decision Modeling Module

Figure 33:
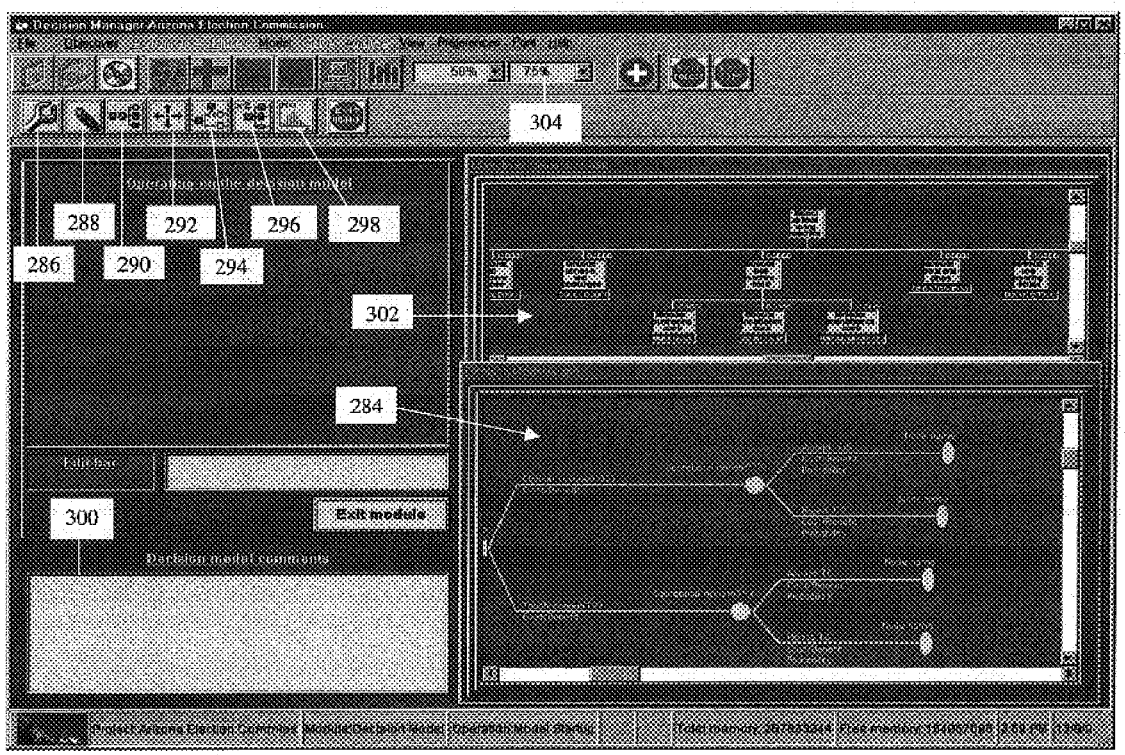
FIG. 33 is the screen that is displayed when the Decision Modeling module is entered. The various operations available in this module are shown in the toolbar.

Button 134 opens the Decision Modeling module, and the screen of FIG. 33 is shown, displaying the objectives hierarchy 302, the decision graph 284, a comments textbox 300, and a zooming list box 304 containing a plurality of magnification and reduction percentages for the decision graph. Also displayed is a set of icons associated with seven major decision model operations, Editing 286, Deleting 288, New Root Insertion 290, Sub-Graph Translation 292, Node Insertion 294, Sub-Graph Duplication 296, and Probability Elicitation 298. Only a subset of these operations is illustrated in this disclosure. Considering that the selected operations share the major innovative elements associated with the ignored operations, and that the ignored operations are similar to those already discussed in the Objectives Hierarchy module, no important loss of disclosure will result from this simplification.

Figure 34:
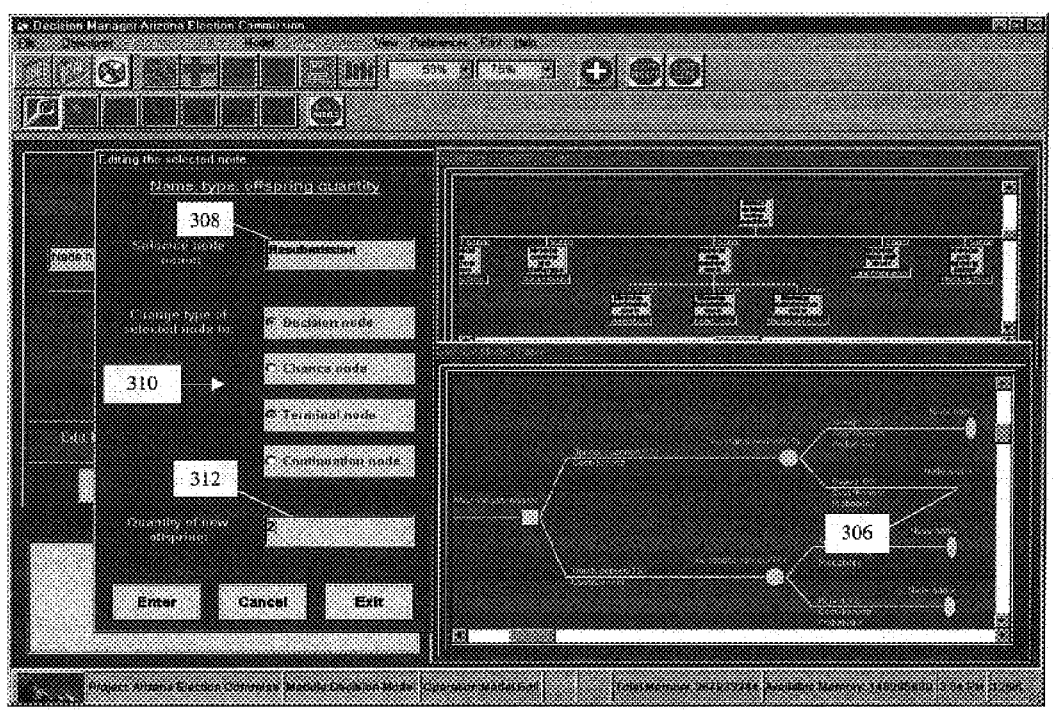
FIG. 34 shows the window where the type of a selected node is specified.
Figure 35:
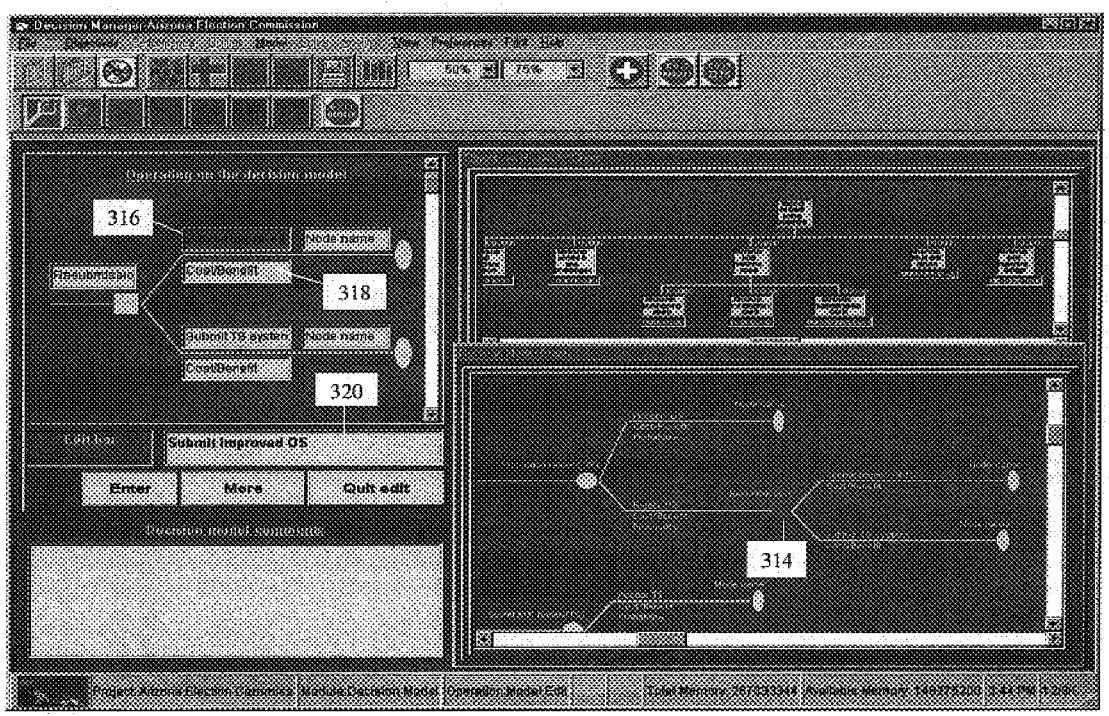
FIG. 35 contains a window where an expanded view of a selected node, its offspring, and all its semantic attributes is shown. The selected node is highlighted in red in the overall adjoining decision graph.
Figure 36:
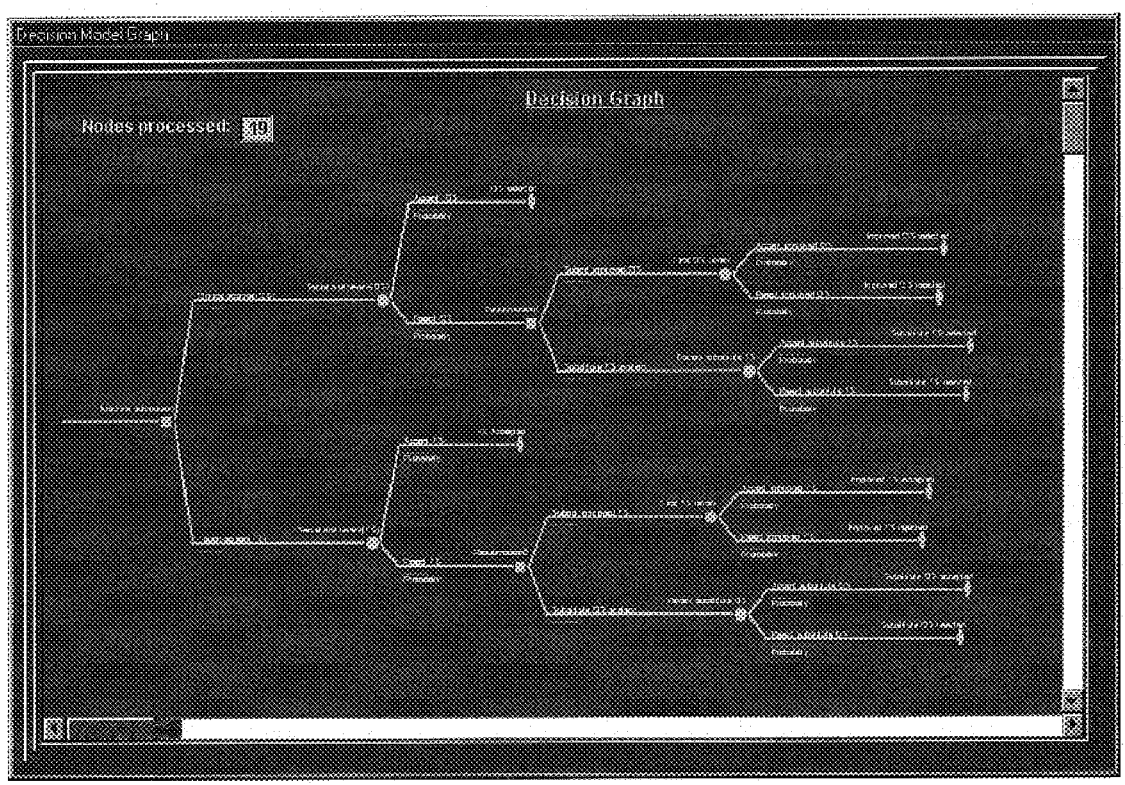
FIG. 36 is an overall view of a typical decision model topology consisting of 19 nodes.

When the Editing Button 286 is activated and a node is selected in the decision graph, the screen of FIG. 34 is brought forward, showing the selected node 306 highlighted in red. Also shown is a table containing a textbox 308 for editing the node name, a collection 310 of boxes for editing the node type, and a box 312 where an additional offspring quantity can be entered. Some restrictions obviously apply to the node type editing process. A decision node, for instance, may not be changed to a chance node without first removing all its offspring and converting it to a terminal node. When the table entries have been completed, the screen of FIG. 35 is shown, where the selected node is shown as Node 314. A new window also appears where a magnified view of the selected node and its offspring is shown. This full-size editing view allows the user to focus on the model components being edited, while allowing the concurrent viewing, zooming and scrolling of the fill model. In this view, the user can specify or edit parent-to-offspring transition labels and the costs and benefits accrued by one or more performance measures during a transition from parent to offspring by entering symbol strings in textboxes such as 316 and 318, respectively. When the selected parent node is a decision node, as in FIG. 35 of our example application, the transition labels represent choice names. When the parent node is a chance node, the labels represent outcome names. In contrast to node names, which must be unique, any admissible string may be used as a choice or outcome label. To facilitate the entry and editing of long names and cost/benefit expressions, a large edit bar 320 is also provided. In the context of the voting machine application, the parent node 314 represents the decision to resubmit a machine approval request, one of the choices has been labeled "Submit improved OS" in the selected Textbox 316. The entry of cost/benefit expressions will be discussed in detail with FIG. 39, and Textbox 318 was left in the default state. FIG. 36 presents a reduced view of an intermediate version of the decision model. The model contains only 19 nodes and is barely readable, emphasizing the importance of providing separate magnified views of selected parts of the model for editing purposes.

Figure 37:
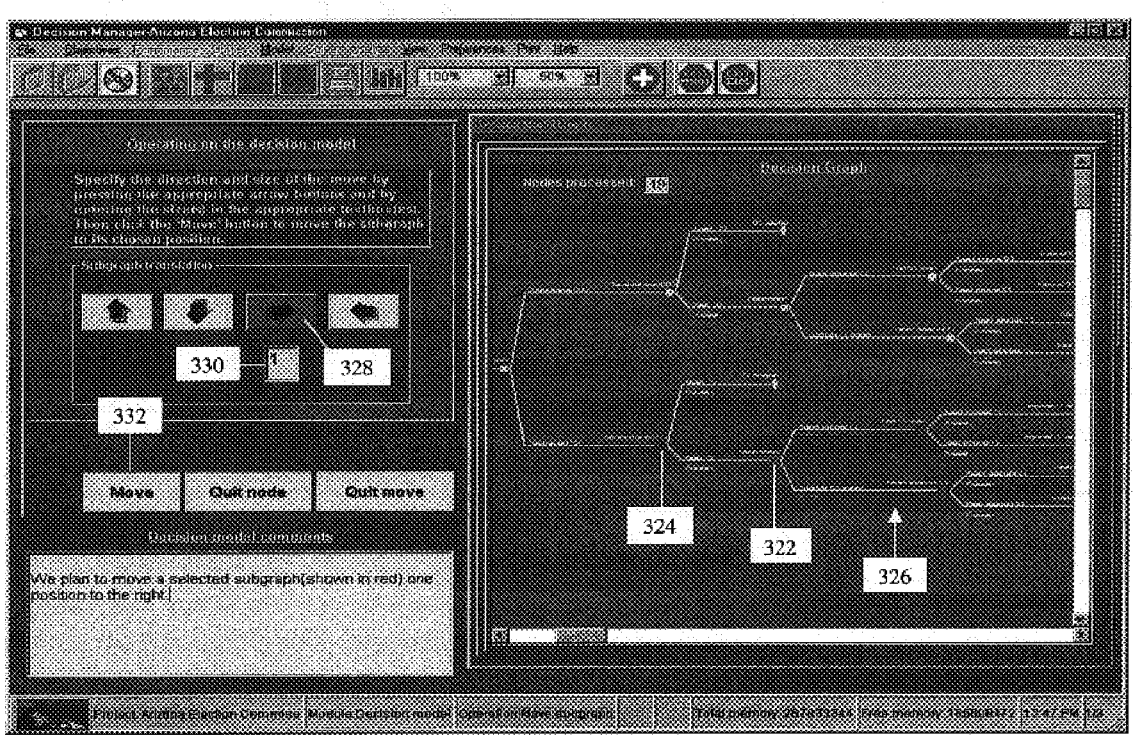
FIG. 37 contains the windows used to specify various sub-model translations. In the adjacent window, the selected sub-model is highlighted in red.
Figure 38:
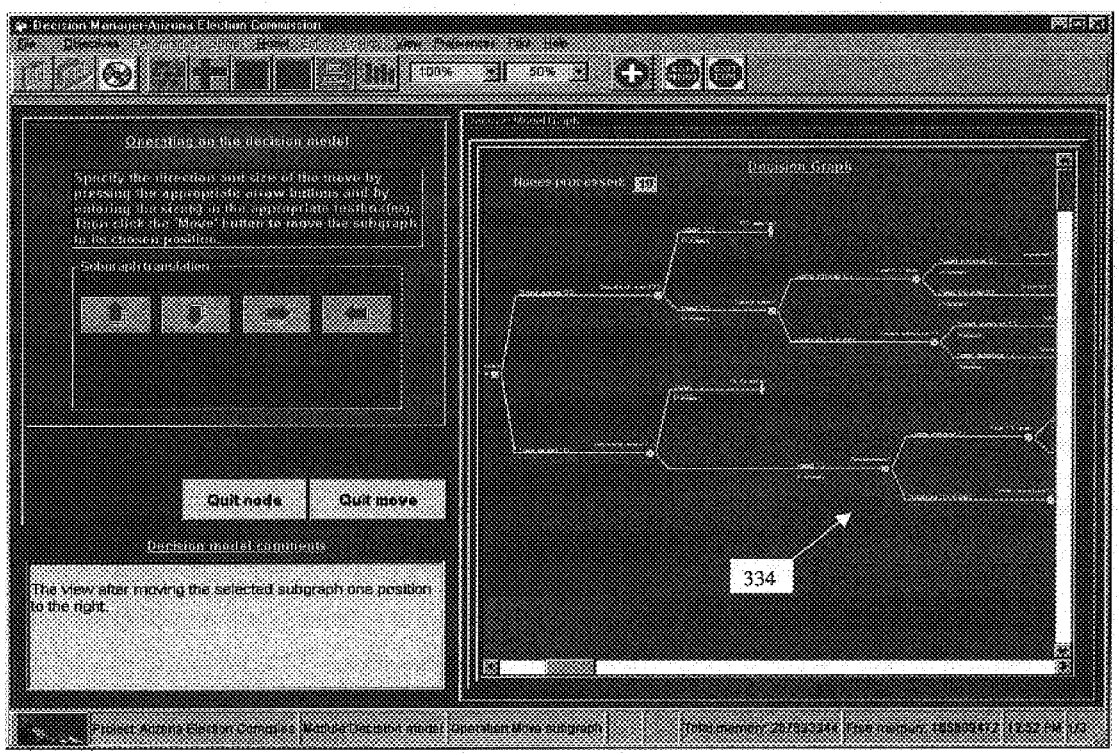
FIG. 38 shows the result of a simple translation to the right. The selected sub-model has been translated one level to the right.

On activation of the Translation Button 292, the screen of FIG. 37 is shown. Sub-graph translation operations are similar to sub-hierarchy translations discussed in the Objectives Hierarchy section. Previously selected root nodes 324 are highlighted in blue, and the most recently selected root node 322 is shown in red, together with every node of its sub-graph. Referring to the adjoining table, a simple rightward and one-level translation is selected with Option 328 and in Textbox 330, respectively. FIG. 38 depicts the translated sub-graph 334 when the Move button 332 is clicked.

Figure 39:
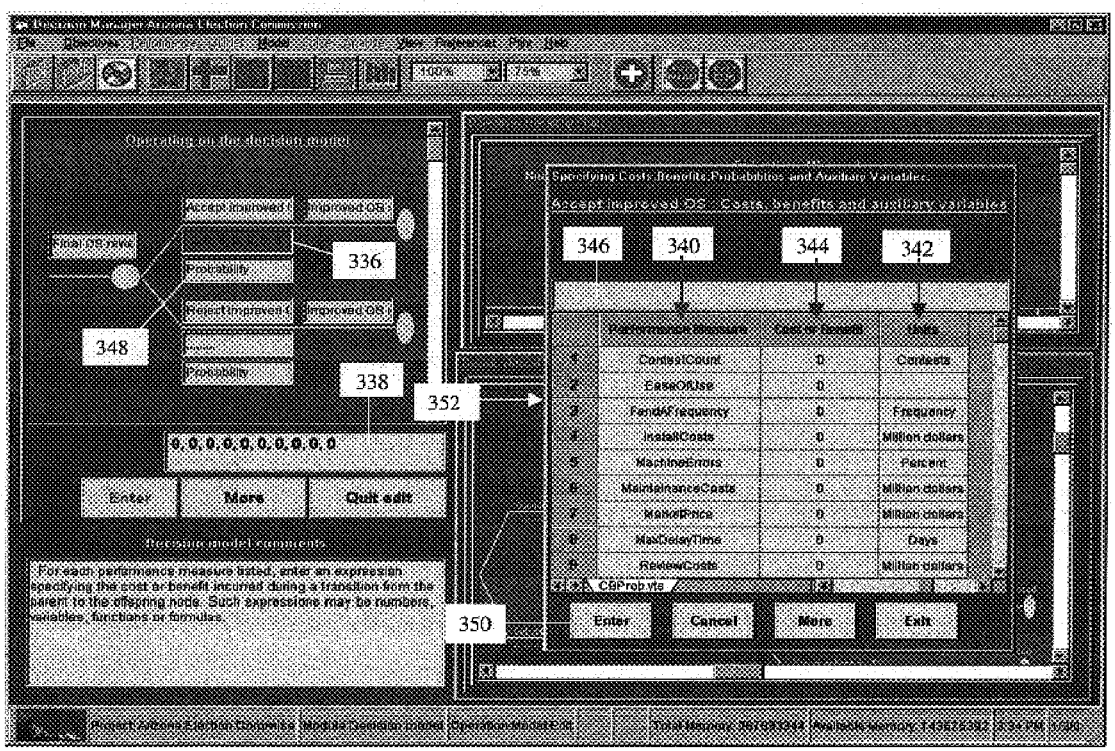
FIG. 39 contains the windows for creating auxiliary variables and functional references to other nodes, and for specifying the costs, benefits and probabilities associated with nodes in the decision model. The choice whether costs or probabilities are assigned is made in the expansion window described earlier.
Figure 40:
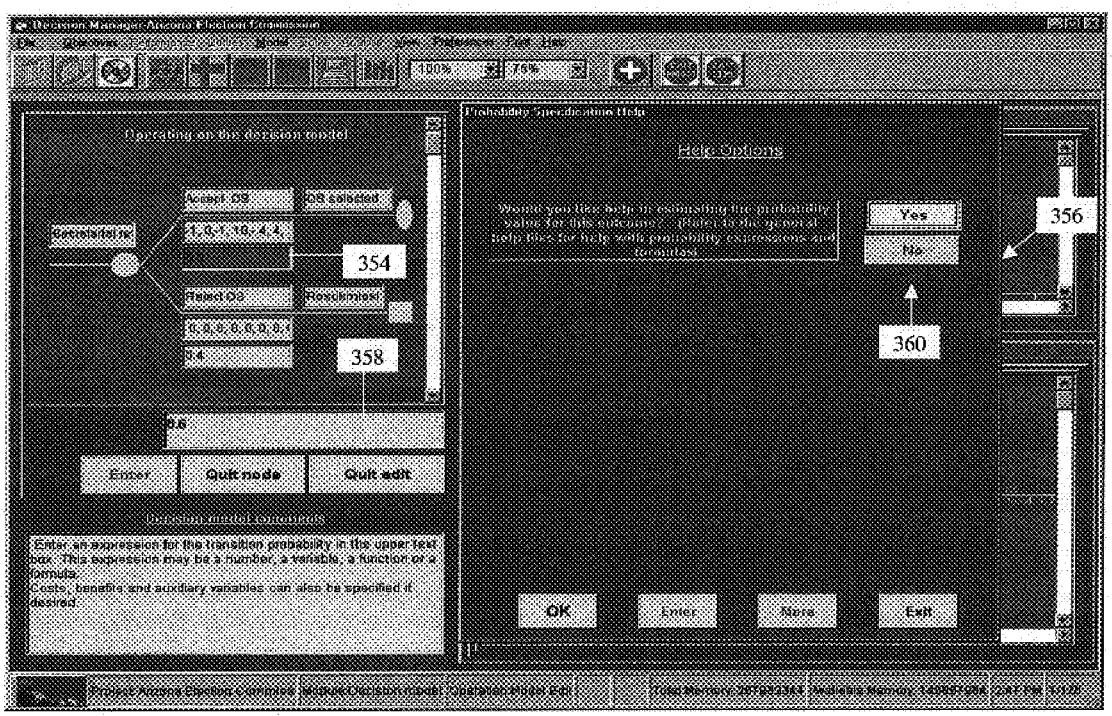
FIG. 40 provides choices for selecting probability elicitation and encoding methods. The choices are partitioned in two major groups, the group where no user-assistance is desired, and the group where assistance is requested.

Referring to FIG. 39, when the node selected in the Editing mode is a decision or chance node, and a Cost/Benefit Box 336 is selected, Table 352 is brought forward with the current cost/benefit expression displayed in the editing boxes 338 and 346. As shown, three columns in the table provide the means for displaying all the project's performance measures, and for specifying the cost/benefit contributions that result from parent-to-offspring transitions. The cells in Column 340 list the names of the measures, and corresponding cells in Column 342 list their dimensional units. Cost/benefit expressions are entered in the cells of Column 344.

In short, using values previously accumulated at the parent node as initial values, the cost/benefit contributions specified in Column 344 are added to the initial values of each corresponding measure. While this is a locally additive process, the use of mathematical expressions, auxiliary variables and backward references to previous performance measure values allows any non-linear accumulation of performance measure values. All the data shown in the table are saved on disk when the Enter button 350 is clicked. Scrolled from view in Table 354 are four columns designed for creating, editing, deleting and adding the auxiliary variables. These will be discussed with FIG. 42.

Figure 41:
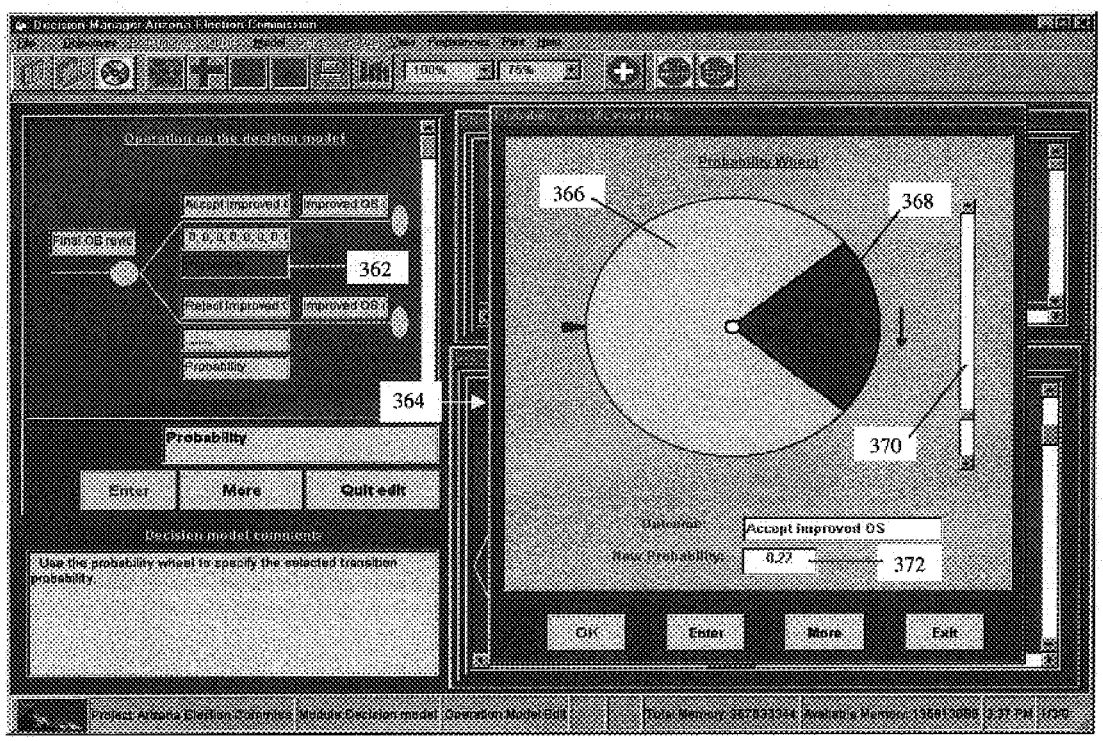
FIG. 41 shows the familiar Probability Wheel, provided as the principal elicitation method to support users in specifying the probabilities associated with chance outcomes.

When the node selected in the Editing mode is a chance node and a Probability Box 354 is selected, a panel is shown to present the user with two probability assessment help options 360. The first option, selected by clicking the "Yes" button, provides the user with a plurality of methods to assist in the specification of probabilities. Only the Probability Wheel Method, illustrated in FIG. 41, will be discussed in this disclosure. The selection of the "Yes" option opens the screen of FIG. 41, where the active probability box is numbered 362, and a window 364 is shown including a slider 370 and a probability value box 372. The method, explained in detail in [31,32,55,56], is an indirect method where the wheel is used to resolve bets associated with the dark gray area 368 and the yellow area 366, whose relative size is adjusted by moving the slider to an appropriate position. After the bets have been resolved, the ratio of Area 368 to the total area of the circle represents the user's probability estimate. In FIG. 41, this ratio equals 0.22, as shown. At the risk of violating the rules of rationality inherent in the method, the entire process of using bets can obviously be replaced by a more direct approach where the user simply moves the slider until an acceptable ratio is obtained. Also note that the Probability Wheel method excludes the use of mathematical expressions and can only be applied when numerical probability values are sought.

Figure 42:
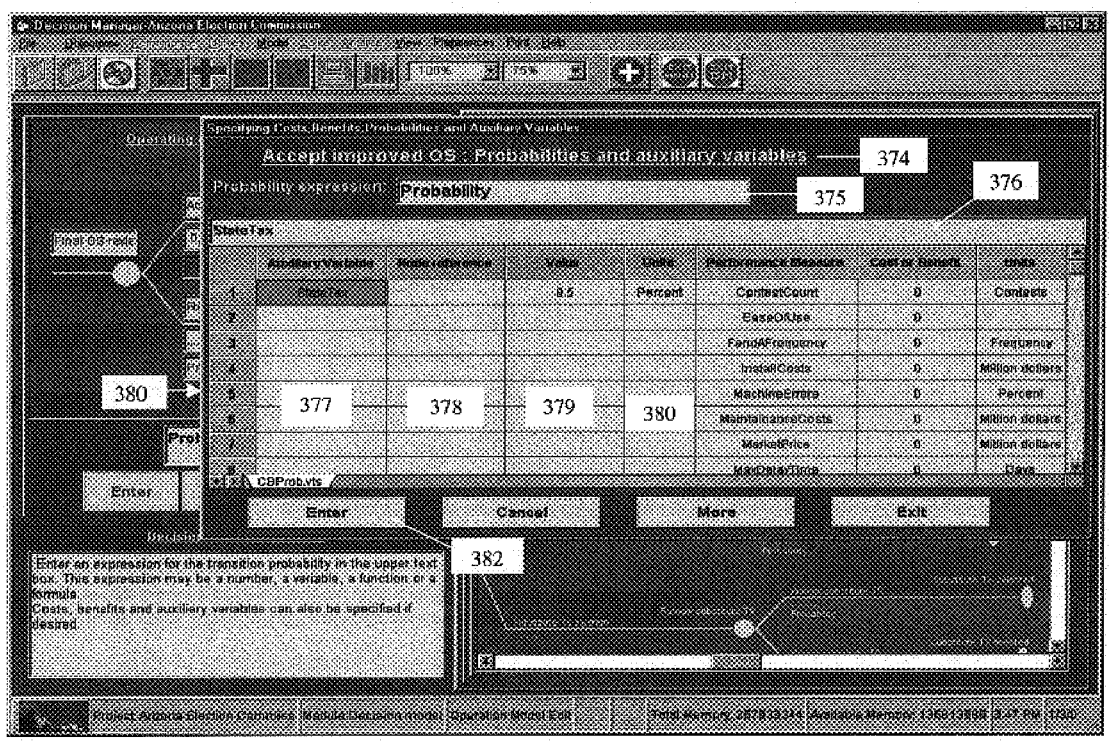
FIG. 42 provides a more detailed view of the window where auxiliary variables, costs and probabilities are specified.

When the user clicks the "No" button, the Screen of FIG. 42 is shown, with a full view of the performance measure and auxiliary variable table 381 whose heading 374 includes the selected choice name, "Accept improved OS" in the current exemplary application. Textboxes 375 and 376 are used to edit the probability associated with the selected choice, and for editing any selected cell in the table, respectively. Table 381 is a super-table of the Table 352, displaying four additional Auxiliary Variable columns, the Name column 377, the Node Reference column 378, the Value column 379, and the Units column 380. For exemplary purposes, only "State tax" is listed as an auxiliary variable, but it is not used in the voting machine selection problem solved herein.

Any string may be used to define variable units in Column 380, and any string except a node or performance name may be used to define a variable name in Column 377. Values entered in Column 379 may be real numbers or mathematical expressions involving node properties, computational variables such as an accumulated benefit at some node, or other variables. When a property of some graph node is used as an auxiliary variables, the name of the referenced node is specified in Column 379, and the property is specified as a value in Column 379.

As for Table 352, a click of the Enter button 382 starts a diagnostic subroutine that performs a plurality of mathematical, logical and linguistic consistency and constraint checks. If no violations are found, the entire table is stored as a project file.

The Solver Module

Figure 43:
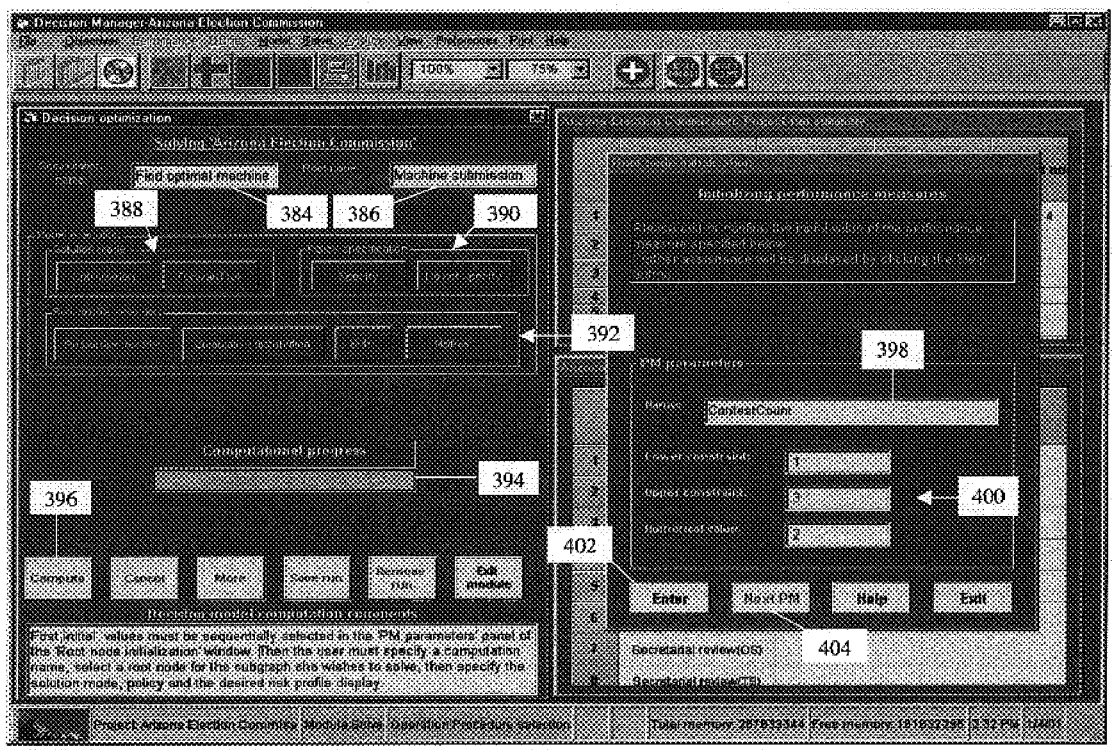
FIG. 43 is the screen that is displayed when the Model Solver module is entered. It contains two principal windows. The first is used to specify initial start-up conditions associated with the root node selected by the user. The second is used to specify run properties such as run name, root node name, run type, and data output formats. This window also provides a status bar to indicate the progress of the computation.

The solver engine is started by pressing Button 136 in the toolbar or by selecting the "Solve" menu in the menu bar, whereupon the screen of FIG. 43 appears. Every execution of the engine is an individual computation whose name is specified in Textbox 384. Prior to engaging the engine, the user must specify various computational conditions and modes. First, the user must specify the root node of the sub-graph to be solved, the "Machine submission" node in the current example. Next, initial values for the performance measures must be chosen for the root node. This is accomplished by cycling through all the measures, sequentially entering an initial value in the "Numerical value" box of the collection 400, and clicking the "Enter" command 402 and the "Next PM" command 404. The name of the selected measure being initialized is displayed in Box 398 as new measures are selected.

Next, two options are available to specify the Model Solution mode 388. Selecting the "Optimization" option will engage the engine and find the optimal solution to the problem, the "Optimal choice", and selecting "Forward roll" will report all the probabilities, cost/benefits and utilities accumulated at every node of the decision graph as it is traversed from the selected root to the terminal nodes, without performing any optimization. Next, the user must select one of two decision policies 390. The "Specify" option allows the user to pre-empt any set of decision nodes by allowing only one specified choice at these nodes, and the "Do not specify" option leaves all the decision nodes available for optimization by the solver engine. The command button 396 starts the computation process, whose progress is displayed with a progress bar 394.

Figure 44:
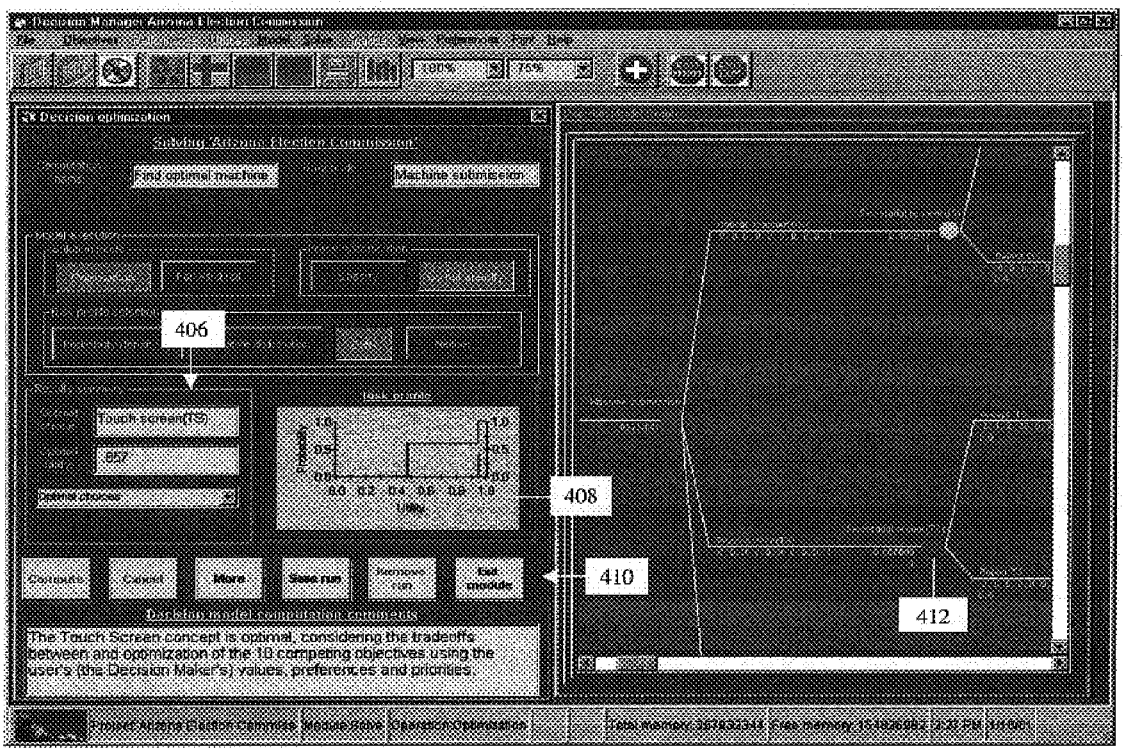
FIG. 44 displays two major windows. The first shows the optimal choice, the optimal utility, the optimal policies, and a small graph of the risk profile for the example problem. The second shows the root node selected by the user and the optimal choice node, both highlighted in red.

When the solver engine is done, the report screen of FIG. 44 is shown, displaying the optimal choice node 412 and additional optimization results in Tables 406 and 408. The first table reports "Touch-screen (TS)", the name of the optimal choice, and "0.657", the optimal utility achieved, together with a list of all the optimal choices at intermediate nodes in the graph. For the current example demonstration, the selected root is the principal root of the graph, and the optimal voting concept was found to be the Touch Screen concept. This result obviously depends on all the cost/benefit and probability values assigned previously and, depending on the sensitivity of the solution to these values, a different choice might have emerged. This sensitivity will be briefly explored during the sensitivity analysis reported later.

Figure 45:
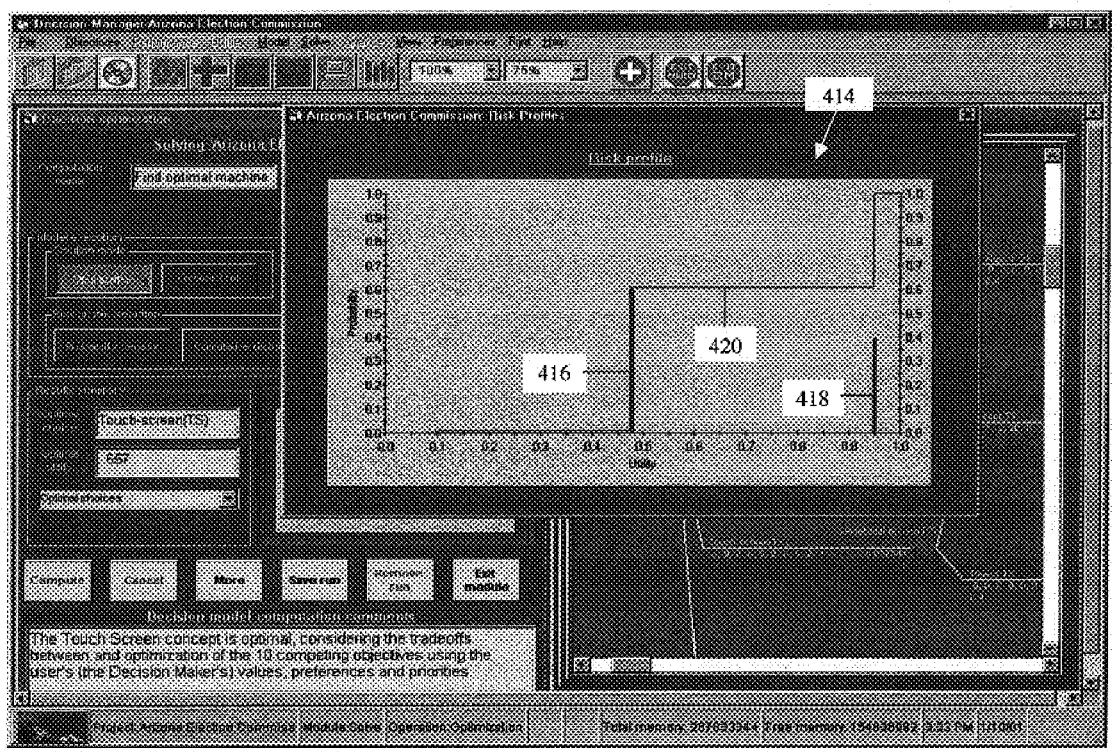
FIG. 45 shows a window containing an expanded view of the risk profile for the example problem. Both the cumulative distribution and the probability density function of the risk profile are shown.

The second table 408 shows a Risk Profile for the solution, expressed as both a probability density and a cumulative distribution of the statistical variation in the overall utility. The expanded view 414 of FIG. 45 shows the two principal density values 416 and 418, and the cumulative distribution 420. The view demonstrates very clearly that the problem, as modeled in the current example, contains a significant amount of uncertainty, considering the significant utility variation from about 0.48 to about 0.95.

The Analysis Module

Figure 46:
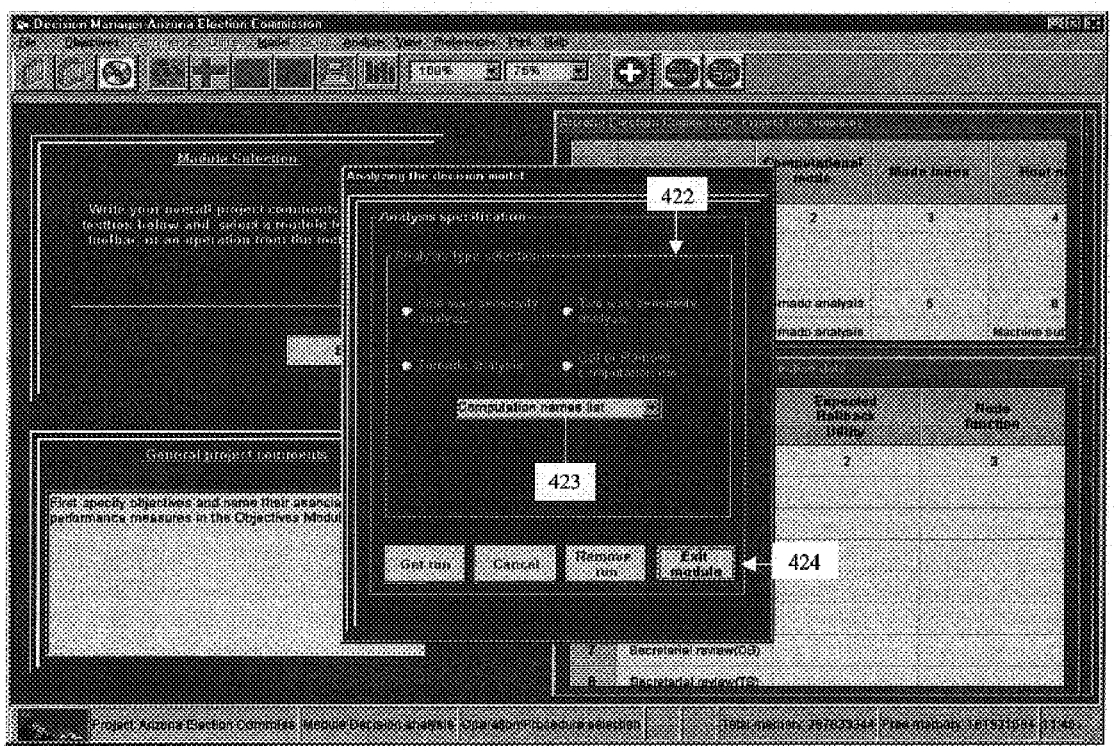
FIG. 46 is the screen that is displayed when the Model Analysis module is entered. In its principal window, the user can specify the desired type of analysis. The user may also elect to retrieve or to remove a previous analysis.

The current invention provides a plurality of analytical methods for further investigating decision models and for examining solutions in greater detail. When the "Analyze" button 138 of FIG. 14 is depressed, the Analysis module is opened and the screen of FIG. 46 is displayed, showing a selection table 422 which includes a computation names list box 423 with which any of the previous computations and solutions may be recalled and re-examined.

Previous runs are retrieved by choosing a computation name in list box 423, selecting the "Get or remove computation run" option in Table 422, and depressing the "Get run" command button in the button collection 424. The chosen run and all its associated files may be removed by depressing the "Remove run" button, and the module may be exited at any time by clicking the "Exit module" button.

Three major methods familiar to those trained in the art are provided by the current invention, a One-Way Sensitivity Analysis method, a Two-Way Sensitivity Analysis method, and a Tornado Analysis method. Considering that a one-way analysis is a special case of a two-way analysis, only the latter will be exemplified in this disclosure.

Figure 47:
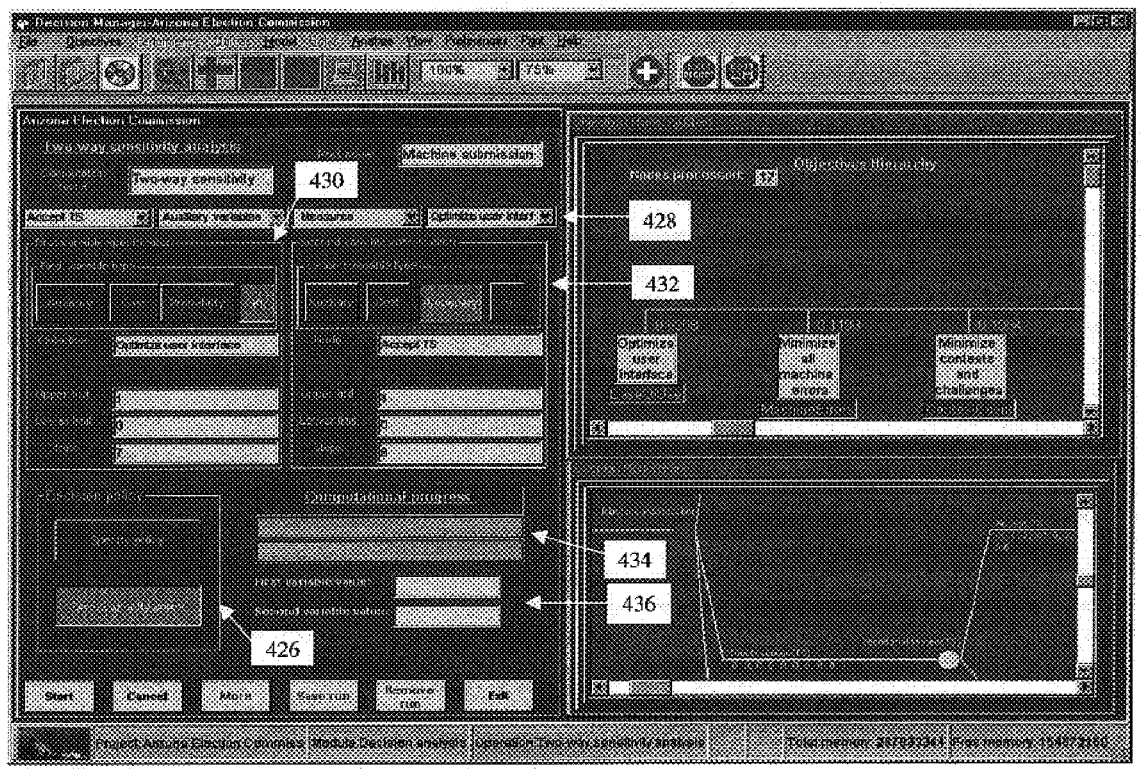
FIG. 47 displays the window where all the parameters for a two-way sensitivity analysis are specified. The window also contains two status bars. One bar is designed to indicate the progress of the fast inner loops associated with a fixed value of the sensitivity variables. The other shows the overall progress for the overall sensitivity analysis.

A two-way sensitivity analysis is initiated by selecting the corresponding option in Table 422, whereupon the screen of FIG. 47 is shown. After a computation name and a root node have been entered, the user must select a Type for both sensitivity variables. Accomplished in Panels 430 and 432, this selection enables two corresponding list boxes in the collection 428 from which specific numerical variables of the selected type are then chosen, the "Optimize user interface" objective weight and the probability of the "Accept TS" outcome in the current example. Names of the two variables are displayed in the uppermost textboxes in Panels 430 and 432, respectively. Similar to the single optimization case illustrated with the Solver Module, the user must specify a decision policy in Panel 426. The remaining three textboxes in each panel are used to specify an upper limit, a lower limit, and a quantity of variable values used in the analysis. A separate optimization run is executed for each combination of values. If 13 values are used for one variable and 10 for the other, for instance, a total of 130 optimization runs must be made.

Figure 48:
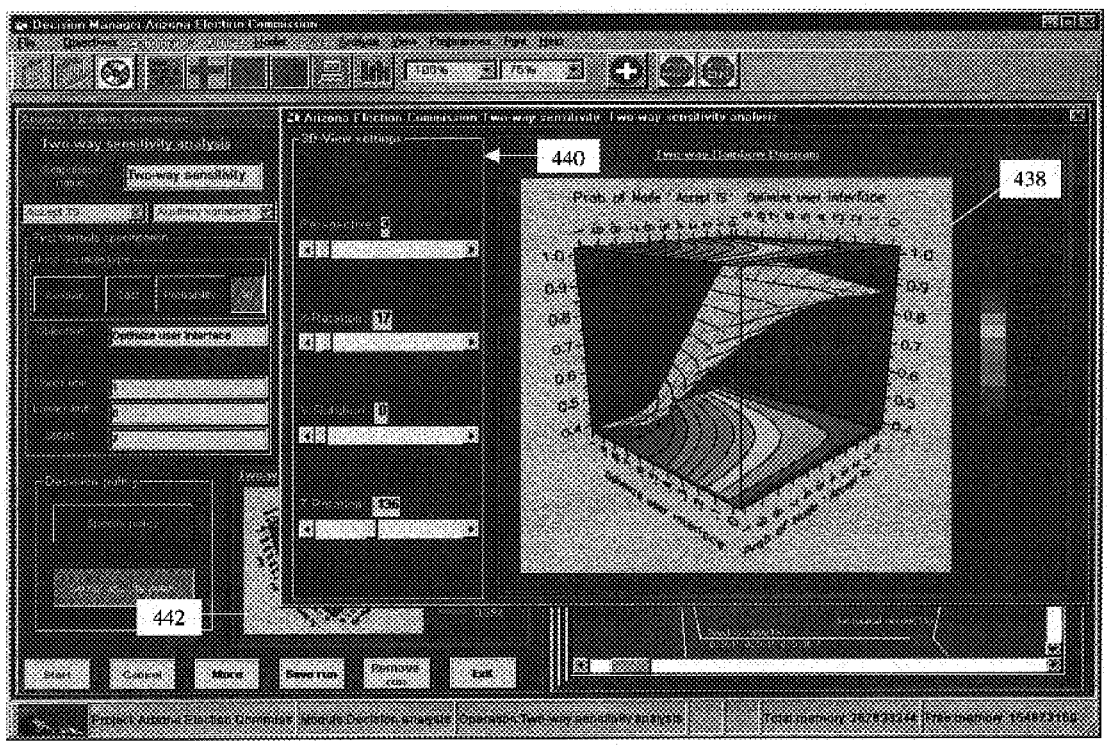
FIG. 48 provides an expanded view of the three-dimensional plot resulting from the analysis specified in FIG. 47. It displays the optimal utility values as a function of values of the two sensitivity variables. Slider bars are provided for adjusting the perspective of the plot, and for rotating the plot about its three axes.
Figure 49:
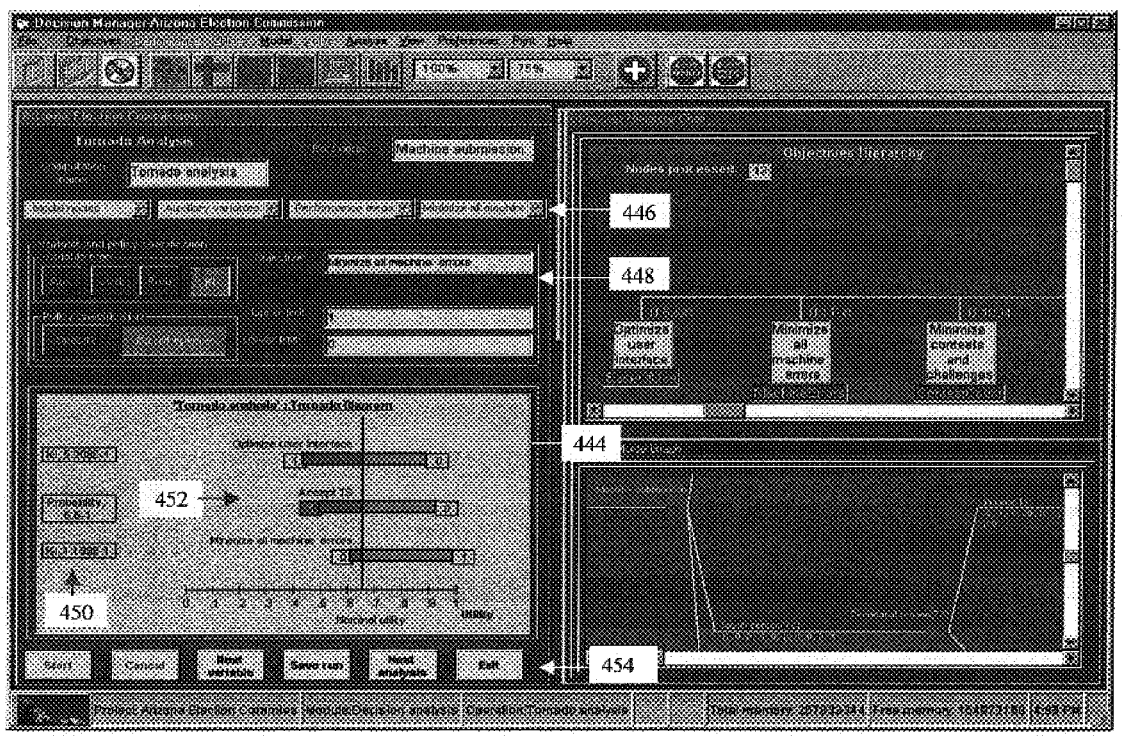
FIG. 49 shows the Tornado Diagram for a typical parametric analysis involving three variables. In addition to the variable and utility extremes associated with the three variables, the diagram uses blue segments to show areas of decreasing utility and green segments to show areas where the utility is increasing. The red color is used on the side where a switch in optimal choice occurs.

Two progress bars 434 and two information boxes 436 are displayed for the user. The upper progress bar reports the status of the inner computational loops associated with individual nodes in the decision model, cycling through the bar once for each node. The lower bar reports the computational status at the sensitivity level, cycling through the bar once for every combination of variable values. The upper and lower information boxes report the instantaneous value of the first and the second sensitivity variable, respectively. Results of the analysis are displayed as a three-dimensional plot 442, also shown in the enlarged view 438 of FIG. 48. As a brief examination of the plot extremals, the optimal utility reaches its global minimum value of 0.4 when both variables equal 1, and about 0.85 when they equal zero. The optimal solution is thus quite sensitive to variations in the two selected variables.

The control panel 440 provides four slide bars for viewing the plot from a plurality of directions. The slider in the uppermost bar determines the perspective of the plot. The sliders in the remaining three bars are used to specify plot rotation magnitudes about the x, y, and z-axes, respectively.

A Tornado analysis is initiated by selecting the corresponding option in Table 422, whereupon the screen of FIG.

49 is shown. Given that variables are varied only one at a time during a Tornado analysis, run parameters are specified in a single panel 448 and with a single collection 446 of list boxes for selecting the sensitivity variables. Persons familiar with the art will recognize Plot 452 as a typical Tornado Graph where optimal solutions have been calculated for two extreme values of three variables, each pair of runs shown as a horizontal bar in 452. The nominal optimal utility value of 0.65 is indicated by the vertical axis, and the nominal variable values associated with the nominal utility are shown in the three boxes 450. For each bar, the green segment indicates the variation observed when the variable is varied from its nominal value to its maximal value, whose number is attached as shown. Similarly for the blue segment, whose minimal value is attached to its left. When the attached number is shown with a red background, a switch in optimal choice has occurred during the variation of its attached segment. Such switches are very revealing and are usually further investigated with a one-dimensional sensitivity analysis to discover the point where they occur.

The Second Preferred Embodiment

Considering that the method and means of the first embodiment apply to the second embodiment as well this section focuses on the differences between the two embodiments.

Figure 8:
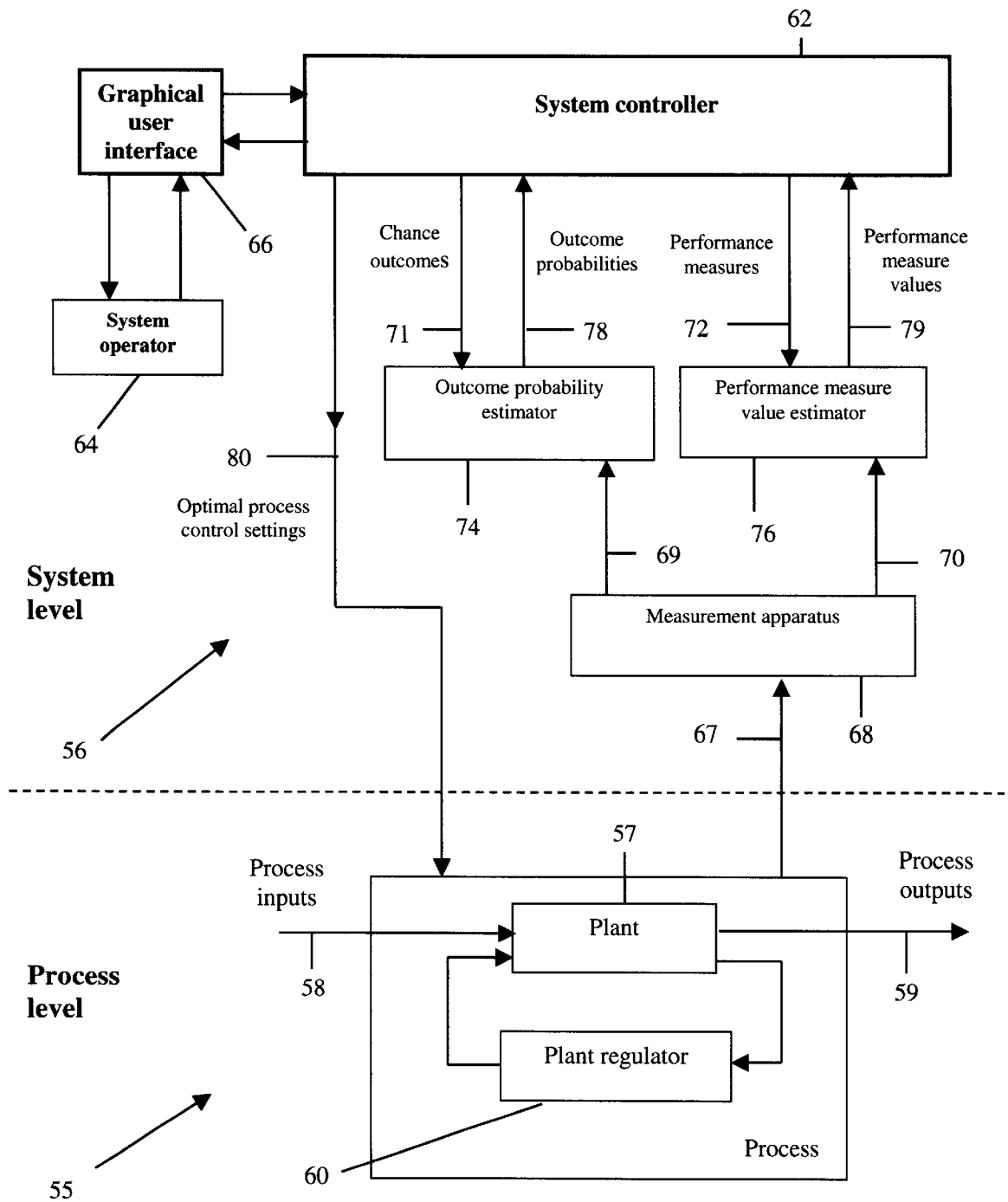
FIG. 8 shows the general hardware configuration, in accordance with the second embodiment of this disclosure, for operating processes whose optimization requires the real-time solution to complex sequential and probabilistic decision problems.

Referring to the hardware diagram of FIG. 8, the execution of a sequential decision model integrated within a system controller 62 requires information not typically available from the process level 55 when such a model is absent. Whereas the local process inputs 58 and outputs 59 normally remain unaltered, plant hardware 57, communication links 67, control hardware 60 and the measurement apparatus 68 must be upgraded to provide the means for generating the additional information required by the sequential model. Such upgrades are performed routinely for many applications within the art of process control, and no claims of novelty are made concerning this upgrade process. Two rather conventional pieces of hardware are required to estimate the probabilities and performance measure values needed by the decision model, the outcome probability estimator 74 and the performance measure value estimator 76.

Operating on the collection of outcomes received from Link 71 and on process measurements received from Link 69, the probability estimator 74 computes the probability estimates and communicates these to the system controller 62 via Link 78. Similarly, the value estimator 76 operates on the set of performance measures received from Link 72 and on the process measurements received from Link 70, and communicates its outputs to the system controller 62 via Link 79. The entire system is controlled by the system operator 64, who builds, integrates, manages and executes the decision model by way of the GUI 66. Two versions of the GUI are disclosed here, a stand-alone version, and an integrated version. The stand-alone version is essentially identical to that used in the first embodiment, and is operated side-by-side with other process control interfaces. The integrated version uses existing interface hardware, upgraded to provide the additional windows and views required for the integration of the first embodiment.

Figure 9:
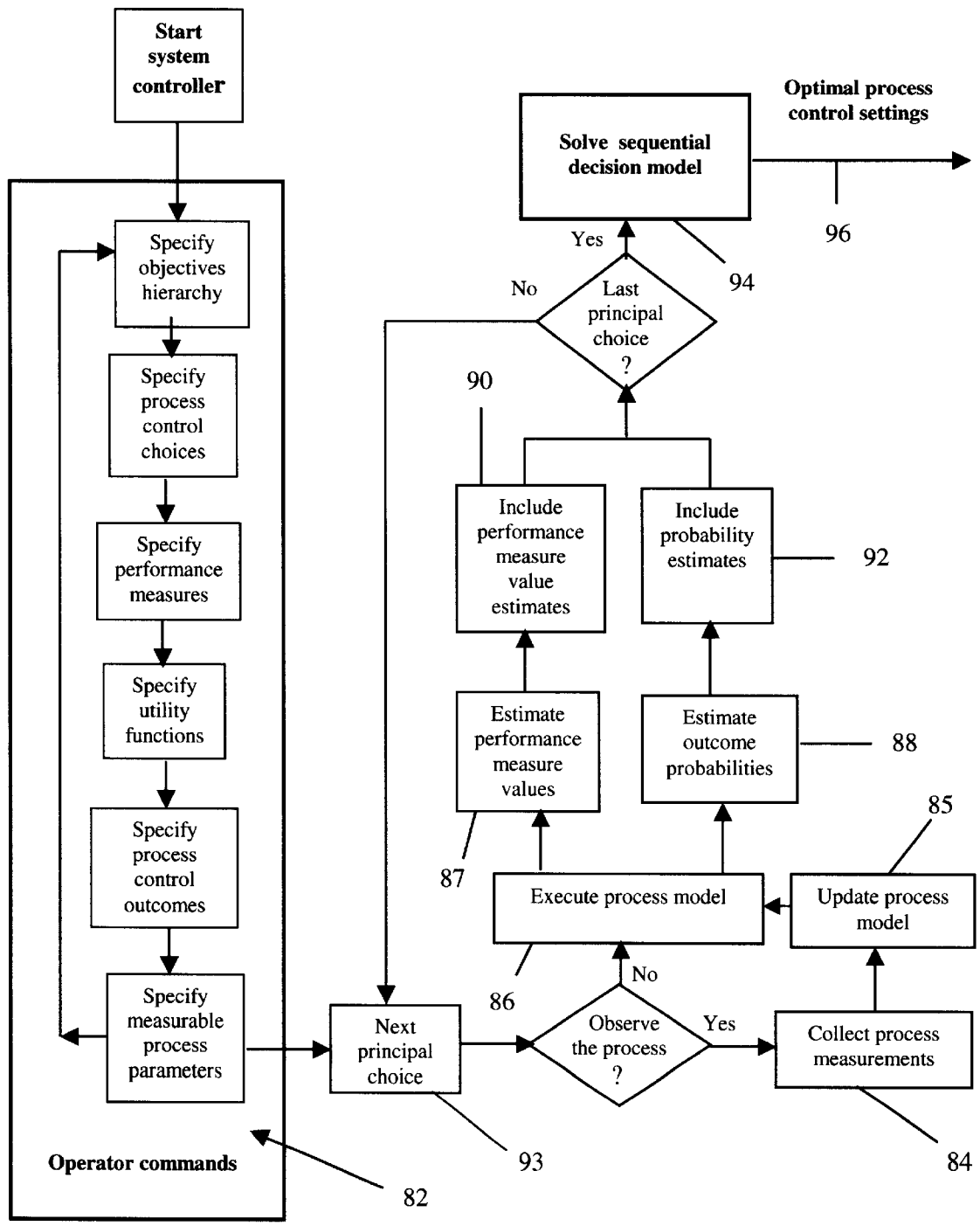
FIG. 9 is a flowchart of the method, in accordance with the second embodiment of the current invention, for optimizing the control of processes whose operation involves complex sequential and probabilistic decisions.

A functional flowchart of the second embodiment is shown in FIG. 9. Persons skilled in the arts of process control and sequential decision analysis will recognize that the operator commands and inputs 82 are conceptually similar to those used in the first embodiment, but their semantics are derived in a context determined by the controlled process, as illustrated with the electric power plant generation and distribution example discussed in the background section.

Recall that a principal choice is any choice attached to the principal root specified by a user. For any such choice, the method updates the performance measure values and outcome probabilities of the integrated decision model, as follows.

Whenever the statistical variance—or any other measure of variability or uncertainty—exceeds an acceptable value, or whenever an unacceptable drift in the performance measure values or outcome probabilities is observed, additional process measurements are collected 84 and the process simulation model is updated 85. Otherwise, no new process measurements are collected. In either case, the process simulation model is executed 86 to yield outputs from which performance measure values and outcome probabilities can be estimated. These estimates are incorporated into the decision model with Subroutines 90 and 92, respectively.

When all the values and probabilities have been updated, the decision model is complete and is solved with the procedure 94 of the first embodiment, thereby generating the optimal process control settings 96. These settings are communicated as commands to the plant process via Link 80 in the hardware diagram of FIG. 8. The entire optimization process is repeated cyclically at a rate specified by the system operator 64.

Conclusions, Ramifications and Scope of the Invention

Accordingly, the reader will see that the novel software and novel graphical interface of this invention provide a highly structured, modular, user-friendly and stand-alone tool for solving sequential, probabilistic and multi-objective decision problems, for conducting risk analyses, and for optimizing the global performance of systems. Designed for a wide variety of computational platforms, this tool comprises specific algorithmic, textual and graphical procedures enabling a user to perform operations not currently provided by the art. For both preferred embodiments, these novel operations include:

a. constructing and editing objectives hierarchies, and seamlessly integrating the hierarchies with decision models, b. specifying and processing vectors of quantitative, qualitative, continuous, discrete or linguistic performance measures, together with bounds and constraints for the measures, c. constructing and editing arbitrary utility functions using a keyboard and graphical methods including the Mid-Value Splitting method, d. constructing and editing, using a keyboard and graphical methods, multi-dimensional cost and benefit functions at every node of a decision network, e. constructing and editing arbitrary probability functions using a keyboard and graphical methods including the Probability Wheel method, f. creating auxiliary variables, thereby providing means for including, in cost, benefit and probability expressions associated with a given node in a decision network, references to and parameters associated with other nodes in the network, and parameters and variables representing conditions external to the network, g. organizing into a project, data received and produced by the method, appending a new project to previous projects stored in a computer, and retrieving a project from the list to allow reviewing, editing, copying, deleting or rerunning a project, or running an edited project.

For the second embodiment as a process and system controller, the novel operations further include:

h. adding to and integrating with conventional controllers a higher level control layer where controllers are further optimized to account for sequential, probabilistic and multi-objective decision problems whose solutions determine global system performance, yet are insufficiently addressed or even totally ignored in conventional controllers.

Although the motivation and description presented above contain many specificities, these should not be construed as limiting the scope of the method, but as merely providing illustrations of some of its salient features. By building a network that does not contain any decision nodes, for instance, a probabilistic cause-consequence structure is obtained. Much like conventional risk analysis models, this structure allows the direct evaluation of the probabilistic consequences of and risks associated with causative events throughout the network.

Although the first embodiment of the method was presented as a decision-solving method, minor modifications will extend its application to the solution to queueing systems, scheduling problems, Bayesian Networks and process control optimization.

While the application of its second embodiment to the control of electrical power generation and distribution systems and other large-scale processes is obviously important, the method will improve the control of any system or device whose operation involves sequential decisions.

Thus the scope of the method should be determined by the appended claims and their legal equivalents, rather than by the motivation, specifications and examples recited above.

APPENDIX

OBJECT CODE FOR THE INVENTION

A direct printout of the entire Visual Basic 6.0 object code for the preferred embodiment of the invention is listed below. It was included to provide additional evidence of the successful reduction to practice of the invention.

!This program cannot be run in DOS mode.

$ .text `.data .rsrc MSVBVM60.DLL foO
f(E
fs>
f"x
f%C
f>6
f]E fRK
f
fg} ?fffff 4@333333 ?fffff ?333333 333333 <}
j fffff ?333333 ?fffff ?333333 ?fffff ?333333 ?333333 ?333333 ?fffff ?333333 ?fffff
4@fffff DecisionSolver DS1-V1-1 DecisionSolver DecisionSolver X
gD lhA
|7
@ v7@
P+
A v7@
Dge
v
7@ VCF15.ocx VCF150Ctl.F1Book F1Book GRASH GRASH Enabled BorderStyle
comctl32.ocx ComctlLib.Toolbar Toolbar comctl32.ocx ComctlLib.StatusBar StatusBar
comctl32.ocx ComctlLib.ProgressBar ProgressBar comctl32.ocx ComctlLib.ImageList Ima
geList Enabled comctl32.ocx ComctlLib.Slider Slider BackColor Enabled TextRTF
RICHTX32.OCX RichTextLib.RichTextBox RichTextBox BorderStyle MCI32.OCX
MCI.MMControl MMControl comdlg32.ocx MSComDlg.CommonDialog CommonDialog
DataSource Data
Path olch2x32.ocx OlectraChart2D.Chart2D Chart2D olch3x32.ocx OlectraChart3D.Chart3D
Chart3D BackColor ForeColor Enabled MousePointer Value SmallChange LargeChange
ProportionalThumb Orientation Delay MouseIcon FM20.DLL MSForms.ScrollBar ScrollBar
frmCBProb frmDMHelp frmStartup modUtilities frmDMSummary frmDSDialog frmDSGraph frmLegal frmModelProbs frmNodeEdit frmOHChart frmOHDialog frmPDTable frmPMDialog frmPMeasures fr
mProbHelp frmProbStructure frmProjSave frmProjSelect frmPVTable frmRootEdit frmSplash frmStartDialog frmUtilAssess frmUtilDialog frmViewComments frmViewDatabases modDesigner modDialogs modDraw modModel modObjectives modPMeasures modStartup modUtils frmCompSelect fr
mCompDialog1 frmRiskProfile frmPrintView frmCompDialog2 frmRainbow frmCompDialog3 frmProjRunSummary frmTornado frmCompData modComputations frmPMInit DecisionSolver cmdACBProb F1CBProb
g:\developmentsoftware\accessories\tidestone-visualcom
ponents\formulaone5.xactivex\VCF15.oca VCF15OCtl txtACBProb
C:\WINNT\System32\RICHTX32.oca RichTextLib cboCBProb CreateCompatibleDC
G:\DevelopmentSoftware\VB98\VB6.OLB lblACBProb kernel32 cmd
ADSDialog GetWindowsDirectoryA winmm.dll waveOutGetNumDevs GlobalMemoryStatus GDI32 USER32 GetDC GetDeviceCaps vsbDSDGraph ("A
 CreateCompatibleBitmap GetSystemPaletteEntries CreatePalette SelectObject BitBlt DeleteDC GetForegroundWindow SelectPalette RealizePalette GetWindowDC GetWindowRect ReleaseDC GetDesktopWindow
 olepro32.dll OleCreatePictureIndirect prgDSGraph C:\WINNT\System32\comctl32.oca ComctlLib lblDSGArray hsbDSGraph vsbDSGraph prglblArray F1DSGraph pctDSGraph lblDSGraph optADSDialog fraADSDialog pctDSDGraph cmdADSDCommands lblADSDialog t
xtDSDGArray txtADSDialog Solve Analyze tbrModel mnuModel mnuObjectives Model cbo2tbrParent mnuUtilSub tbrUtils MDIForm mnuPreferences Preferences Spacer1 mnuSolveMode mnuPrint mnuFile Objectives stsD
M ProgressBar1 mnuPolicyRiskProfile tbrObjectives mnuPolicy mnuPolicyProbFunction mnuNoPolicyRiskProfile mnuSensPolicy mnuPolicySensAnalysis mnuNoPolicySensAnalysis mnuTornadoPolicy mnuNoPolicyProbFunction tbrParent mnuRollPolicy mnuHelp mnuPerformance mnuUti
lities mnuOHZoom mnuMZoom mnuSolve mnuCompMode mnuView mnuDatabases mnuResults mnuProjComments cbo1tbrParent Utilities Print Performance mnuPreferences_Click txtCommentsTemp lblOHCArray __vbaR4Var __vbaBoolVarNull pctOHChart VBA6.DLL __vbaLateMemCallSt __vba
CastObjVar __vbaVarMul lblOHCPMArray lblAOHChart __vbaFpR4 __vbaPowerR8 __vbaStrVarCopy __vbaVarSub __vbaLenVar __vbaVarCat F1OHChart __vbaLenBstr __vbaI2I4 __vbaVarTstEq __vbaVarCopy __vbaStrVarVal __vbaFreeStrList __vbaVarDup __vbaVarCmpEq __vbaVarAnd __vbaVar
Move __vbaErrorOverflow __vbaStrCopy __vbaLateIdCall __vbaFreeVarList __vbaBoolVar __vbaVarTstGt __vbaObjSet __vbaFreeStr __vbaI4Str __vbaLateIdCallLd __vbaStrVarMove __vbaStrCmp __vbaStrMove __vbaFreeObj __vbaNew2 __vbaI4Var __vbaI2Var __vbaFreeVar __vbaLateMemCal
ILd __vbaLateMemSt __vbaObjSetAddref __vbaLateMemCall __vbaFreeObjList __vbaHresultCheckObj __vbaLateIdSt txtDMHelp rhsbOHChart vsbOHChart prgOHChart rF1DMSummary lblDMSummary txtDMSummary rtxtAProjSave dirProj Save drvProjSave cmdAProjSave lblAProjSave cmdACompDialog2 lblACompDialog2
prgACompDialog2 rcmdAPrintView lblAPrintView pctPrintView txtAPrintView
rcmdAStartDialog txtProjComments txtAStartDialog lblAStartDialog cboACompDialog2
txtACompDialog2 optACompDialog2Policy optACompDialog21 optACompDialog22
fraACompDialog2 chrt2DC
ompDialog2 C:\WINNT\System32\olch2x32.oca OlectraChart2D chrt3DCompDialog2
C:\WINNT\System32\olch3x32.oca OlectraChart3D txtViewComments rlblAPMInit
fraPMInit cmdAPMInit txtAPMInit rlblAOHDialog cmdAOHDialog fraAOHDialog
txtOHComments txtAOHDialog cboOHDialog optAOHDialog F1CompData
rfraACompDialog1 optACompDialog1Mode optACompDialog1Risk
optACompDialog1Policy txtACompDialog1 lblACompDialog1 chrt2DCompDialog1
prgCompDialog1 cmdACompDialog1 txtDAComments cboCompDialog1 rcmdAProjSelect
lblAProjSelect cmdAViewComments lblViewComments rlblANodeEdit cmdANodeEdit
txtANodeEdit optANodeEdit rcmdAProbHelp optAProbHelp pctPro
bHelp lblAProbHelp vsbProbHelp txtProbHelp rcmdARootEdit txtRootEdit lblARootEdit
optARootEdit rF1PMeasures F1Utilities txtPMeasures lblAPMeasures roptAPMDialog
cboPMDialog fraAPMDialog lblAPMDialog cmdAPMDia
log txtAPMDialog txtPMComments rfraAUtilDialog lblAUtilDialog txtAUtilDialog
pctUtilDialog cmdAUtilDialog F1UtilDialog txtUAComments sldUtilDialog cboAUtilDialog
rlblAUtilAssess optAUtilAssess cmdAUtilAssess fraUtilAssess rlblATorDialog
cboAcompDialog3 lblACompDialog3 cmdACompDialog3 prgCompDialog3
pctCompDialog3 txtACompDialog3 optACompDialog3 fraACompDialog3 F1CompDialog3
rchrt2DRiskProfile hsbARainbow C:\WINNT\System32\FM20.oca MSForms fraRainbow
chrt2DRainbow chrt3DRainbow lblARainbow rlblATorView fraTornado pctTorView
lblATornado F1TorView F1ModelProbs pctSplash rtmr1Splash roptACompSelect
fraACompSelect cboACompSelect cmdACompSelect optACompSelectPolicy tmr2Splash
__vbaNextEachCollObj __vbaCastObj __vbaForEachCollObj __vbaStrI4 __vbaFpI4
__vbaLateIdCallSt __vbaExitProc __vbaOnError __vbaFileCloseAll __vbaStrCat __v
baSetSystemError __vbaCyVar __vbaR4Cy __vbaVarNot __vbaCheckType __vbaFpR8
__vbaUbound __vbaRedimPreserve __vbaR8Var __vbaFpI2 __vbaGenerateBoundsError
__vbaRedim F1ProjRunSummary rlblProjRunSummary rF1ProbStructure rF1PVTable
rF1PDTable rtxtViewDatabases F1ViewDatabases
tmr3Splash img2Splash mciSplash C:\WINNT\System32\MCI32.oca img1Splash c
mdSplash CSVBFX32.DLL CSVBFX __vbaVarOr __vbaUI1I2 __vbaStrTo
Ansi __vbaVarTstNe __vbaPrintObj __vbaLsetFixstrFree __vbaStrToUnicode
__vbaLsetFixstr __vbaVarAdd __vbaStrR4 __vbaR4Str __vbaVarCmpGt __vbaVarMod
__vbaVarCmpLt __vbaVarIdiv __vbaVarCmpNe __vbaR8Str __vbaInStr __vbaStrComp
__vbaVarIndexLoadRef __vbaVarAbs __vbaVarDiv __vbaVarTstLt __vbaPrintFile __vbaF
ileOpen __vbaFileClose __vbaStrR8 __vbaVarIndexLoad __vbaAryLock __vbaAryUnlock
__vbaObjVar __vbaVarNeg __vbaVarCmpLe __vbaVarTstLe __vbaI2Abs
__vbaVarLateMemCallLd __vbaVarZero __vbaVarLateMemSt __vbaVarIndexStore
__vbaVarCmpGe __vbaVarTstGe __vbaAryDestruct __vbaStrI2 __vbaInStrVar __vbaEnd
__vbaVarForInit __vbaVarForNext __vbaVarIndexLoadRefLock frmLegal Form1 Form1
ArialD frmDMHelp Decision Manager Help Form1 ArialI txtDMHelp RichTextLib.RichTextBox {\rtf1\ansi\deff0\deftab720{\fonttbl{\f0\fswiss MS Sans Serif;}{\f1\froman\fcharset2 Symbol;}{\f2\fswiss MS Sans Serif;}}
{\colortbl\red0\green0\blue0;}
\deflang1033\pard\plain\f2\fs17 RichText
\par }
MS Sans Serif frmProjSelect Form1 cmdAProjSelect Arial% Exit project selection cmdAProjSelect Cancel Arial% Cancel project selection. cmdAProjSelect Delete project Arial) cmdAProjSelect Copy project Arial) cmdAProjSelect Open Project Arial) lblAP rojSelect Project Selection Arial lblAProjSelect Choose a project by selecting its keyword in the table Arial frmViewComments Project or module comments Form1 ArialI cmdAViewComments Close and save Arial%A Click here to exit and save all text to the module comments file. cmdAViewComments  Append selected text Arial%S Click this button to append the selected text to the general project comments file. txtViewComments RichTextLib.RichText
Box ArialJ8 Select text to be appended to general project commets. lblViewComments Module : Project Arial frmUtilAssess Utility Assessment Form1 cmdAUtilAssess Arial%0 Return to the utility function selection mode. cmdAUtilAssess Cancel Arial% Select another method. cmdAUtilAssess Arial% Accept the selected method. fraUtilAssess Method selection Arial optAUtilAssess Lotteries Arial"Y Use lotteries to derive a new utility value.(This method not available in this version.) optAUtilAssess Mid-Value splitting Arial"T Graphically specify the PM value where the utility function reaches th
e mid-value. optAUtilAssess Direct method Arial"A Point-by-point graphical specification of the utility function. lblAUtilAssess Select a utility assessment method by clicking the appropriate option button below. Arial lblAUtilAssess Piecewise-linear construction mod
e Arial frmRootEdit Editing the selected node Form1 cmdARootEdit Cancel Arial) cmdARootEdit Arial%, Do not create new root, and exit root dialog cmdARootEdit Enter Arial% Accept new root type and name optARootEdit Chance root Arial" New root will be a chance node. optARootEdit Decision root Arial"! New root will be a decision node. txtRootEdit RichTextLib.RichTextBox {\rtf1\ansi\deff0\deftab720{\fonttbl{\f0\fswiss MS Sans Serif;}{\f1\froman\fcharset2 Symbol;}{\f2\fswiss Arial;}{\f3\fswiss Arial;}}
{\colortbl\red0\green0\blue0;}
\deflang1033\pard\plain\f2\fs20\b New root name
\par }
 ArialJ Enter new root name here. lblARootEdit New root name: Arial lblARootEdit You have selected the root node. To create a new root, select its type, specify its name, and click "Enter". Otherwise, to edit the current root, click "Exit". Ar
ial lblARootEdit Decision Graph root Arial frmProjSave Saving current project as Form1 cmdAProjSave Arial) cmdAProjSave Arial) drvProjSave Arial dirProjSave _M
 Arial txtAProjSave RichTextLib.RichTextBox Arial txtAProjSave
RichTextLib.RichTextBox Arial lblAProjSave The project and all its files will be organized and stored in a subdirectory of the directory that you select
 below. The name of that subdirectory is the same as your project keyword. Arial lblAProjSave Project"Save As" dialog Arial lblAProjSave  New project keyword: Arial lblAProjSave Specify a drive: Arial lblAProjSave Specify a directory: (doub le-click) Arial lblAProjSave New project name: Arial frmCompSelect Analyzing the decision model Form1 Arial fraACompSelect Analysis specification Arial cmdACompSelect Exit module Arial% Return to the main menu. cmdACompSelect Remove run Arial%7 Remove the specified run from the computation database. cmdACompSelect Cancel Arial%" Cancel your request specification. cmdACompSelect Show run Arial%# Confirm your request specification. fraACompSelect Analysis type selection cboACompSelect Computation names list fraACompSelect Policy specification optACompSelectPolicy Do not specify policy optACompSelectPolicy Specify policy optACompSelect One-way sensitivity analysis Start a one-way sensitivity analysis optACompSelect Get or Remove computation r
un Retrieve or delete a previous run from storage. optACompSelect Tornado analysis Combine several one-way sensitivity analyses into a Tornado Diagram. optACompSelect Two-way sensitivity analysis Start a two-way sensitivity analysis. r:
O frmPMInit Root node initialization Form1 cmdAPMInit Arial) cmdAPMInit Next PM Arial) cmdAPMInit Arial% Exit the computation module. cmdAPMInit Enter Arial%* Store the initial value into the database. fraPMInit PM parameters Arial txtAPMInit RichTextLib.RichTextBox Arial txtAPMInit RichTextLib.RichTextBox Arial txtAPMInit RichTextLib.RichTextBox Arial txtAPMInit RichTextLib.RichTextBox Arial lblAPMI
nit Numerical value: Arial' lblAPMInit Upper constraint: Arial' lblAPMInit Lower constraint: Arial' lblAPMInit Name: Arial' lblAPMInit Arial lblAPMInit Initializing performance measures
MS Sans Serif frmPrintView Printing specifications Form1 cmdAPrintView Arial) cmdAPrintView Cancel Arial) cmdAPrintView Print Arial) txtAPrintView RichTextLib.RichTextBox ArialJ Zooming out: specify the number by which both the height and the width of the full-page printed picture will be reduced (aspect and shape of the picture will be preserved in this zooming procedure). txtAPrintView RichTextLib.RichTextBox ArialJd Specify the position of the top edge of the printed picture as a fraction of the height of the page. txtAPrintView RichTextLib.RichTextBox ArialJ] Specify the position of the left edge of the printed picture as a fraction of the page width. pctPrintView lblAPrintView Reduction factor: Arial lblAPrintView Top position: Arial lblAPrintView Left position: MS Sans Serif lblAPrintView Specify the position and size of the printed picture. For a maximum-size picture, set the left and top positions to zero and the reduction factor to unity. Arial frmStartDialog Form1 ArialD cmdAStartDialog Arial) cmdAStartDialog Exit module Arial) cmdAStartDialog Cancel Arial) txtAStartDialog RichTextLib.RichTextBox
{\rtf1\ansi\deff0\deftab720{\fonttbl{\f0\fswiss MS Sans Serif;}{\f1\froman\fcharset2 Symbol;}{\f2\fswiss Arial;}{\f3\fswiss Arial;}}
{\colortbl\red0\green0\blue0;}
\deflang1033\pard\plain\f2\fs20\b RichText
\par }
 Arial txtAStartDialog RichTextLib.RichTextBox
{\rtf1\ansi\deff0\deftab720{\fonttbl{\f0\fswiss MS Sans Serif;}{\f1\froman\fcharset2 Symbol;}{\f2\fswiss Arial;}{\f3\fswiss Arial;}}
{\colortbl\red0\green0\blue0;}
\deflang1033\pard\plain\f2\fs20\b RichText
\par }

Arial txtProjComments RichTextLib.RichTextBox ArialJ) Enter your overall project
comments here. lblAStartDialog Project creation module Arial lblAStartDialog Write your
overall project comments in the textbox below and select
a module from the toolbar, or an operation from the menu bar. Arial lblAStartDialog Project
keyword: Arial lblAStartDialog Project name: Arial lblAStartDialog General project
comments Arial frmNodeEdit Editing the selected node Form1 ArialI cmdANodeEdit
Arial%D Exit this dialog and return to main node editing dialog.Do not save. cmdANodeEdit
Cancel Arial% Cancel entered data and reset. cmdANodeEdit Enter Arial%( Save enter
ed data in the decision model. optANodeEdit Continuation node Arial" Change to
"Continuation" type. optANodeEdit Terminal node `
 Arial" Change to "Terminal" type. optANodeEdit Chance node Arial" Change to "Chance"
type. optANodeEdit Decision node Arial" Change to "Decision" type. txtANodeEdit
RichTextLib.RichTextBox ArialJ5 Enter the quantity of additional node offspring here.
txtANodeEdit RichTextLib.RichTextBox ArialJ( Edit the name of the selected node here.
lblANodeEdit Quantity of new offspring: Arial lblANodeEdit Selected node name: Arial
lblANodeEdit Change type of selected node to: Arial lblANodeEdit Name, type, offsprin
g quantity Arial*, Edit node name, type and offspring quantity. frmProbHelp Probability
Specification Help Form1 cmdAProbHelp Arial% Select another outcome. cmdAProbHelp
Arial%. Exit probability assessment assistance mode. cmdAProbHelp Enter Arial%, Enter
the new probability into the database. pctProbHelp txtProbHelp RichTextLib.RichTextBox
ArialJ# Outcome currently under assessment. vsbP
robHelp lblAProbHelp Probability Wheel Arial*Y Consult the general help files for a lottery
interpretation of the ' Probability Wheel '. lblAProbHelp Arial*o Your assessment of the
probability of occurrence of the selected outcome(multiply by 100 to get
a percentage). lblAProbHelp New Probability: Arial lblAProbHelp Outcome: Arial
cmdAProbHelp Arial% Accept selected option. optAProbHelp Arial"; Prefer entering
probability values or expressions directly. optAProbHelp Arial"G
 Request help using the methods of Multi-Attribute Utility Theory (MAUT) lblAProbHelp
Would you like help in estimating the probability value for this outcome? (Refer to the
general help files for help with probability expressions and formulas) Arial lblAProbHelp
Help Options Arial frmPMDialog Performance Measures Form1 fraAPMDialog
cmdAPMDialog Exit module Arial%% Exit the Performance Measures module.
cmdAPMDialog Arial%P Press this button to accept the performance measure selection from
the PM Table. lblAPMDialog
 To specify or edit a performance measure, select its name in Column 1 of the PM Table and
press the 'OK' button. PMs to which references exist cannot be edited until such references
have been removed. Use the LM Table to specify or edit linguistic m
easure values and utilities. Arial txtAPMDialog RichTextLib.RichTextBox Arial
txtAPMDialog RichTextLib.RichTextBox Arial txtAPMDialog RichTextLib.RichTextBox
Arial txtAPMDialog RichTextLib.RichTextBox Arial txtAPMDialog
RichTextLib.RichTextBox Arial txtAPMDialog RichTextLib.RichTextBox Arial
fraAPMDialog optAPMDialog Linguistic Arial& optAPMDialog Discrete Arial&
optAPMDialog Continuous Arial& txtAPMDialog RichTextLib.RichTextBox Arial
cboPMDialog PM value list Arial2 txtPMComments RichTextLib.RichTextBox ArialJ9
Insert your performance measure comments in this textbox. cmdAPMDialog Arial%] Exit the performance measures specification module. Do not enter new PM data in the database. cmdAPMDia
log Cancel Arial%K Cancel your current scale type and textbox entries and update the database. cmdAPMDialog Enter Arial%U Store selected scale type and textbox entries into the performance measures database. lblAPMDialog Performance Measure Comme
nts Arial lblAPMDialog Upper constraint: Arial lblAPMDialog Lower constraint: Arial lblAPMDialog Units: Arial lblAPMDialog Step size: Arial lblAPMDialog Upper scale limit: Arial lblAPMDialog Lower scale limit: Arial lblAPMDialog Linguistic values: Arial lblAPMDialog Scale type: Arial lblAPMDialog Name: Arial lblAPMDialog Parameter Specifications Arial' frmPVTable Probability Values Form1 F1PVTable VCF150Ctl.F1Book Arial1 Arial1 Arial1 Arial1 Arial "$"#,##0_);\("$"#,##0\) "$"#,##0_);[Red]\("$"#,##0\)
"$"#,##0.00_);\("$"#,##0.00\) ""$"#,##0.00_);[Red]\("$"#,##0.00\) 0_("$"* #,##0_);\("$"* #,##0\);_("$"* "-"_);_(@_)'_(* #,##0_);\(* #,##0\);_(* "-"_);_(@_
) 8_("$"* #,##0.00_);\("$"* #,##0.00\);_("$"* "-"??_);_(@_) /_(* #,##0.00_);\(* #,##0.00\);_(* "-"??_);_(@_) Sheet1 MbP?_ Page &P frmPDTable Probability Dependencies Form1 F1PDTable VCF150Ctl.F1Book Arial1 Arial1 Arial1 Arial1 Arial
"$"#,##0_);\("$"#,##0\) "$"#,##0_);[Red]\("$"#,##0\) "$"#,##0.00_);\("$"#,##0.00\)
""$"#,##0.00_);[Red]\("$"#,##0.00\) 0_("$
"* #,##0_);\("$"* #,##0\);_("$"* "-"_);_(@_)'_(* #,##0_);\(* #,##0\);_(* "-"_);_(@_) 8_("$"* #,##0.00_);\("$"* #,##0.00\);_("$"* "-"??_);_(@_) /_(* #,##0.00_);\(* #,##0.00\);_(* "-"??_);_(@_) Sheet1 MbP?_ Page &P frmProbStructure Probability Structure Form1 F1ProbStructure VCF150Ctl.F1Book Arial1 Arial1 Arial1 Arial1 Arial
"$"#,##0_);\("$"#,##0\) "$"#,##0_);[Red]\("$"#,##0\) "$"#,##0.00_);\("$"#,##0.00\)
""$"#,##0.00_);[Red]\("$"#,##0.00\) 0_("$"
* #,##0_);\("$"* #,##0\);_("$"* "-"_);_(@_)'_(* #,##0_);\(* #,##0\);_(* "-"_);_(@_) 8_("$"* #,##0.00_);\("$"* #,##0.00\);_("$"* "-"??_);_(@_) /_(* #,##0.00_);\(* #,##0.00\);_(* "-"??_);_(@_) Sheet1 MbP?_ Page &P frmModelProbs Decision model probabilities Form1 Arial F1ModelProbs VCF150Ctl.F1Book Arial1 Arial1 Arial1 Arial1 Arial
"$"#,##0_);\("$"#,##0\) "$"#,##0_);[Red]\("$"#,##0\) "$"#,##0.00_);\("$"#,##0.00\)
""$"#,##0.00_);[Red]\("$"#,##0
.00\) 0_("$"* #,##0_);\("$"* #,##0\);_("$"* "-"_);_(@_)'_(* #,##0_);\(* #,##0\);_(* "-"_);_(@_) 8_("$"* #,##0.00_);\("$"* #,##0.00\);_("$"* "-"??_);_(@_) /_(* #,##0.00_);\(* #,##0.00\);_(* "-"??_);_(@_) Sheet1 MbP?_ Page &P frmCompData Forward and backward roll operations: resulting database Form1 F1CompData VCF150Ctl.F1Book Arial1 Arial1 Arial1 Arial1 Arial "$"#,##0_);\("$"#,##0\) "$"#,##0_);[Red]\("$"#,##0\)
"$"#,##0.00_);\("$"#,##0.00\) ""$"#,##0.0
0_);[Red]\("$"#,##0.00\) 0_("$"* #,##0_);\("$"* #,##0\);_("$"* "-"_);_(@_)'_(* #,##0_);\(* #,##0\);_(* "-"_);_(@_) 8_("$"* #,##0.00_);\("$"* #,##0.00\);_("$"* "-"??_);_(@_) /_(* #,##0.00_);\(* #,##0.00\);_(* "-"??_);_(@_) Sheet1 MbP?_ Page &P This table shows the results of a forward roll. frmProjRunSummary "Project Name": Project Run Summary Form1 F1ProjRunSummary VCF150Ctl.F1Book Arial1 Arial1 Arial1 Arial1 Arial
"$"#,##0_);\("$"#,##0\) "$"#,##0_);[Red]\("$"#,##0\) "$"#,##0.00_);\("$"#,##0.00\)
""$"#,##0.00_);[Red]\(
"$"#,##0.00\) 0_("$"* #,##0_);\("$"* #,##0\);_("$"* "-"_);_(@_)'_(* #,##0_);\(* #,##0\);_(*
"-"_);_(@_) 8_("$"* #,##0.00_);\("$"* #,##0.00\);_("$"* "-"??_);_(@_) /_(* #,##0.00_);\(*

,##0.00\);_(* "-"??_);_(@_) Sheet1 MbP?_ Page &P This table summarizes all the computation runs made for this project. lblProjRunSummary Run Summary Chart Arial frmDMSummary Form1 ArialD F1DMSummary VCF150Ctl.F1Book Arial1 Arial1 Arial1 Arial1 Arial "$"#,##0_);\("$"#,##0\) "$"#,##0_);[Red]\("$"#,##0\)
"$"#,##0.00_);\("$"#,##0.00\) ""$"#,##0.00_);[Red]\("$"#,##0.00\) 0_("$"* #,##0_);\("$"* #,##0\);_("$"* "-"_);_(@_) '_(* #,##0_);\(* #,##0\);_(* "-"_);_(@_) 8_("$"* #,##0.00_);\("$"* #,##0.00\);_("$"* "-"??_);_(@_) /_(* #,##0.00_);\(* #,##0.00\);_(* "-"??_);_(@_) Sheet1 MbP?_ Page &P txtDMSummary RichTextLib.RichTextBox ArialJ Current table selection lblDMSummary Program Summary Arial frmViewDatabases View Decision Model Database Form1 F1ViewDatabases VCF150Ctl.F1Book Arial1 Arial1 Arial1 Arial1 Arial "$"#,##0_);\("$"#,##0\) "$"#,##0_);[Red]\("$"#,##0\)
"$"#,##0.00_);\("$"#,##0.00\) ""$"#,##0.00_);[Red]\("$"#,##0.00\) 0_("$"* #,##0_);\("$"* #,##0\);_("$"* "-"_);_(@_) '_(* #,##0_);\(* #,##0\);_(* "-"_);_(@_) 8_("$"* #,##0.00_);\("$"* #,##0.00\);_("$"* "-"??_);_(@_) /_(* #,##0.00_);\(* #,##0.00\);_(* "-"??_);_(@_) Sheet1 MbP?_ Page &P txtViewDatabases RichTextLib.RichTextBox
{\rtf1\ansi\deff0\deftab720{\fonttbl{\f0\fswiss MS Sans Serif;}{\f1\froman\fcharset2 Symbol;}{\f2\fswiss MS Sans Serif;}}
{\colortbl\red0\green0\blue0;}
\deflang1033\pard\plain\f2\fs20 RichText
\par }
MS Sans Serif frmTornado Tornado diagram Form1 Arial F1TorView VCF150Ctl.F1Book Arial1 Arial1 Arial1 Arial1 Arial "$"#,##0_);\("$"#,##0\) "$"#,##0_);[Red]\("$"#,##0\)
"$"#,##0.00_);\("$"#,##0.00\) ""$"#,##0.00_);[Red]\("$"#,##0.00\) 0_(
"$"* #,##0_);\("$"* #,##0\);_("$"* "-"_);_(@_) '_(* #,##0_);\(* #,##0\);_(* "-"_);_(@_)
8_("$"* #,##0.00_);\("$"* #,##0.00\);_("$"* "-"??_);_(@_) /_(* #,##0.00_);\(* #,##0.00\);_(* "-"??_);_(@_) Sheet1 MbP?_ Page &P fraTornado pctTorView Arial>5 When resizing, click the diagram to achieve full fit. linTorView linTorView shpATorView lblATorView Arial' lblATorn
ado Utility Arial lblATornado Nominal utility Arial lblATornado Computation name: Tornado diagram Arial frmDSGraph Decision Model Graph Form1 ArialD pctDSGraph Arial F1DSGraph VCF150Ctl.F1Book Arial1 Arial1 Arial1 Arial1 Arial "$"#,##0_);\("$"#,##0\)
"$"#,##0_);[Red]\("$"#,##0\) "$"#,##0.00_);\("$"#,##0.00\)
""$"#,##0.00_);[Red]\("$"#,##0.00\) 0_("$"* #,##0_);\("$"* #,##0\);_("$"* "-"_);_(@_) '_(* #,##0_);\(* #,##0\);_(* "-"_);_(@_) 8_("$"* #,##0.00_);\("$"* #,##0.00\);_("$"* "-"??_);_(@_) /_(* #,##0.00_);\(* #,##0.00\);_(* "-"??_
);_(@_) Sheet1 MbP?_ Page &P vsbDSGraph hsbDSGraph prgDSGraph ComctlLib.ProgressBar Please wait until graph model is drawn. prglblArray Arial prglblArray Nodes processed: Arial lblDSGraph Decision Graph Arial shpDSGArray lblDSGArray
MS Sans Serif frmOHChart Objectives Hierarchy Chart Form1 ArialD txtCommentsTemp RichTextLib.RichTextBox F1OHChart VCF150Ctl.F1Book Arial1 Arial1 Arial1 Arial1 Arial "$"#,##0_);\("$"#,##0\) "$"#,##0_);[Red]\("$"#,##0\) "$"#,##0.00_);\("$"#,##0.00\) ""$"#,##0.00_);[Red]\("$"#,##0.00\) 0_("$"* #,##0_);\("$"* #,##0\);_("$"* "-"_);_(@_) '_(* #,##0_);\(* #,##0\);_(* "-"_);_(@_) 8_("$"* #,##0.00_);\("$"* #,##0.00\);_("$"* "-"??_);_(@_) /_(* #,##0.00_);\(* #,##0.00\);

_(* "-"??_);_(@_) Sheet1 MbP?_ Page &P pctOHChart hsbOHChart vsbOHChart prgOHChart ComctlLib.ProgressBar Please wait until objectives hierarchy is drawn. lblOHCPMArray P Measure Arial lblAOHChart Arial lblAOHChart Objectives processed: Arial lblAOHChart Objectives Hierarchy Arial lblOHCArray Objective Arial frmCBProb Specifying Costs,Benefits,Probabilities and Auxiliary Variables. Form1 F1CBProb VCF150Ctl.F1Book Arial1 Arial1 Arial1 Arial1 Arial "$"#,##0_);\("$"#,##0\) "$"#,##0_);[Red]\("$"#,##0\) "$"#,##0.00_);\("$"#,## 0.00\) ""$"#,##0.00_);[Red]\("$"#,##0.00\) 0_("$"* #,##0_);\("$"* #,##0\);_("$"* "-"_);_(@_) '_(* #,##0_);\(* #,##0\);_(* "-"_);_(@_) 8_("$"* #,##0.00_);\("$"* #,##0.00\);_("$"* "-"??_);_(@_) /_(* #,##0.00_);\(* #,##0.00\);_(* "-"??_);_(@_) Sheet1 MbP?_ Page &P txtACBProb RichTextLib.RichTextBox Arial cmdACBProb Arial%< Exit the specification of probabilities, costs and benefits. cmdACBProb More
 Arial%V Select another outcome or choice to specify its probability or its costs and benefits. cboCBProb PM values Arial cmdACBProb Enter Arial%2 Enter table data into the decision model database. cmdACBProb Cancel Arial%* Cancel your
new entries and restore table. txtACBProb RichTextLib.RichTextBox ArialJ- Enter transition probability expression here. lblACBProb Probability expression: Arial lblACBProb Probabilities and Auxiliary Variables Arial frmCompDialog1 Decision optimization Form1 Arial prgCompDialog1 ComctlLib.ProgressBar chrt2DCompDialog1 OlectraChart2D.Chart2D KL_CHART.2DE* Risk profile ArialDB
MS Sans SerifDB
MS Sans SerifDB Utility %H:%M:%S
MS Sans SerifDB Probability
MS Sans SerifDB
MS Sans SerifDB Double-click the chart to open a separate window from which a full-size image of the chart can be printed. cmdACompDialog1 Exit module Arial% Exit the Solve module. cmdACompDialog1 Remove run Arial%) Save the run to the compu
tation database. cmdACompDialog1 Save run Arial%- Remove the run from the computation database. cmdACompDialog1 Arial) cmdACompDialog1 Cancel Arial% Reset your selections. cmdACompDialog1 Compute Arial) txtDAComments RichTextLib.RichTextBox Arial fraACompDialog1 Results summary
MS Sans Serif cboCompDialog1          Optimal decisions All the optimal decisions along the path from the specified root to the terminal nodes. txtACompDialog1 RichTextLib.RichTextBox ArialJ* Optimal utility at the decision r
oot node. txtACompDialog1 RichTextLib.RichTextBox ArialJ) Optimal choice at the decision root node. lblACompDialog1 Optimal utility: lblACompDialog1 Optimal choice: fraACompDialog1 Model execution fraACompDialog1 Risk profile sele
ction optACompDialog1Risk Neither Do not show any risk profile. optACompDialog1Risk Show both pdf and cdf on a common graph. optACompDialog1Risk Cumulative distribution Show the overall utility cdf for the specified problem. optACompD
ialog1Risk Probability density Show the overall utility pdf for the specified problem. fraACompDialog1 Policy specification optACompDialog1Policy Do not specify Do not fix decision choices. Decision manager will find all optimal choices. optACom
pDialog1Policy Specify Fix decision choices along the path from root to terminal nodes. Sibling choices will be ignored. fraACompDialog1 Solution mode optACompDialog1Mode Forward roll Calculate and accumulate all the costs, benefits, utilities and probabilities along the path from the selected root to the graph leaves. optACompDialog1Mode Optimization Find all the optimal choices
from the specified root to the terminal nodes(leaves). txtACompDialog1 RichTextLib.RichTextBox ArialJR Your root node has references. Please specify its input node for this computation. txtACompDialog1 RichTextLib.RichTextBox ArialJ< Specify the decsion node whose subgraph solution is desired. txtACompDialog1 RichTextLib.RichTextBox ArialJJ Specify a name. On saving, a project directory folder will have this name. lblACompDialog1 Computational progr
ess Arial lblACompDialog1 Decision model computation comments Arial lblACompDialog1 Solving 'Project name' Arial lblACompDialog1 Input node: lblACompDialog1 Root node: lblACompDialog1 Computation name: frmRainbow Sensitivity analysis:Rainbow Diagram Form1 fraRainbow 3D-View settings
MS Sans Serif hsbARainbow MSForms.ScrollBar Rotate the view about the z-axis between 0 and 360 degrees. hsbARainbow MSForms.ScrollBar Rotate the view about the y-axis between 0 and 360 degrees. hsbARainbow MSForms.ScrollBar Rotate the view about the x-axis between 0 and 360 degrees. hsbARainbow MSForms.ScrollBar Adjust the view's perspective between 1 and 100 lb
lARainbow Arial lblARainbow Arial lblARainbow Arial lblARainbow Arial lblARainbow Perspective: Arial lblARainbow X-Rotation: Arial lblARainbow Y-Rotation: Arial lblARainbow Z-Rotation: Arial chrt3DRainbow OlectraChart3D.Chart3D KL_CHART.3Dc
MS Sans SerifDB
MS Sans SerifDB
MS Sans SerifDB
MS Sans SerifDB
MS Sans SerifDB
MS Sans SerifDB !Y
@ ?#gaO; ?oG8-xQ ?YiR ?%#gaO; ?
5^ [Z
?uYLl> ?j0
Two-way Rainbow Diagram
MS Sans SerifDB
MS Sans SerifDB
MS Sans SerifDB Click the chart to fit the window. chrt2DRainbow OlectraChart2D.Chart2D KL_CHART.2D Sensitivity graph
MS Sans SerifDB
MS Sans SerifDB
MS Sans SerifDB %H:%M:%S
MS Sans SerifDB
MS Sans SerifDB
MS Sans SerifDB Stretch or shrink the window to resize the diagram. frmPMeasures Performance Measure Tables Form1 Arial F1Utilities VCF150Ctl.F1Book Arial1 Arial1 Arial1 Arial1 Arial "$"#,##0_);\("$"#,##0\) "$"#,##0_);[Red]\("$"#,##0\) "$"#,##0.00_);\("$"#,##0.00\) ""$"#,##0.00_);[Red]\("$"#,##0.00

\) 0 _("$"* #,##0_);\("$"* #,##0\);_("$"* "-"_);_(@_) '_(* #,##0_);\(* #,##0\);_(* "-"_);_(@_) 8_("$"* #,##0.00_);\("$"* #,##0.00\);_("$"* "-"??_);_(@_) /_(* #,##0.00_);\(* #,##0.00\);_(* "-"??_);_(@_) Sheet1 MbP?_ Page &P F1PMeasures VCF150Ctl.F1Book Arial1 Arial1 Arial1 Arial1 Arial "$"#,##0_);\("$"#,##0\) "$"#,##0_);[Red]\("$"#,##0\) "$"#,##0.00_);\("$"#,##0.00\) ""$"#,##0.00_);[Red]\("$"#, ##0.00\) 0_("$"* #,##0_);\("$"* #,##0\);_("$"* "-"_);_(@_)'_(* #,##0_);\(* #,##0\);_(* "-"_);_(@_) 8_("$"* #,##0.00_);\("$"* #,##0.00\);_("$"* "-"??_);_(@_) /_(* #,##0.00_);\(* #,##0.00\);_(* "-"??_);_(@_) Sheet1 MbP?_ Page &P txtPMeasures
RichTextLib.RichTextBox Arial lblAPMeasures PM Table: General Measure Specifications Arial frmDSDialog Decision Model Building Form1 ArialD txtADSDialog RichTextLib.RichTextBox ArialJ( Enter your decision model comments here. txtADSDialog RichTextLib.RichTextBox ArialJ3 Edit text here or directly in
the selected textbox. cmdADSDCommands Quit edit Arial% Quit current operation. cmdADSDCommands Quit node Arial%2 Quit to select another node in the decision graph. cmdADSDCommands Enter Arial%. Insert textbox entries in the module database. cm dADSDCommands Arial% Accept the selected node. pctDSDGraph vsbDSDGraph fraADSDialog Removal mode selection Arial 7 Click a button on this panel to select the removal mode optADSDialog Remove subgraph Arial"/ Remove the selected node and all its offspring. optADSDialog Remove node Arial" Remove only the selected node
. fraADSDialog Subgraph translation Arial 3 Specify size and direction of subgraph translation. txtADSDialog RichTextLib.RichTextBox ArialJ% Enter leftward quantity of positions. txtADSDialog RichTextLib.RichTextBox ArialJ& Enter rightward quantity of positions. txtADSDialog RichTextLib.RichTextBox ArialJ% Enter downward quantity of positions. txtADSDialog RichTextLib.RichTextBox ArialJ# Enter upward quantity of positions. cmdADSD
ialog Move subgraph up. cmdADSDialog Move subgraph left. cmdADSDialog Move subgraph right. cmdADSDialog Move subgraph down. fraADSDialog Node type and name selection Arial 3 Click a button on this panel to select a node Type. txtADSDialog RichTextLib.RichTextBox {\rtf1\ansi\deff0\deftab720{\fonttbl{\f0\fswiss MS Sans Serif;}{\f1\froman\fcharset2 Symbol;}{\f2\
fswiss Arial;}{\f3\fswiss Arial;}}
{\colortbl\red0\green0\blue0;}
\deflang1033\pard\plain\f2\fs20\b Node name
\par }
Arial optADSDialog Chance Arial"# Click here to select a Chance node. optADSDialog Decision Arial"% Click here to select a Decision node. lblADSDialog Node name: Arial txtDSDGArray RichTextLib.RichTextBox {\rtf1\ansi\deff0\deftab720{\fonttbl{\f0\fswiss MS Sans Serif;}{\f1\froman\fcharset2 Symbol;}{\f2\fswiss

What is claimed is:

1. A method for modeling, solving and analyzing sequential, probabilistic and multi-objective decision problems, said method stored and executed as a stand-alone application on a computer having a processor, a color display screen, a pointing and selection device, a keyboard, and means for storing data and information, the method comprising the steps of:

(a) receiving, as a first specification for a decision problem, one or more prioritized objectives for said decision problem, including a parent-child structure relating any and every parent objective to its offspring, (b) organizing said objectives and parent-child structure received in Step (a) as a multi-level objectives hierarchy in accordance with said first specification, (c) receiving, as a second specification, a collection of one or more performance measures for the decision problem together with a pairing of each performance measure with one and only one of said objectives, (d) for each performance measure in said collection of performance measures, receiving, as a third specification, a not necessarily monotonic, linear or exponential mathematical function, said function assigning a real number to each of a plurality of values of said performance measure, or receiving a collection of parameters and parameter values enabling the construction of said mathematical function, (e) receiving, as a fourth specification, a plurality of nodes, each node assigned a name and further specified as either a decision node, a chance node, a terminal node or a continuation node, together with a parent-child structure relating every parent node to its offspring, further receiving a selection of the principal node for the decision problem and, for every parent node, a specification of a contribution to each performance measure in said collection of performance measures, said contribution accrued during a transition from the parent node to each of its offspring and, for every chance node, a specification of a probability of transition from said chance node to each of its offspring and, for every continuation node, the name of the node to which it is continued, (f) creating a decision model for said decision problem by processing said second through fourth specifications and organizing said specifications into a sequential decision network, (g) solving the decision problem by processing said sequential decision network with the solver engine of the method, the resulting solution comprising an optimal decision policy for the problem and an optimal principal choice for a root node selected by a user, whereby an optimal solution is obtained for any sequential, probabilistic and multi-objective decision problem specified in accordance with Steps (a) through (d), said solution comprising an optimal decision policy and an optimal choice for the principal decision node selected by a user.

2. The method of claim 1, further comprising procedures for performing one-way and two-way sensitivity analyses, said analyses providing the sensitivities of a decision problem solution to variations in parameters associated with said sequential decision network.

3. The method of claim 1, further comprising procedures for performing a Tornado Analysis, said analysis providing a combination of one-way sensitivities of a decision problem solution to a limited number of variations in a plurality of parameters associated with said sequential decision network.

4. The method of claim 1, wherein Step (a) further includes receiving a prioritization of said objectives and processing said prioritization with the method, comprising the steps of:

(a) eliciting a relative ranking of the objectives, (b) further refining said relative ranking by eliciting an absolute ranking consistent with the relative ranking, (c) numerically normalizing said absolute ranking, thereby obtaining an assignment of an absolute numerical priority to each objective, said assignment including the property that, for every parent objective, the sum of the normalized priorities assigned to its offspring equals unity.

5. The method of claim 1, further including procedures for performing a plurality of editing operations on the objectives hierarchy.

6. The method of claim 1, wherein said collection of performance measures further includes quantitative, discrete, continuous, qualitative or linguistic measures, and wherein Step (c) further comprises the steps of receiving for each in the collection of performance measures a specification of:

(a) upper bounds, lower bounds, and constraint values, (b) a scale granularity and step size, whereby an economical representation of said performance measures is obtained, said representation enabling efficient optimizations and a thorough management of constraint violations during said optimizations.

7. The method of claim 1, wherein Step (d) further includes procedures for aiding a user in the construction of utility functions, said functions not necessarily monotonic, linear or exponential, and said procedures including the application of the Mid-Value Splitting Method in accordance with the principles and practices of modern decision theory.

8. The method of claim 1, wherein Step (d) further includes procedures for aiding a user in the construction of utility functions, said functions not necessarily monotonic, linear or exponential, and said procedures including a point-by-point construction of piece-wise linear utility functions.

9. The method of claim 1, wherein step (d) further includes procedures for aiding a user employing a pointing and selection device and a keyboard to specify explicit mathematical expressions for probability functions, cost and benefit functions and utility functions, said probability, cost, benefit and utility functions not necessarily monotonic, linear or exponential, and said expressions comprised in a list of expressions included in the invention and selected from said list by activating a command button from the second plurality of command buttons, said command button selected in accordance with Step (e).

10. The method of claim 1, further comprising a procedure for creating auxiliary variables, said auxiliary variables representing conditions, parameters or values internal or external to the network, said procedure further enabling a user to include said auxiliary variables in expressions for specifying the costs, benefits, probabilities and utilities associated with any node of a probabilistic decision network.

11. The method of claim 1, wherein Step (e) further includes procedures for aiding a user in the construction of probability functions, said procedures including the use of a probability wheel in accordance with the principles and practices of modern decision theory.

12. The method of claim 1, further comprising a plurality of procedures for managing data and information received and generated while executing one or more of the steps recited in claims 1 through 11, said procedures comprising:

(a) a procedure for organizing said data and information into a collection of computer files, thereby creating a new project or updating an existing project, (b) a procedure for appending a new project created in Step (a) to a stored list of previously created projects, and storing said new project in a computer memory location specified by a user, (c) a procedure for retrieving any project on said stored list, thereby enabling a user to perform a plurality of operations on a retrieved project, said operations comprising:

(i) reviewing data associated with said retrieved project,
  (ii) creating a copy of the retrieved project
  (iii) deleting the retrieved project
  (iv) executing the method in accordance with the data, information, parameters and models associated with the retrieved project
  (v) in accordance with Steps (a) through (e) of claim 1, editing data and information associated with the retrieved project and executing the method using the edited data and information.

13. The method of claim 1, said method embodied as a controller for optimizing the global performance of a process by solving a plurality of decision problems associated with the operation of a plant comprised in said process, said controller functioning in conjunction and cooperation with conventional plant regulators and producing globally optimal plant commands derived from solutions to each of said plurality of decision problems in accordance with the steps of:

(a) receiving specifications in accordance with Steps (a), (c), (d) and (e) of claim 1, creating an objectives hierarchy in accordance with Step (b) of claim 1, and creating a sequential decision model in accordance with Step (e) of claim 1, (b) receiving a model of the controlled process, said process model including a set of parameters for optimization by said controller, (c) for each offspring choice of the principal node received in Step (a) of the current claim, collecting measurements from and about the process and updating the process model with the purpose of maintaining a faithful process model, (d) for each offspring choice of the principal node received in Step (a) of the current claim, executing the process model, estimating, from the measurements collected during said execution, values for the performance measures received in Step (c) of claim 1 and for the probabilities associated with the parent-offspring chance node transitions received in Step (e) of claim 1, and including the results of said estimating in the sequential decision model, (e) solving the decision model resulting from Step (d), thereby obtaining optimal plant commands and communicating said optimal commands to the controlled process, (f) repeating Steps (c) through (e) at a rate determined by the system operator, whereby a method is provided for maximizing the global performance of a process containing a plant whose operation involves sequential, probabilistic and multi-objective decisions.

14. The method of claim 13, further comprising procedures for performing one-way and two-way sensitivity analyses, said analyses providing the sensitivities of process performance and plant commands to variations in parameters associated with said sequential decision network.

15. The method of claim 13, further comprising procedures for performing a Tornado Analysis, said analysis providing a combination of one-way sensitivities of process performance indices and of plant commands to a limited number of extreme variations in a plurality of parameters associated with said sequential decision network.

16. The method of claim 13, wherein Step (a) further includes receiving a prioritization of said objectives and processing said prioritization with the method, comprising the steps of:

(a) eliciting a relative ranking of the objectives,
  (b) further refining said relative ranking by eliciting an absolute ranking consistent with the relative ranking,
  (c) numerically normalizing said absolute ranking, thereby obtaining an assignment of an absolute numerical priority to each objective, said assignment including the property that, for every parent objective, the sum of the normalized priorities assigned to its offspring equals unity.

17. The method of claim 13, further including procedures for performing a plurality of editing operations on the objectives hierarchy.

18. The method of claim 13, wherein said collection of performance measures may further include quantitative, discrete, continuous, qualitative or linguistic measures, and wherein Step (a) further comprises the steps of receiving for each in the collection of performance measures a specification of:

(a) upper bounds, lower bounds, and constraint values,
  (b) a scale granularity and step size, whereby an economical representation of said performance measures is obtained, said representation enabling efficient optimizations and a thorough management of constraint violations during said optimizations.

19. The method of claim 13, wherein Step (a) further includes procedures for aiding a system operator in the construction of utility functions, said functions not necessarily monotonic, linear or exponential, and said procedures including the application of the Mid-Value Splitting Method in accordance with the principles and practices of modern decision theory.

20. The method of claim 13, wherein Step (a) further includes procedures for aiding a system operator in the construction of utility functions, said functions not necessarily monotonic, linear or exponential, and said procedures including a point-by-point construction of piece-wise linear utility functions.

21. The method of claim 13, wherein step (a) further includes procedures for aiding a system operator using a pointing and selection device and a keyboard to specify explicit mathematical expressions for probability functions, cost and benefit functions and utility functions, said probability, cost, benefit and utility functions not necessarily monotonic, linear or exponential, and said expressions comprised in a list of expressions included in the invention and selected from said list by activating a command button from the second plurality of command buttons, said command button selected in accordance with Step (a).

22. The method of claim 13, further comprising a procedure for creating auxiliary variables, said auxiliary variables representing conditions, parameters or values internal or external to the network, said procedure further enabling a system operator to include said auxiliary variables in expressions specifying the costs, benefits, probabilities and utilities associated with any node of a probabilistic decision network.

23. The method of claim 13, wherein Step (a) further includes procedures for aiding a system operator in the construction of probability functions, said procedures including the use of a probability wheel in accordance with the principles and practices of modern decision theory.

24. The method of claim 13, further comprising a plurality of procedures for managing data and information received and generated while executing one or more of the steps recited in claims 13 and through 23, said procedures comprising:
(a) a procedure for organizing said data and information into a collection of computer files, thereby creating a new project or updating an existing project,
(b) a procedure for appending a new project created in Step (a) to a stored list of previously created projects, and storing said new project in a computer memory location specified by a user,
(c) A procedure for retrieving any project on said stored list, thereby enabling a user to perform a plurality of operations on a retrieved project, said operations comprising:
  (i) reviewing data associated with said retrieved project,
  (ii) creating a copy of the retrieved project
  (iii) deleting the retrieved project
  (iv) executing the method in accordance with the data, information, parameters and models associated with the retrieved project
  (v) in accordance with Steps (a) through (e) of claim 1, editing data and information associated with the retrieved project and executing the method using the edited data and information.

* * * * *